(12) United States Patent
Lambarth et al.

(10) Patent No.: US 12,357,518 B2
(45) Date of Patent: Jul. 15, 2025

(54) AMBULANCE COT AND LOADING AND UNLOADING SYSTEM

(71) Applicant: Stryker Corporation, Kalamazoo, MI (US)

(72) Inventors: Clifford Edwin Lambarth, Portage, MI (US); Chad Conway Souke, Vicksburg, MI (US); Kurosh Nahavandi, Portage, MI (US); Adam Darwin Downey, Kalamazoo, MI (US); Robert Gregory Cox, Portage, MI (US)

(73) Assignee: Stryker Corporation, Portage, MI (US)

( * ) Notice: Subject to any disclaimer, the term of this patent is extended or adjusted under 35 U.S.C. 154(b) by 581 days.

(21) Appl. No.: 17/728,067

(22) Filed: Apr. 25, 2022

(65) Prior Publication Data

US 2022/0354718 A1    Nov. 10, 2022

Related U.S. Application Data

(60) Continuation of application No. 17/034,737, filed on Sep. 28, 2020, now Pat. No. 11,318,055, which is a
(Continued)

(51) Int. Cl.
*A61G 3/02* (2006.01)
*A61G 1/00* (2006.01)
(Continued)

(52) U.S. Cl.
CPC ............. *A61G 3/0254* (2013.01); *A61G 1/00* (2013.01); *A61G 1/0293* (2013.01); *A61G 1/06* (2013.01);
(Continued)

(58) Field of Classification Search
CPC .. A61G 3/0236; A61G 3/0245; A61G 3/0254; A61G 3/0272; A61G 3/062;
(Continued)

(56) References Cited

U.S. PATENT DOCUMENTS 2,347,002 A    4/1944   Schofield
2,456,024 A    12/1948  Schofield
(Continued)

FOREIGN PATENT DOCUMENTS

EP    1034764         9/2000
EP    2366369 A2 *   9/2011   ............... A61G 3/02
(Continued)

OTHER PUBLICATIONS

PCT International Search Report and Written Opinion for PCT Application No. PCT/US2010/019646 mailed Aug. 2, 2011.

*Primary Examiner* — Amy R Weisberg
*Assistant Examiner* — Wenwei Zhuo
(74) *Attorney, Agent, or Firm* — Warner Norcross + Judd LLP

(57) ABSTRACT

An ambulance cot loading and unloading system for an emergency vehicle includes a base for mounting in the emergency vehicle and an arm mounted for linear movement along the base, wherein the arm configured to support a cot while the cot is being loaded into or unloaded from the emergency vehicle. The ambulance cot loading and unloading system further includes an indicator mounted relative to the arm and a control system, which is in communication with the indicator and configured to generate a status indication of the cot loading and unloading system at the indicator.

24 Claims, 51 Drawing Sheets

Related U.S. Application Data continuation of application No. 16/205,667, filed on Nov. 30, 2018, now Pat. No. 10,806,647, which is a continuation of application No. 15/253,140, filed on Aug. 31, 2016, now Pat. No. 10,149,791, which is a continuation of application No. 14/630,681, filed on Feb. 25, 2015, now Pat. No. 9,456,939, which is a division of application No. 13/888,654, filed on May 7, 2013, now Pat. No. 8,973,963, which is a division of application No. 12/886,987, filed on Sep. 21, 2010, now Pat. No. 8,439,416.

(60) Provisional application No. 61/248,654, filed on Oct. 5, 2009, provisional application No. 61/248,374, filed on Oct. 2, 2009.

(51) Int. Cl.
*A61G 1/02* (2006.01)
*A61G 1/06* (2006.01)
*A61G 3/08* (2006.01)
*A61G 1/056* (2006.01)
*B65G 35/06* (2006.01)
*B65G 67/04* (2006.01)
*B65G 67/24* (2006.01)

(52) U.S. Cl.
CPC ......... *A61G 3/0236* (2013.01); *A61G 3/0272* (2013.01); *A61G 3/0833* (2013.01); *A61G 3/0875* (2013.01); *A61G 3/0883* (2013.01); *A61G 3/0891* (2013.01); *A61G 1/02* (2013.01); *A61G 1/0212* (2013.01); *A61G 1/0237* (2013.01); *A61G 1/0262* (2013.01); *A61G 1/0567* (2013.01); *A61G 3/029* (2013.01); *A61G 2203/30* (2013.01); *A61G 2203/42* (2013.01); *A61G 2203/44* (2013.01); *B65G 35/06* (2013.01); *B65G 67/04* (2013.01); *B65G 67/24* (2013.01); *B65G 2201/0214* (2013.01); *B65G 2203/0283* (2013.01); *B65G 2203/042* (2013.01); *B65G 2812/12* (2013.01); *B65G 2814/0302* (2013.01)

(58) Field of Classification Search
CPC .. A61G 3/0833; A61G 3/0875; A61G 3/0883; A61G 3/0891; A61G 1/0293; A61G 1/06; A61G 7/1036; A61G 7/08
USPC ............... 296/19, 20; 5/600, 611, 943, 87.1, 5/81.1 HS
See application file for complete search history.

(56) References Cited

U.S. PATENT DOCUMENTS

| | | | |
|---|---|---|---|
| 3,380,085 A | 4/1968 | Ferneau et al. | |
| RE26,919 E | 6/1970 | Hagelbarger et al. | |
| 3,759,565 A | 9/1973 | Ferneau | |
| 3,831,996 A | 8/1974 | Layer | |
| 4,052,097 A | 10/1977 | Weil et al. | |
| 4,097,941 A | 7/1978 | Merkel | |
| 4,251,100 A | 2/1981 | Rolandelli | |
| 4,273,374 A | 6/1981 | Portman | |
| 4,389,066 A | 6/1983 | Weir et al. | |
| 4,405,172 A | 9/1983 | Ferneau | |
| 4,579,381 A | 4/1986 | Williams | |
| 4,584,989 A | 4/1986 | Stith | |
| 4,682,810 A | 7/1987 | Zarka | |
| 4,767,148 A | 8/1988 | Ferneau et al. | |
| 5,092,722 A | 3/1992 | Reazer, III et al. | |
| 5,135,350 A | 8/1992 | Eelman et al. | |
| 5,178,432 A | 1/1993 | Zeman et al. | |
| 5,236,390 A | 8/1993 | Young | |
| 5,271,113 A | 12/1993 | White | |
| 5,279,011 A | 1/1994 | Schnelle | |
| 5,365,622 A | 11/1994 | Schirmer | |
| 5,370,111 A | 12/1994 | Reeder et al. | |
| 5,432,966 A | 7/1995 | Berta et al. | |
| 5,490,703 A | 2/1996 | Hewko | |
| 5,509,159 A | 4/1996 | Du-Bois | |
| 5,615,848 A | 4/1997 | Ceriani | |
| 5,991,947 A | 11/1999 | Lavin et al. | |
| 6,024,528 A * | 2/2000 | Taylor .................... | A61G 3/062 414/921 |
| 6,125,485 A | 10/2000 | Way et al. | |
| 6,240,579 B1 | 6/2001 | Hanson et al. | |
| 6,332,638 B1 * | 12/2001 | Menna ..................... | A61G 1/06 296/26.1 |
| 6,461,290 B1 | 10/2002 | Reichman et al. | |
| 6,916,056 B2 | 7/2005 | Mitchell et al. | |
| 7,389,552 B1 | 6/2008 | Reed et al. | |
| 7,398,571 B2 | 7/2008 | Souke et al. | |
| 7,478,855 B2 * | 1/2009 | Lambarth ............ | A61G 3/0254 296/19 |
| 7,530,403 B2 | 5/2009 | Cano | |
| 7,650,654 B2 | 1/2010 | Lambarth et al. | |
| 7,690,057 B2 | 4/2010 | Malassigne et al. | |
| 7,740,015 B2 | 6/2010 | Hyde et al. | |
| 7,789,086 B2 | 9/2010 | Hyde et al. | |
| 7,887,113 B2 | 2/2011 | Lambarth et al. | |
| 8,046,117 B2 | 10/2011 | Rawls-Meehan | |
| 8,051,513 B2 | 11/2011 | Reed et al. | |
| 8,155,918 B2 | 4/2012 | Reed et al. | |
| 8,156,586 B2 | 4/2012 | Reed et al. | |
| 8,181,868 B2 | 5/2012 | Thomas et al. | |
| 8,215,311 B2 | 7/2012 | Hyde et al. | |
| 8,439,416 B2 | 5/2013 | Lambarth et al. | |
| 8,534,732 B2 | 9/2013 | Bourgraf et al. | |
| 8,973,963 B2 | 3/2015 | Lambarth et al. | |
| 9,017,003 B2 * | 4/2015 | Nims .................... | A61G 3/0236 414/479 |
| 9,545,345 B1 * | 1/2017 | Akers, Jr. ............ | A61G 3/0272 |
| 11,998,492 B2 * | 6/2024 | Shrapnel ................ | A61G 3/062 |
| 2004/0080172 A1 | 4/2004 | Mitchell et al. | |
| 2004/0176983 A1 | 9/2004 | Birkett et al. | |
| 2004/0202533 A1 | 10/2004 | Haire | |
| 2005/0120480 A1 | 6/2005 | Benedict et al. | |
| 2005/0204474 A1 | 9/2005 | Knipfel | |
| 2005/0224236 A1 | 10/2005 | Cano | |
| 2006/0075558 A1 | 4/2006 | Lambarth et al. | |
| 2006/0082176 A1 | 4/2006 | Broadley et al. | |
| 2006/0137886 A1 | 6/2006 | Cano | |
| 2006/0181100 A1 | 8/2006 | Lambarth et al. | |
| 2006/0208169 A1 | 9/2006 | Breed et al. | |
| 2007/0163045 A1 | 7/2007 | Becker et al. | |
| 2007/0169269 A1 | 7/2007 | Wells | |
| 2008/0034501 A1 | 2/2008 | Hyde et al. | |
| 2008/0035156 A1 | 2/2008 | Hyde et al. | |
| 2008/0301875 A1 | 12/2008 | Malassigne et al. | |
| 2009/0015027 A1 * | 1/2009 | Lambarth ............ | A61G 3/0816 307/104 |
| 2009/0039666 A1 | 2/2009 | Lambarth | |
| 2009/0165207 A1 | 7/2009 | Reed et al. | |
| 2009/0165208 A1 | 7/2009 | Reed et al. | |
| 2009/0178198 A1 | 7/2009 | Nahavandi et al. | |
| 2009/0178200 A1 | 7/2009 | Lambarth et al. | |
| 2009/0218108 A1 | 9/2009 | Cano | |
| 2009/0222988 A1 | 9/2009 | Reed et al. | |
| 2010/0045059 A1 | 2/2010 | Bourgraf et al. | |
| 2010/0176618 A1 | 7/2010 | Souke et al. | |
| 2010/0218315 A1 | 9/2010 | Hyde et al. | |
| 2010/0329831 A1 * | 12/2010 | Tornese ................ | B60P 1/4435 414/544 |
| 2011/0080016 A1 | 4/2011 | Lambarth et al. | |
| 2011/0229294 A1 | 9/2011 | Gale | |
| 2011/0260482 A1 | 10/2011 | Bourgraf et al. | |
| 2011/0277242 A1 | 11/2011 | Dionne et al. | |
| 2012/0117730 A1 | 5/2012 | Lemire et al. | |
| 2012/0199405 A1 | 8/2012 | Carletti et al. | |
| 2012/0235830 A1 | 9/2012 | Becker et al. | |
| 2012/0237326 A1 | 9/2012 | Van Ness | |
| 2013/0149064 A1 | 6/2013 | Misikir et al. | |

(56) References Cited

U.S. PATENT DOCUMENTS

| | | | |
|---|---|---|---|
| 2014/0023469 A1* | 1/2014 | Lambarth | A61G 3/0254 |
| | | | 414/812 |
| 2015/0233780 A1 | 8/2015 | Misikir et al. | |
| 2016/0338887 A1 | 11/2016 | Naber et al. | |
| 2017/0035628 A1 | 2/2017 | Naber et al. | |
| 2020/0093663 A1 | 3/2020 | Girardin et al. | |
| 2020/0138648 A1 | 5/2020 | Mansfield et al. | |
| 2021/0121338 A1 | 4/2021 | Souke et al. | |
| 2021/0161738 A1* | 6/2021 | Akers, Jr. | A61G 3/0825 |
| 2023/0113855 A1* | 4/2023 | Menna | A61G 1/056 |
| | | | 296/20 |
| 2023/0115410 A1* | 4/2023 | Menna | A61G 1/0562 |
| | | | 296/20 |
| 2024/0277537 A1* | 8/2024 | Trimble | A61G 3/0218 |

FOREIGN PATENT DOCUMENTS

| | | | | |
|---|---|---|---|---|
| EP | 3613397 B1 * | 4/2021 | | A61G 3/0245 |
| GB | 1164975 A | 9/1969 | | |
| GB | 2203999 | 11/1998 | | |
| GB | 2431360 | 4/2007 | | |
| JP | 2002-153512 | 5/2002 | | |
| JP | 2004-283238 | 10/2004 | | |
| WO | 94/28560 | 12/1994 | | |
| WO | 1998004228 A1 | 2/1998 | | |
| WO | 02/00466 | 1/2002 | | |
| WO | 2006/004820 | 1/2006 | | |
| WO | WO-2006004820 A1 * | 1/2006 | | A61G 3/0245 |
| WO | 2007/109267 | 9/2007 | | |
| WO | 2007/123571 | 11/2007 | | |
| WO | 2008003027 A2 | 1/2008 | | |
| WO | WO-2020228945 A1 * | 11/2020 | | A61G 3/0245 |

* cited by examiner

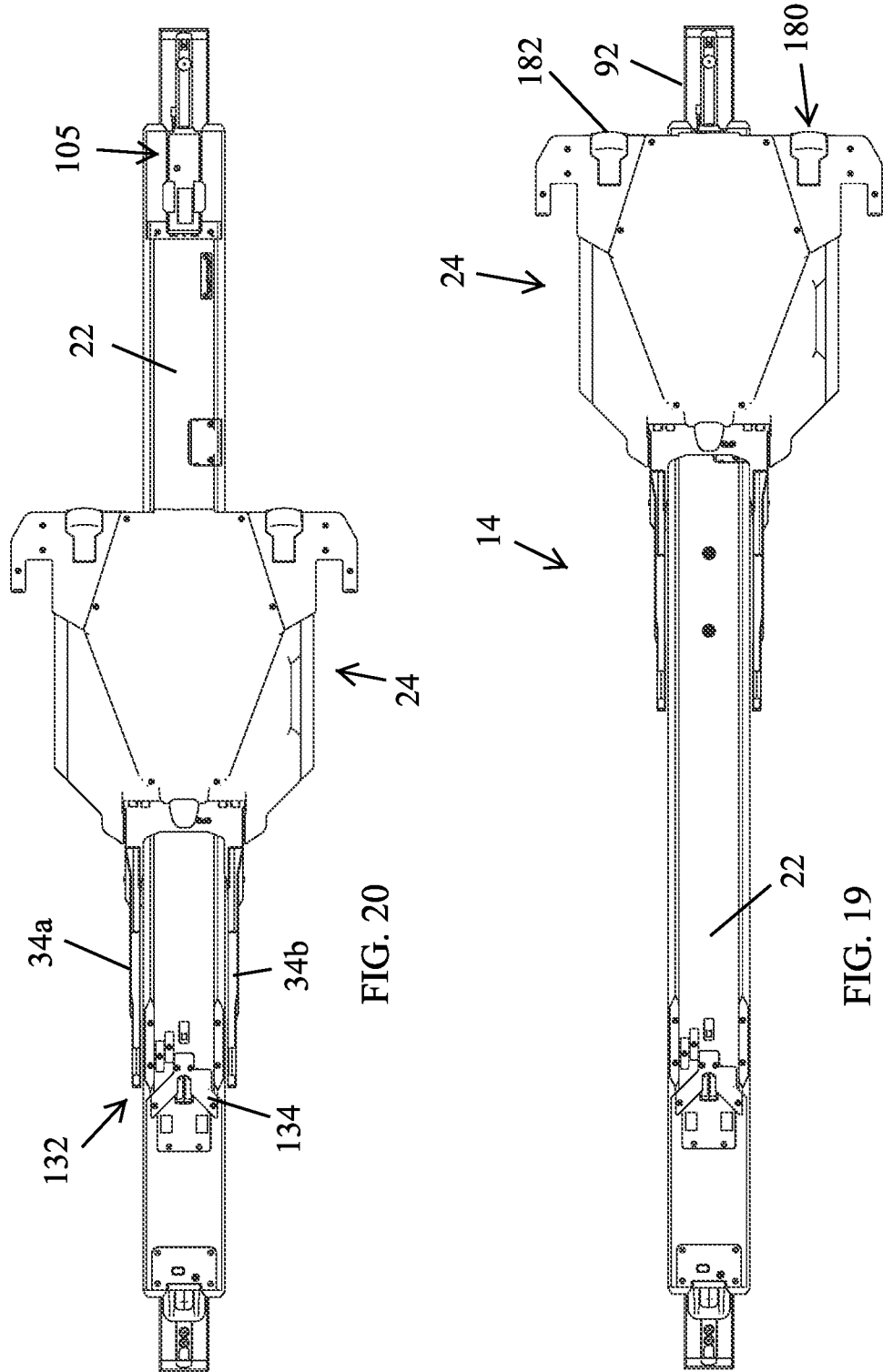

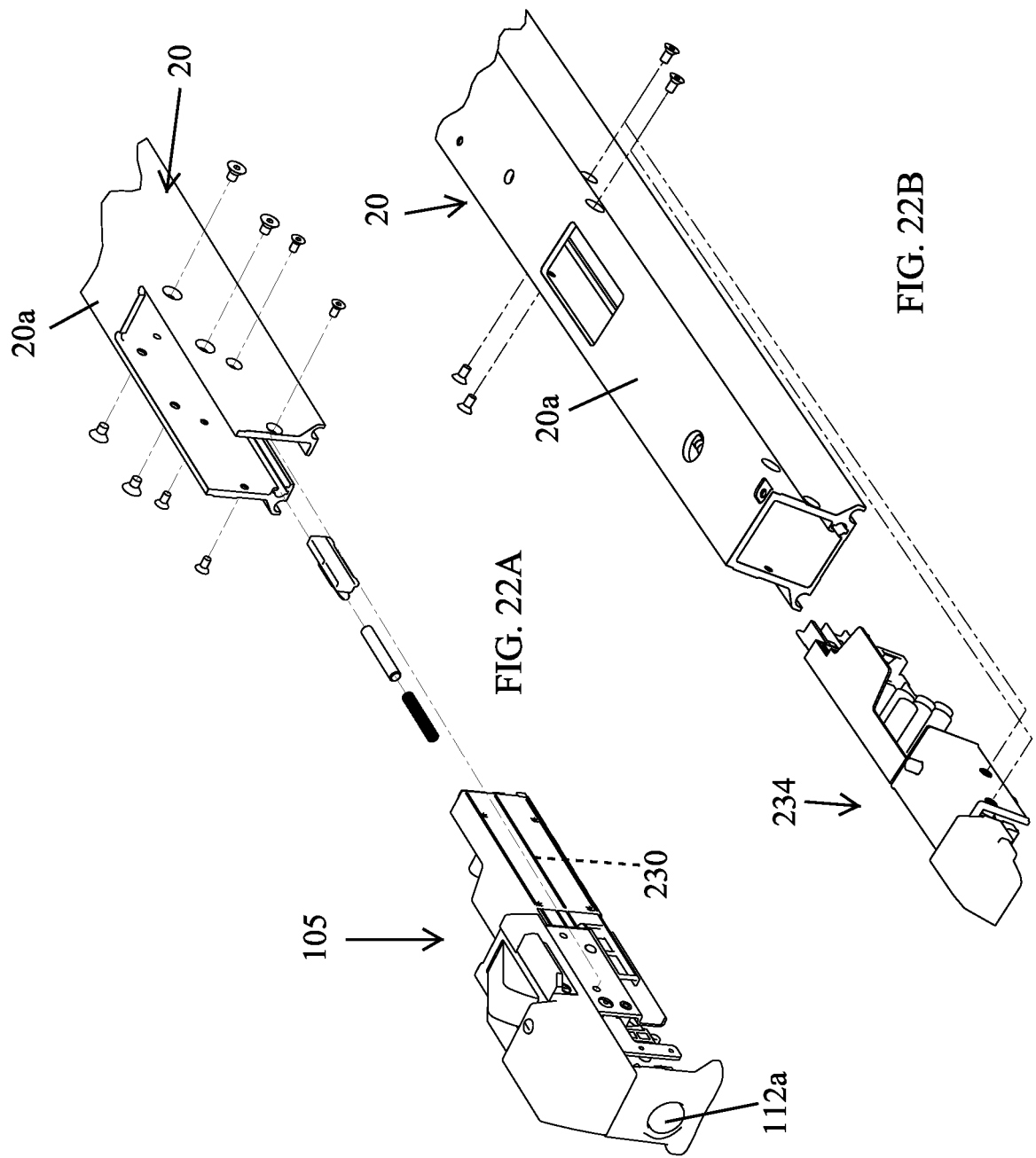

AMBULANCE COT AND LOADING AND
UNLOADING SYSTEM

This application is a continuation application of U.S. patent Ser. No. 17/034,737, (P-269G), filed Sep. 28, 2020, entitled AMBULANCE COT AND LOADING AND UNLOADING SYSTEM, which is a continuation application of U.S. patent Ser. No. 16/205,667 (P-269F), filed Nov. 30, 2018, now U.S. Pat. No. 10,806,647, entitled AMBULANCE COT AND LOADING AND UNLOADING SYSTEM, which is a continuation of U.S. patent Ser. No. 15/253,140 (P-269E), filed Aug. 31, 2016, now U.S. Pat. No. 10,149,791, entitled AMBULANCE COT AND LOADING AND UNLOADING SYSTEM, which is a continuation of U.S. patent Ser. No. 14/630,681 (P-269D), filed Feb. 25, 2015, now U.S. Pat. No. 9,456,939, entitled AMBULANCE COT AND LOADING AND UNLOADING SYSTEM, which is a divisional application of U.S. patent Ser. No. 13/888,654 (P-269C), filed May 7, 2013, now U.S. Pat. No. 8,973,963, entitled AMBULANCE COT AND LOADING AND UNLOADING SYSTEM, which is a divisional application of U.S. patent Ser. No. 12/886,987 (P-269B), filed Sep. 21, 2010, now U.S. Pat. No. 8,439,416, entitled AMBULANCE COT AND LOADING AND UNLOADING SYSTEM, which claims the benefit of provisional application Ser. No. 61/248,654 (P-269A), filed Oct. 5, 2009 entitled AMBULANCE COT AND LOADING AND UNLOADING SYSTEM, and provisional application Ser. No. 61/248,374 (P-269), filed Oct. 2, 2009, entitled AMBULANCE COT AND LOADING AND UNLOADING SYSTEM, which are incorporated herein in their entireties and commonly assigned to Stryker Corporation of Kalamazoo, Michigan.

TECHNICAL FIELD AND BACKGROUND OF THE INVENTION

The present invention relates to an ambulance cot and loading and unloading system and method of loading and unloading a cot into and out of an ambulance.

When loading a cot into an ambulance, an emergency medical service (EMS) attendant typically aligns the cot with the open rear doors of the ambulance and then pushes the cot toward the ambulance so that the head end of the cot is supported at the opening of the ambulance. Once supported at the head end of the cot, the EMS attendant, while supporting the foot end of the cot, raises the legs of the cot so that the cot can then be pushed into the ambulance. However, as noted this typically requires the EMS personnel to support the foot end of the cot and typically until most of the cot is loaded into the ambulance. In some cases, the head end of the cot may need to be lifted before insertion. With this scenario, the assistance of a second attendant is required. The removal process is much the same, except in reverse—namely, the cot is pulled from the opened rear doors of the ambulance, which requires the attendant to support the foot end of the cot while the cot is pulled out of the ambulance. As soon as the folded legs clear the back of the ambulance, the legs can then be lowered. Again, this requires the attendant to support the cot while the cot is being pulled from the ambulance and until the legs can be lowered. This process is strenuous and could expose the EMS personnel to injury especially when dealing with heavy patients.

Accordingly, there is a need to reduce the stress and strain to EMS personnel during the loading and unloading of a cot.

SUMMARY OF THE INVENTION

Accordingly, the present invention provides an ambulance cot and loading and unloading system that can reduce the strain on an EMS attendant during both the insertion and removal of a cot from an ambulance.

In one form of the invention, an ambulance cot loading and unloading apparatus includes a base for mounting to an emergency vehicle deck, a rail mounted for linear movement along the base, and an arm, which is configured to engage a cot, mounted for linear movement along the rail from a retracted position to an extended position. When the rail and arm are extended along said base, the arm is extended from the base in an extended position and is configured for lifting the cot and providing cantilevered support to the cot while in the extended position.

In one aspect, the arm and rail mounting arrangement allows the cot loading and unloading apparatus to occupy less space on the emergency vehicle deck and, moreover, allow the system to be substantially contained within the footprint of the cot once the cot is loaded and fully extended into the vehicle. Further, with the arm and rail mounting arrangement, the arm may be fully extended from the vehicle so that the arm is outside the cargo area of the vehicle, which may provide for a greater range of motion when at its fully extended position.

In another form of the invention, an ambulance cot loading and unloading apparatus includes a base for mounting to an emergency vehicle deck, an arm assembly with an arm, which is configured for engaging a cot, mounted for linear movement along said base, and a drive mechanism configured for raising the arm. The drive mechanism is configured in the presence of an applied force with a first magnitude on the arm to raise the arm at a first speed and in the presence of an applied force with a second magnitude greater than said first magnitude on the arm to raise the arm as a second speed slower than the first speed.

For example, with the variable speed of the arm, the loading and unloading system can raise the arm rapidly when the arm is being moved into position for engaging a cot but then raise the arm at a slower speed when engaged with the cot, which may be more comfortable for the patient.

In another aspect, the drive mechanism may be configured to lower the arm at a faster speed when not loaded and lower the arm at a slower speed when the arm is loaded.

In yet another form of the invention, an ambulance cot and loading and unloading system for an emergency vehicle includes a cot with a cot-based controller and a cot-based user input device in communication with the cot-based controller, a loading and unloading apparatus with a base for mounting to a deck of an emergency vehicle, an arm mounted for linear movement along the base from a retracted position to an extended position and configured to engage the cot, and a drive mechanism for raising the arm for engaging the cot. The system also includes a loading and unloading apparatus-based controller, which is configured for controlling the drive mechanism. When the cot is loaded onto the loading and unloading apparatus the cot-based controller is configured for controlling the drive mechanism and for forming a primary controller for controlling the drive mechanism, with the loading and unloading apparatus-based controller becoming a slave controller to the primary controller.

In one aspect, the cot loading and unloading apparatus further comprises a loading and unloading apparatus-based user input device in communication with the loading and unloading apparatus-based controller. The loading and unloading apparatus-based user input device is configured to allow control of the drive mechanism even when the cot is loaded onto the loading and unloading apparatus to thereby provide redundant controls.

According to another aspect, the cot loading and unloading assembly has a latch for engaging the cot, with the cot-based controller configured for controlling the latch when the cot is loaded on to the loading and unloading system and engaged with the latch.

In further aspects, the cot may also include a communication device for communicating with a communication device on the loading and unloading apparatus. For example, the communication devices may be wireless, such as radio frequency (RF) devices, inductive devices, acoustic devices, optical devices or infrared devices.

Accordingly, the present invention provides a cot loading and unloading system that facilitates the loading and unloading of a cot to and from an ambulance. These and other advantages will become more apparent to one of ordinary skill in the art upon reading the following specification and inspecting the accompanying drawings, which follow.

BRIEF DESCRIPTION OF THE DRAWINGS

FIG. 19 is a plan view of the loading and unloading apparatus with the trolley and the transfer track moved to their fully retracted stowed positions;

FIG. 20 is a similar view to FIG. 19 with the trolley extended along the transfer track;

FIG. 22A is an exploded perspective view of the mounting arrangement of the trolley latch assembly mounted to the base;

FIG. 22B is an exploded perspective view of the mounting of the primary coil at the cot anchor location along the base of the inductive recharging system;

DETAILED DESCRIPTION OF THE PREFERRED EMBODIMENT

Figure 1:
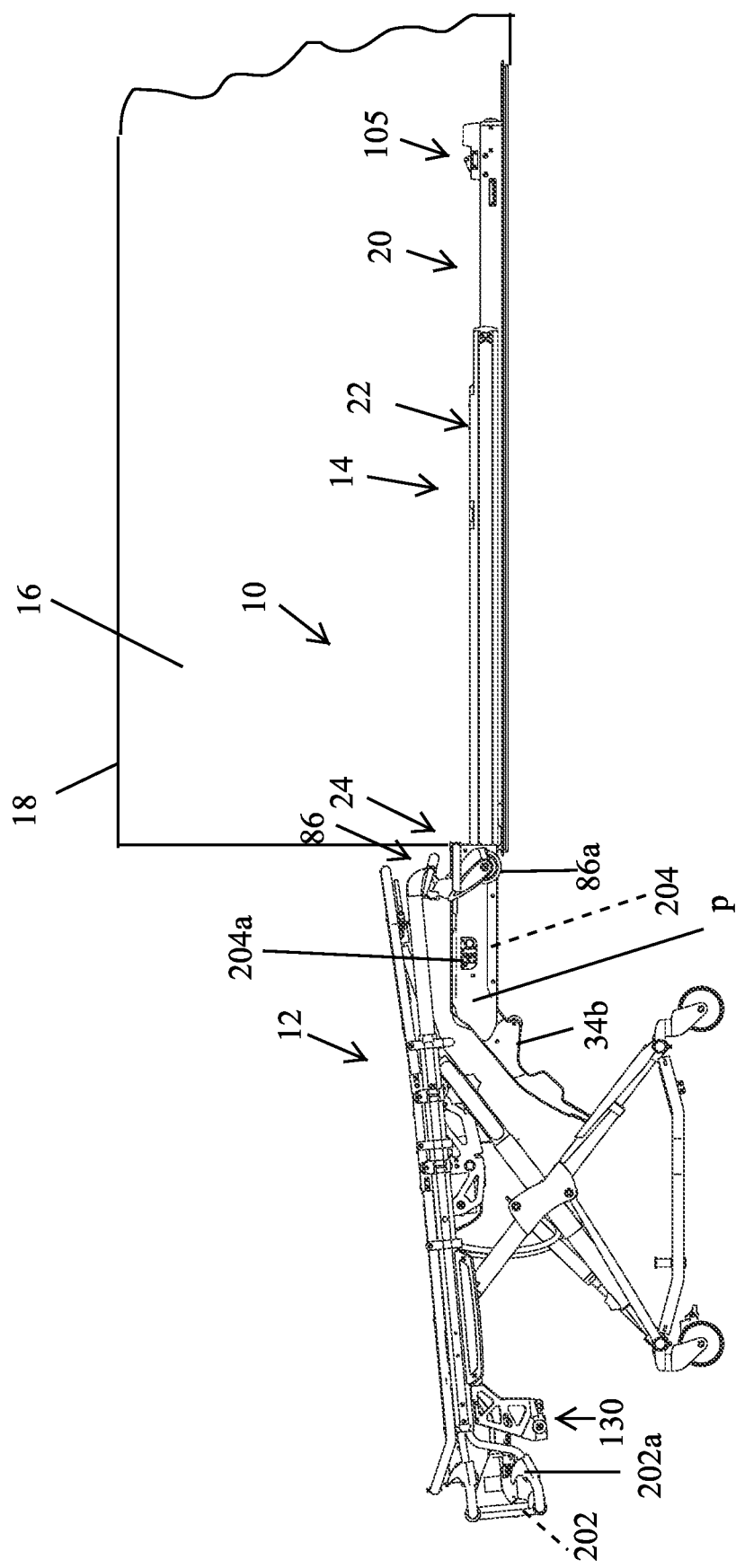
FIG. 1 is a side elevation view of a cargo area of an ambulance with an ambulance cot loading and unloading apparatus of the present invention mounted therein illustrating the loading and unloading apparatus in a deployed configuration.

Referring to FIG. 1, the numeral 10 generally designates an ambulance cot and loading and unloading system of the present invention. System 10 includes an ambulance cot 12 and a cot loading and unloading apparatus 14, which is configured for mounting in the cargo area 16 of an ambulance 18. As will be more fully described below, cot loading and unloading apparatus 14 is configured to assist in the loading or unloading of a cot into or out of ambulance 18 by providing cantilevered support to the cot either before the cot is loaded into the ambulance so that as soon as the cot is engaged and lifted by the loading and unloading apparatus the collapsible legs or base of the cot can be folded and the cot loaded into the ambulance or when the cot is being unloaded. By cantilevered support it is meant that an attendant need not provide any significant vertical support to the cot and instead need only simply guide and push or pull the cot into or out of the ambulance once it is supported by the loading and unloading apparatus.

As best seen in FIGS. 1-4, cot loading and unloading apparatus 14 includes a base 20, which is mounted in the cargo area of the ambulance, and a transfer track 22, which is mounted on the base. Cot loading and unloading apparatus 14 also includes a trolley 24, which is mounted on the transfer track for movement therewith along the base. As will be more fully described below, in one aspect, the track 22 and trolley 24 are configured to provide a nested rail arrangement to provide greater extension of the trolley from the emergency vehicle. Additionally, the nested rail arrangement is provided with at least one latch and more optionally, a series of latches that couple the track to the base and allow the trolley 24 to move along the track and thereafter release the track so it too can move with the trolley relative to the base to thereby fully extend the trolley from the vehicle (FIG. 1). As best seen in FIG. 1, in this configuration arms 34a and 34b pivot about a pivot axis P that is outside the ambulance, which allows arms 34a and 34b to have a greater range of motion. As previously noted, once the cot is loaded onto trolley 24 and the arms 34a, 34b lift the cot, the collapsible base of cot 12 is collapsed and trolley 24 along with cot 12 can be pushed along the base with head end wheels 86a straddling base 20.

Figure 21:
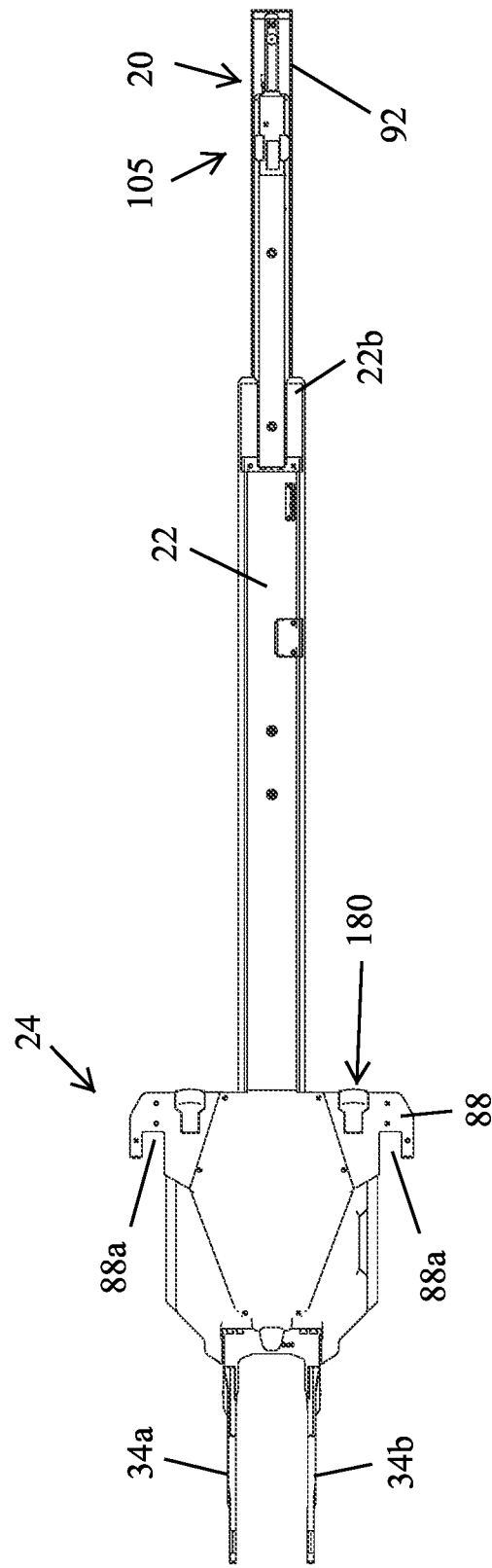
FIG. 21 is a similar view to FIGS. 19 and 20 with the trolley and track moved to their fully extended deployed positions.
Figure 21A:
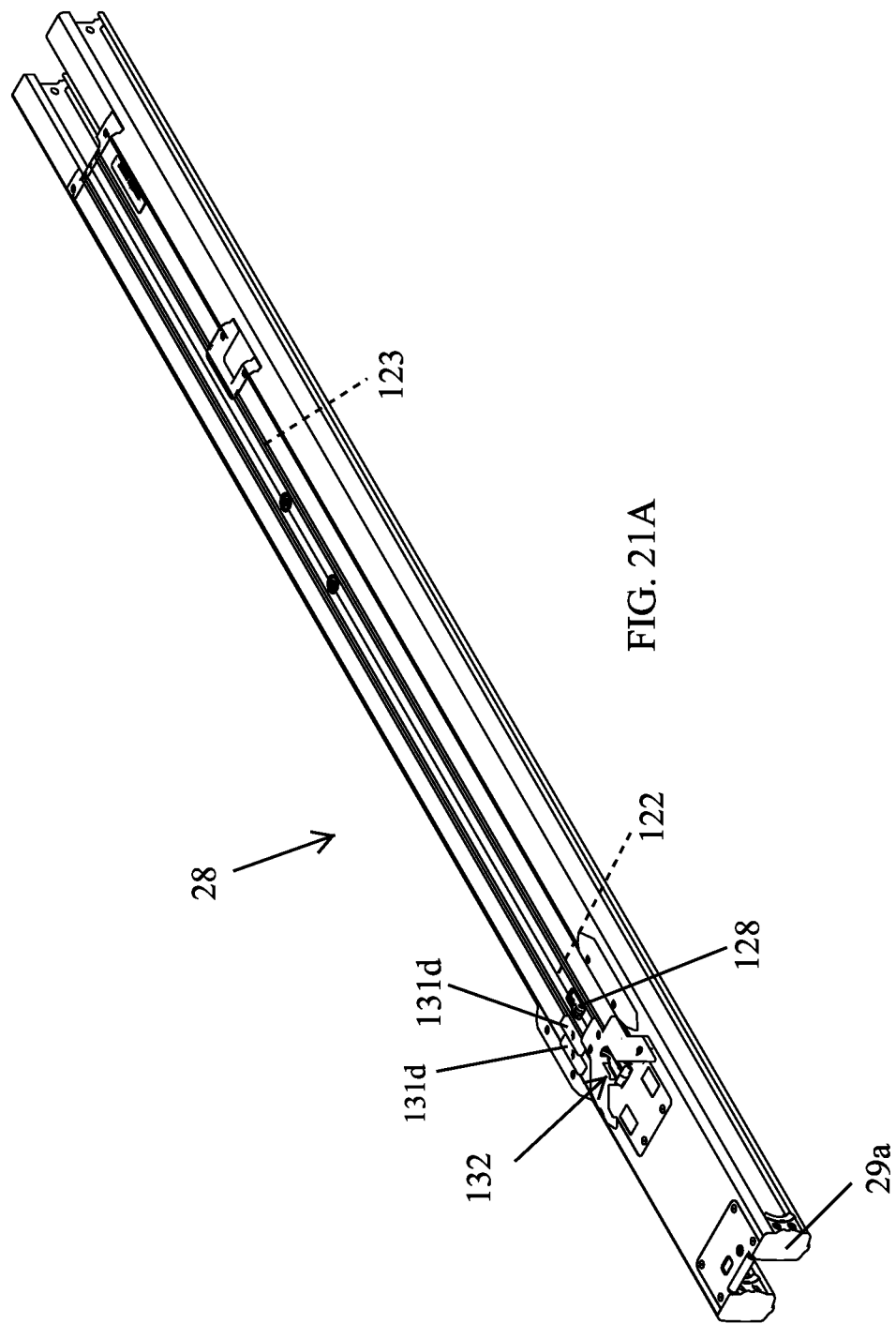
FIG. 21A is a perspective view of the transfer track.
Figure 21B:
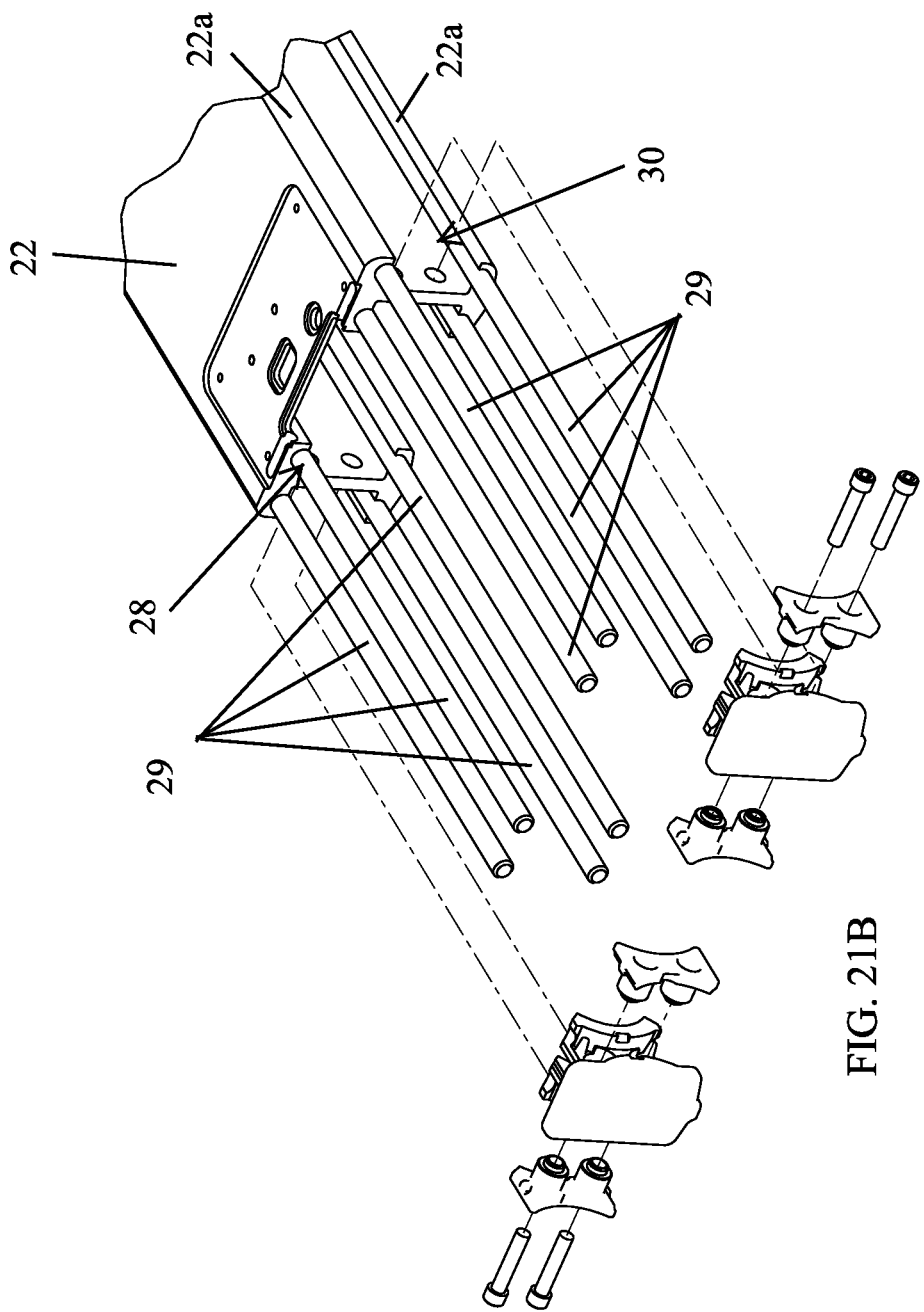
FIG. 21B is an exploded perspective view of the foot end of the transfer track.
Figure 22:
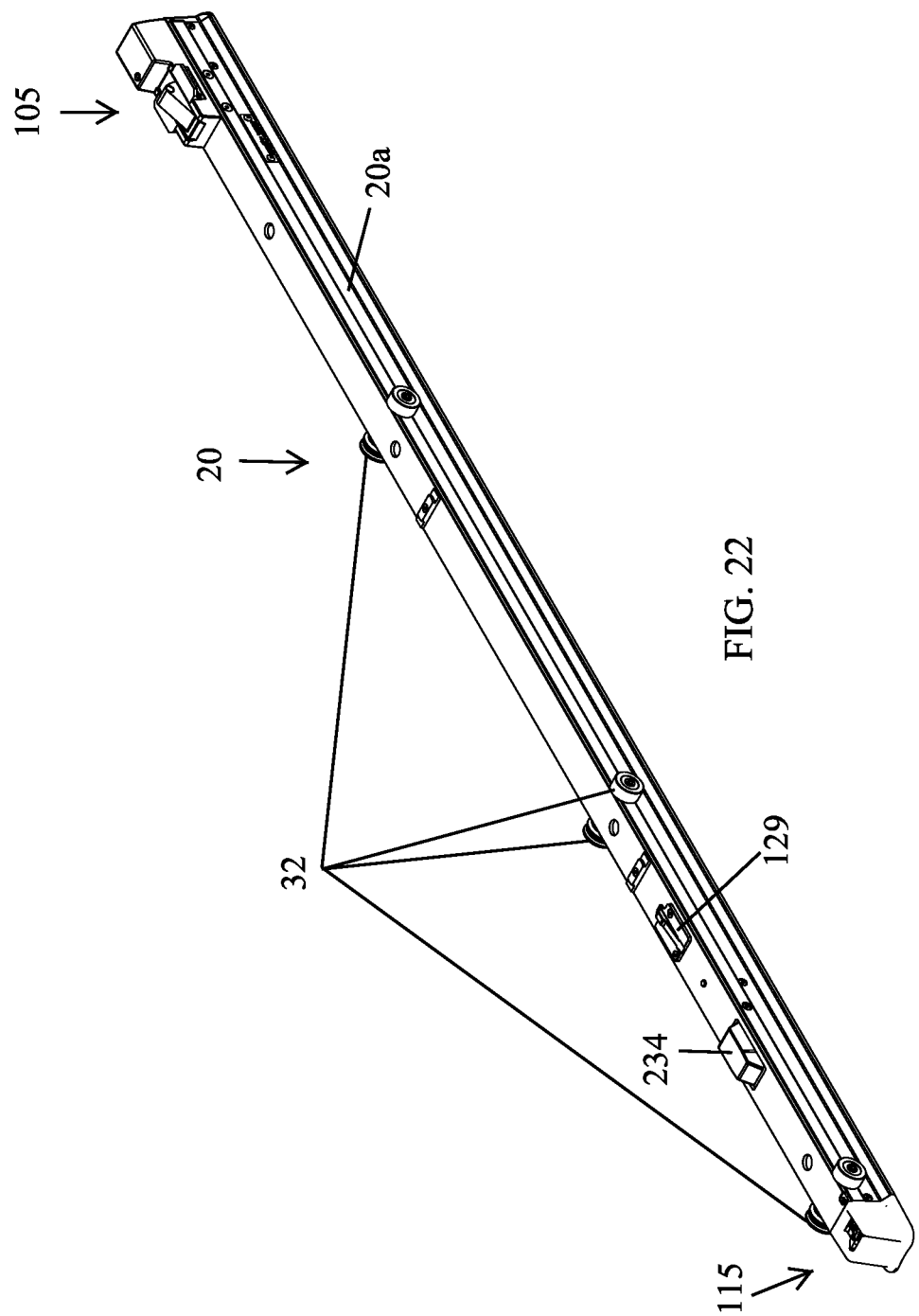
FIG. 22 is a perspective view of the base of the loading and unloading apparatus.
Figure 22C:
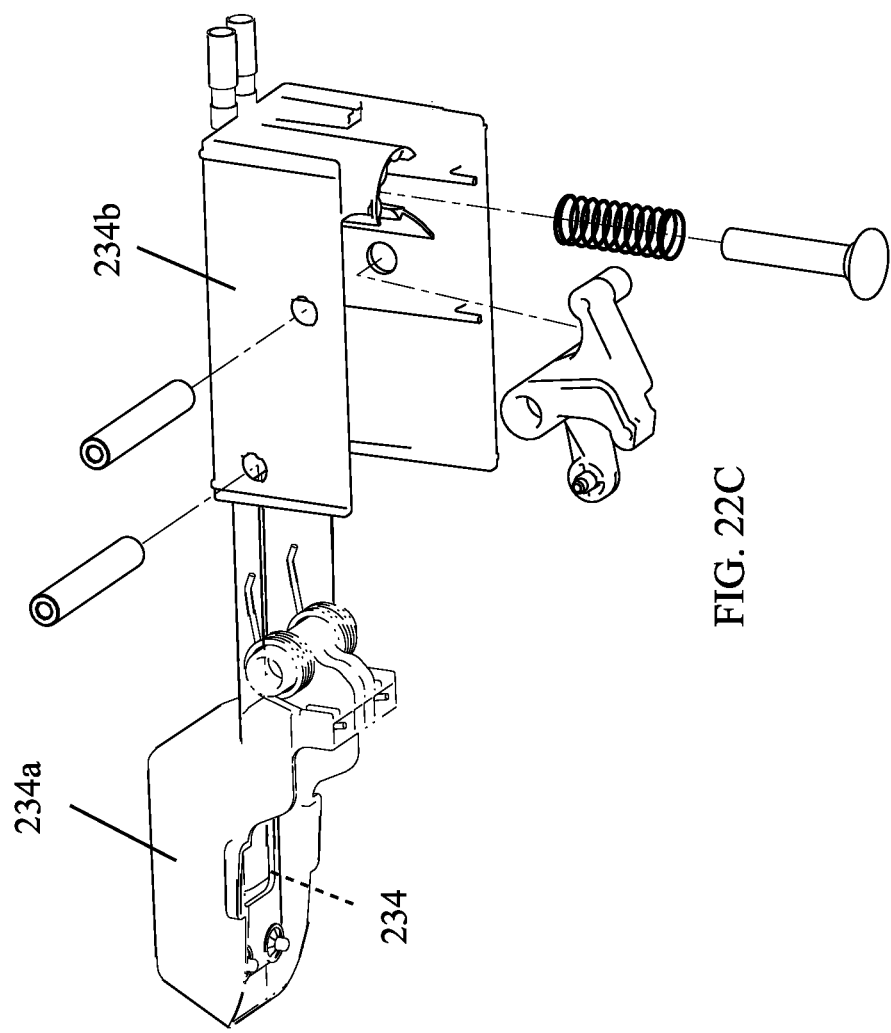
FIG. 22C is an exploded perspective view of the primary coil mounting bracket.

Referring to FIG. 22, base 20 is formed from an extrusion, such as aluminum extrusion, which is anchored to the cargo area by a sub-anchor assembly 26, described more fully below. As best seen in FIGS. 19-21, transfer track 22 forms inner rails 28 and outer rails 30, described more fully in reference to FIG. 21B. Track 22 is also formed from an extrusion and straddles base 20 and, further, is guided on base 20 by bearings 32, such as rollers or wheels, which are mounted to base 20 and which ride along inner rails 28. As best seen in FIG. 21B, inner rails 28 and outer rails 30 are formed by a plurality of rods 29 mounted at inner and outer arcuate flanges 22a formed in track 22, which are captured therein by end caps 28b. Rods 29 provide a bearing surface for bearings 32 on base 20 and also for the bearings of trolley 24 described below.

The underside of trolley 24 forms an inverted channel, which straddles track 22 and is mounted to track 22 by a plurality of bearings 104, such as wheels or rollers, that ride along outer rails 20 until bearings 104 reach end caps 28b, which form the stops at the end of track 22. When trolley 24 reaches the end of track 22, trolley 24 is adapted to disengage the latch (described below in reference to FIG. 27) that anchors the position of track 22 along base 20 so that thereafter track 22 rides along base 20 along with trolley 24 to an extended position as shown in FIG. 19 and FIG. 1. Thus, when trolley 24 is fully extended along track 22 and track 22 is fully extended along base 20, trolley 24 extends from track 22 beyond base 20 (see FIG. 1). In this manner, trolley 24 can be extended from the ambulance cargo area and further extended from the ambulance.

Figure 11:
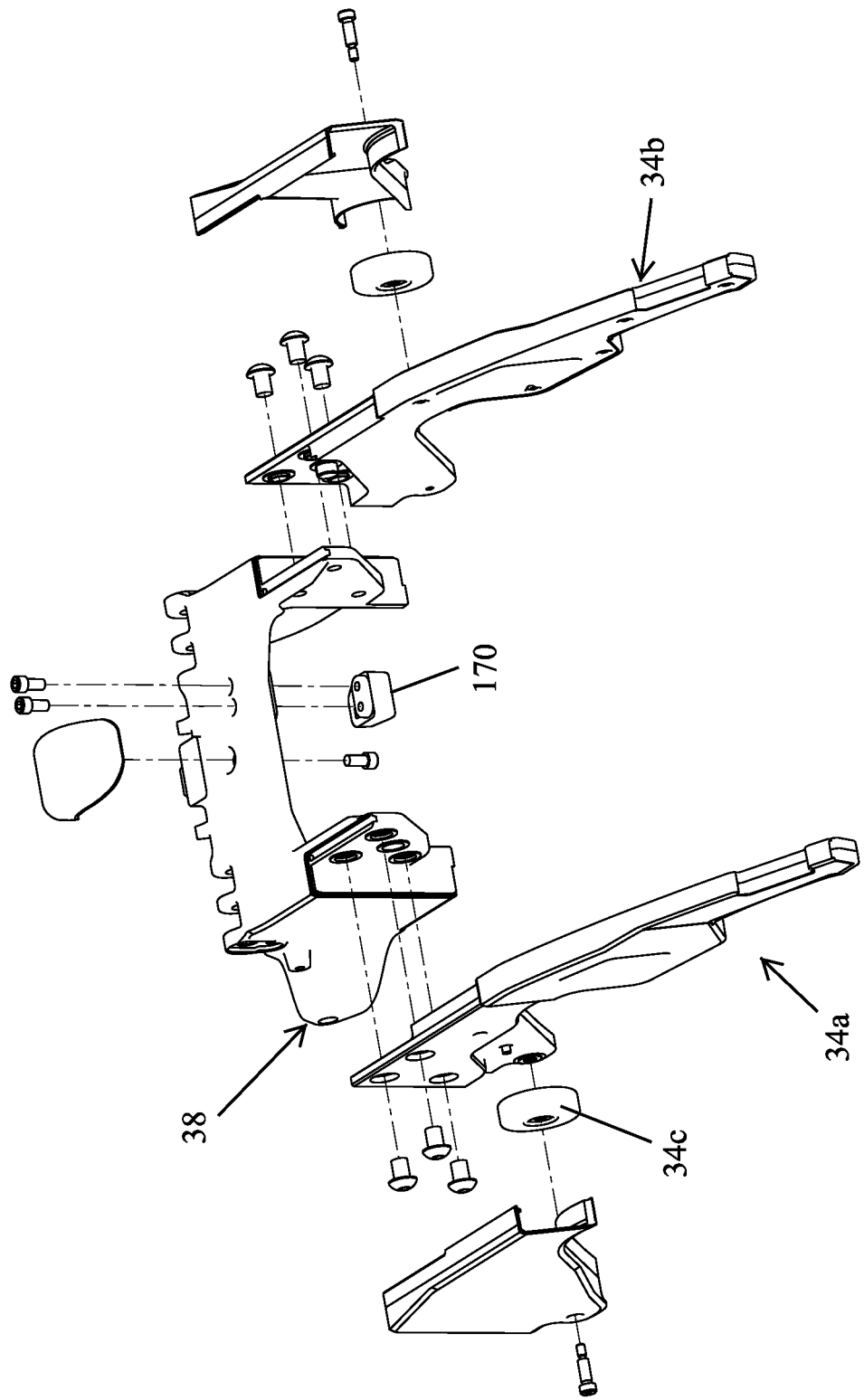
FIG. 11 is an enlarged exploded perspective view of the arm assembly of the trolley.
Figure 12:
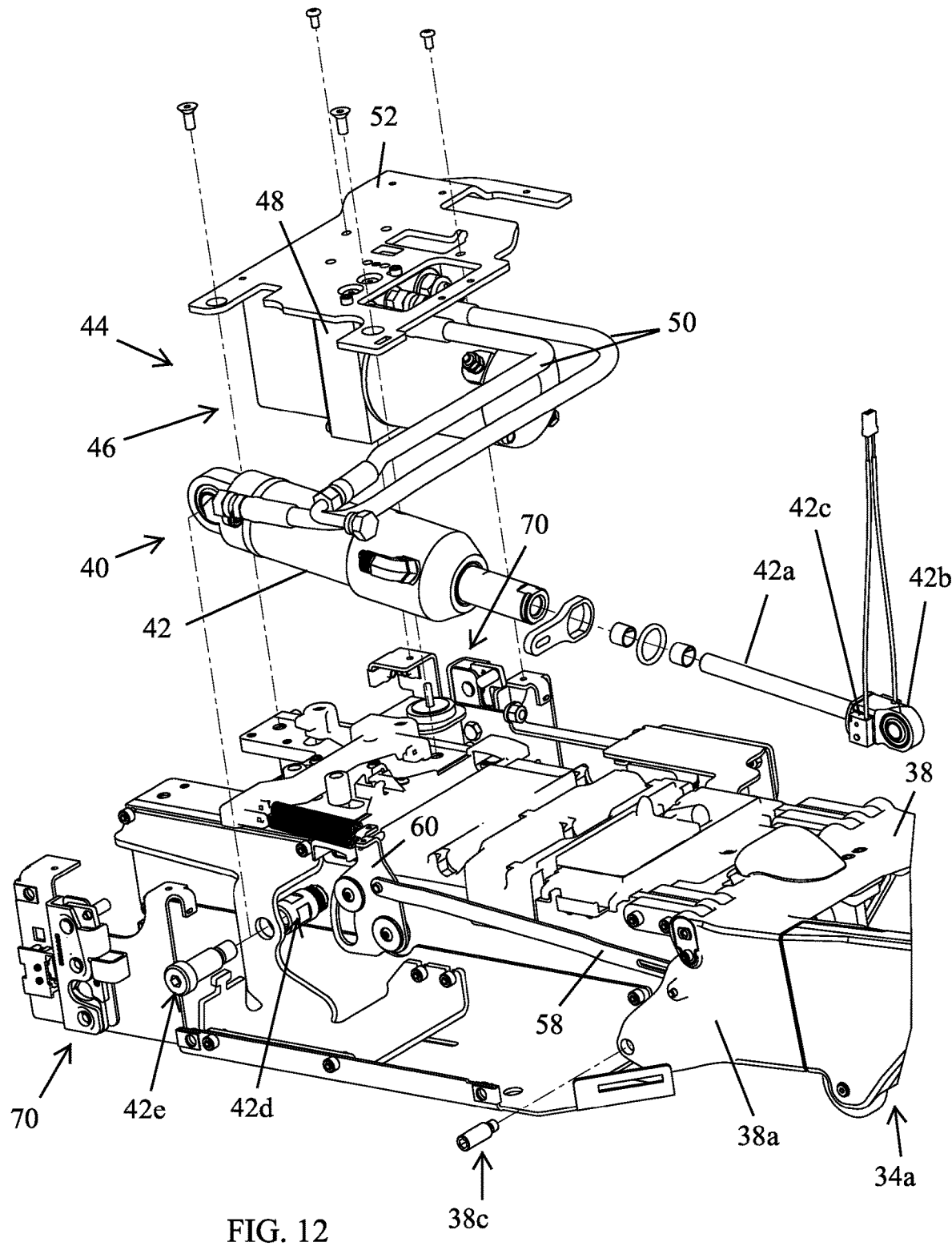
FIG. 12 is a partial exploded perspective view of the drive mechanism and the mounting arrangement of the arm assembly.

To engage cot 12, trolley 24 includes an arm assembly 34 with a pair of cantilevered of arms 34a, 34b and a trolley frame 36 to which arm assembly 34 is mounted for pivotal movement by a transverse member 38. Arms 34a, 34b are pivoted between a lowered, pre-engaged position (FIG. 1), a raised cot engaged position (shown in FIG. 2), and non-deployed or stowed position (FIG. 20) by a drive mechanism 40 (FIG. 12). Further, as will be more fully described below, when trolley 24 is in its stowed configuration with arms 34a, 34b in a generally horizontal arrangement, arm assembly 34 is adapted to releasably engage track 22 so that trolley 24 is releasably anchored to track 22. Further, as will be more fully described below, when an attendant raises arms 34a, 34b the attendant can release this engagement and move trolley 24 along track 22 to position trolley 24 anywhere along track 22. Thus, an attendant may position trolley 24 toward the rear of the cargo area just inside the ambulance doors for quick deployment, thus eliminating the need for the attendant to climb into the cargo area to retrieve the trolley. To facilitate movement of trolley 24 and provide support to the arm when the arms are moved along the cargo area deck (when the arms are in the generally horizontal arrangement), arms 34a, 34b optionally include rollers 34c (FIG. 11) for rolling on the cargo deck outwardly of track 22 and base 20.

In the illustrated embodiment, as will be more fully described below, drive mechanism 40 is configured to raise arms 34a, 34b at a first speed when the arms are deployed, but not loaded by an applied force, for example when not loaded with a cot, but is configured to raise the arms (34a, 34b) when in their deployed position at another, slower speed or speeds when the arms are loaded with an applied load, for example when engaged with and lifting a cot. For example, the slower speed at which the arms are raised may be variable or may have two or more discrete speeds for specific ranges of motion. Further, drive mechanism 40 may be configured to lower the arms 34a, 34b at a first speed when the arms are not subject to an applied load, e.g. not lifting a cot, but to lower the arms at another slower speed or speeds if the arms are subject to an applied load, e.g. lifting a cot. Alternately, the drive mechanism may be configured to raise or lower the arms at a slower speed only when the arms are loaded with a weight that exceeds the weight of a cot, for example, when a cot is supporting a patient. Optionally, the arms could be moved (raised or lowered) at one speed when fully unloaded, another slower speed when loaded with a cot, and yet another even slower speed or speeds when the arms are moving (lifting or lowering) a cot that is supporting a patient.

Referring again to FIG. 12, drive mechanism 40 is mounted to trolley frame 36 and, in the illustrated embodiment, comprises a hydraulic drive mechanism, namely a hydraulic cylinder 42 and a hydraulic power unit 44. Hydraulic power unit 44 includes a motor 46, a pump (built in motor housing), a manifold 48, and a reservoir which are in fluid communication with cylinder 42 via tubing 50. Optionally, hydraulic power unit 44 is mounted to frame 36 by a mounting plate 52. Actuation of hydraulic power unit 44 is controlled by a control system 200, described more fully below.

Figure 9:
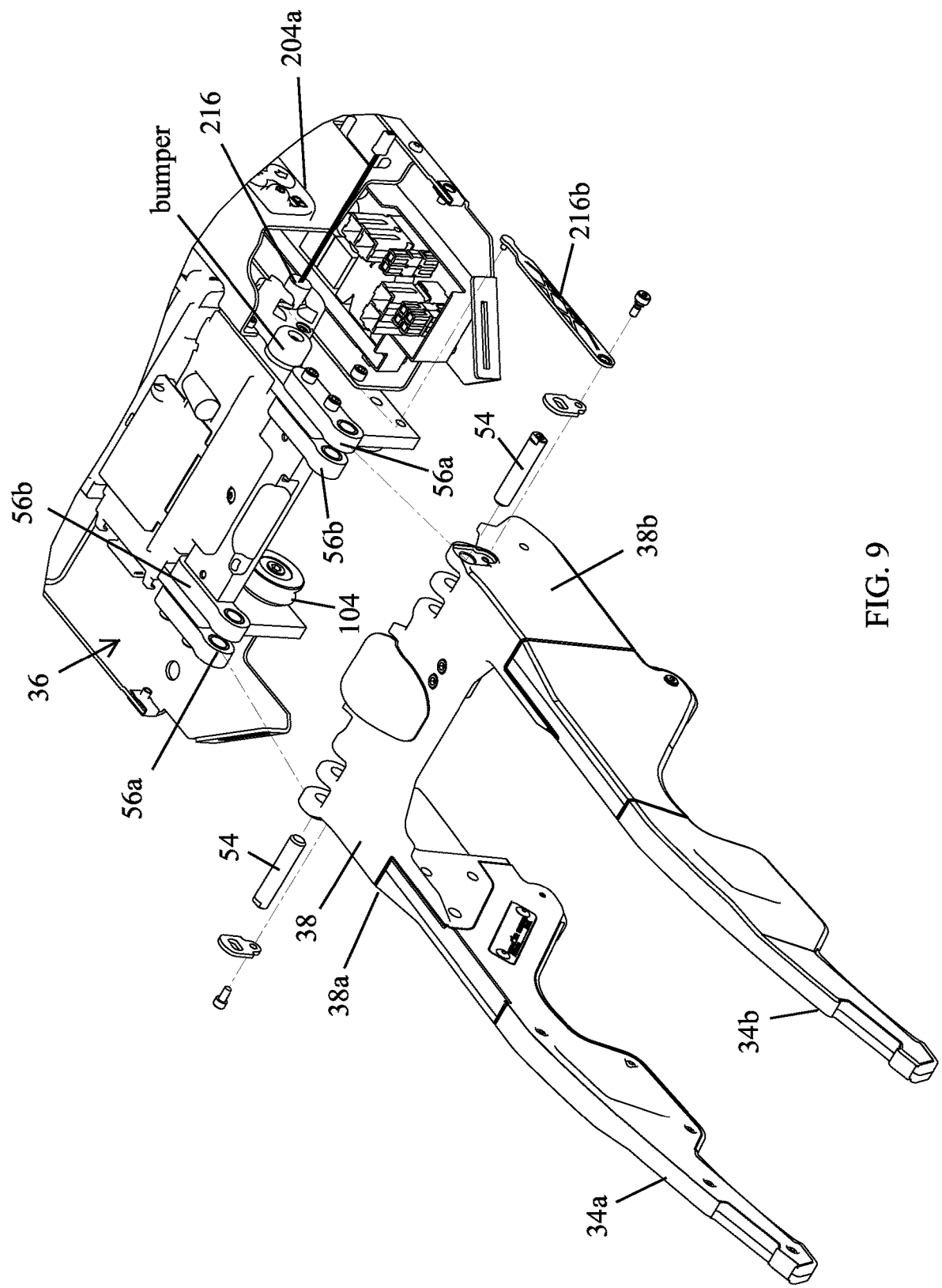
FIG. 9 is an enlarged partial exploded perspective view of the trolley of FIG. 8 with the cover removed for clarity.

Referring to FIG. 9, transverse member 38 mounts arms 34a, 34b to frame 36 by a pair of pivot pins 54, which mount transverse member 38 to two pairs of spaced apart hinge plates 56a, 56b, which are fixed to frame 36 by a plurality of fasteners. In this configuration, outer most sides 38a, 38b of transverse member 38 straddle that portion of the frame so that, as will be more fully described below, sides 38a, 38b will be accessible as mounting surfaces for controlling the motion of the arms and also detecting the motion of the arms.

Figure 2:
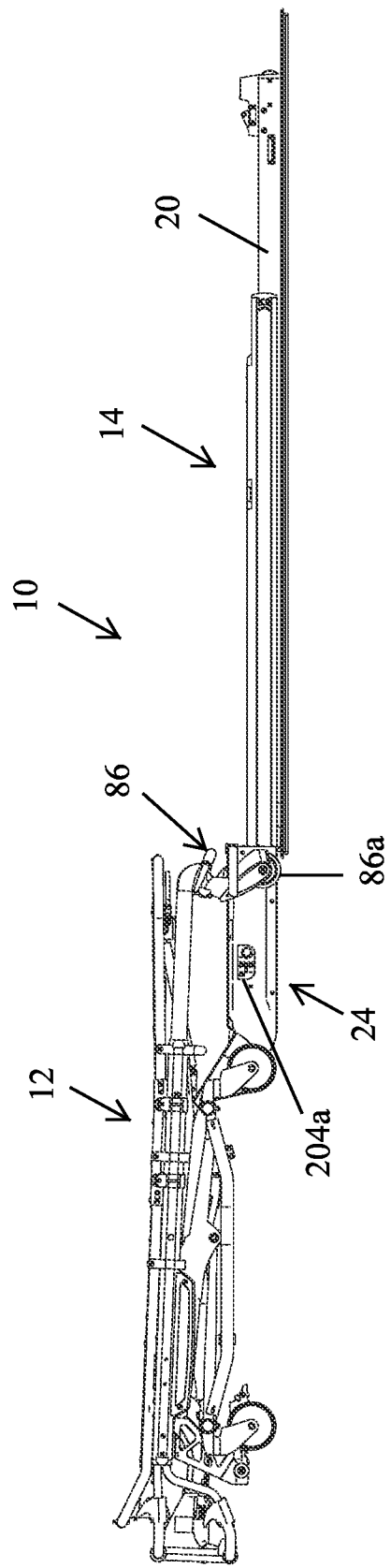
FIG. 2 is a view similar to FIG. 1, but with the ambulance cot loading and unloading apparatus lifting an ambulance cot.
Figure 11A:
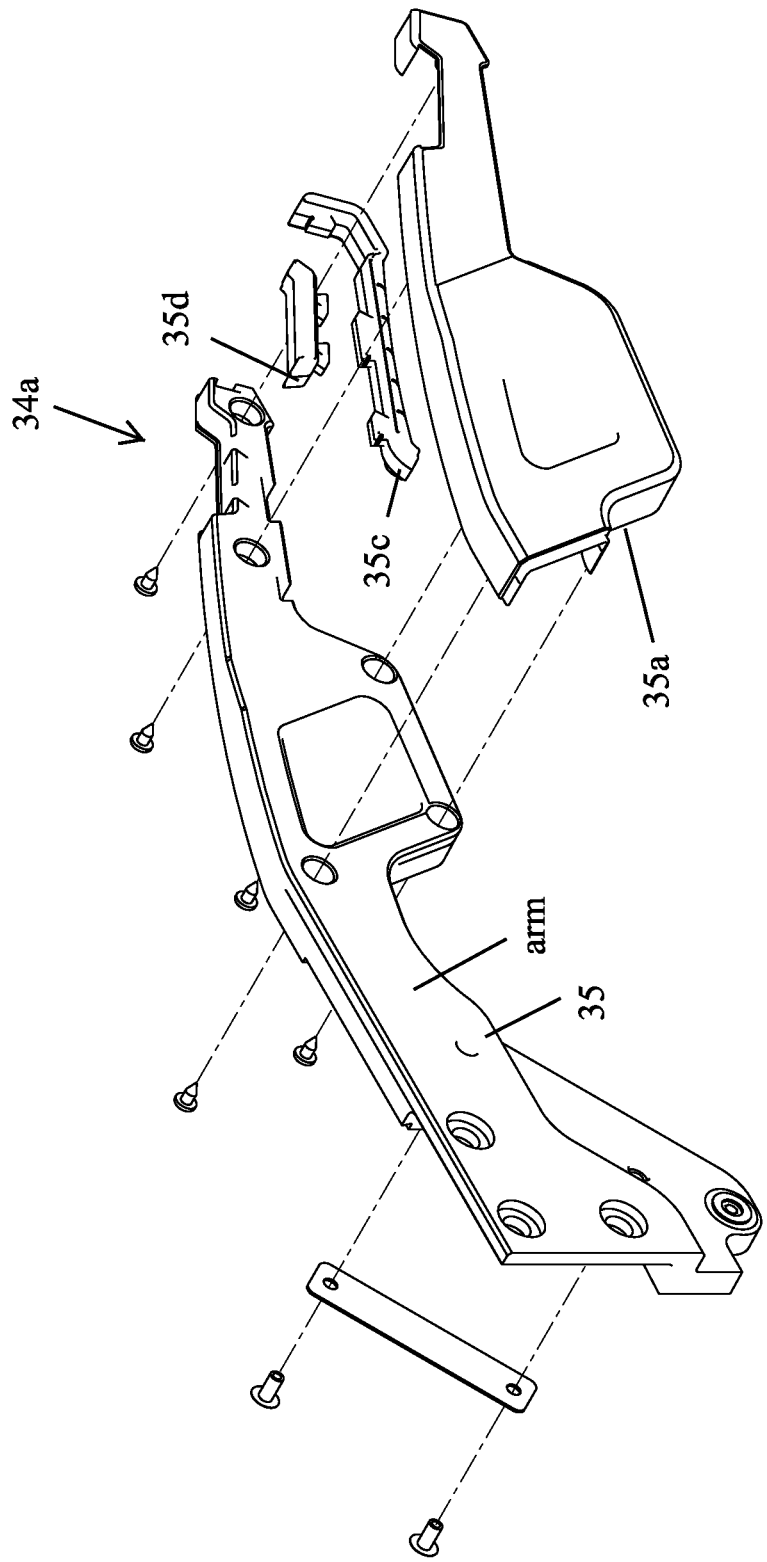
FIG. 11A is an enlarged exploded perspective view of one arm of the arm assembly.

Referring to FIG. 11A, each arm 34a, 34b can be formed from a plate 35, such as a metal plate, that is at least partially covered by a cover 35a. Covers 35a may be formed from a polymer material, such as a reinforced nylon. The underside of arms 34a, 34b may include hand grips 35b, for example formed from a polymer or an elastomeric material, that mount to plate 35 by tabs formed in the grip that mate with recesses formed in plate 35. Further, the upper side of each arm 34a, 34b may include a pad, also formed from an elastomeric material, which provides the bearing surface for engaging the cot. As best seen in FIG. 2, when deployed, arms 34a, 34b can be extended into the head end of the cot to support the cot by bearing on a transverse frame member of cot 12. For other details of cot 12 not provided herein, reference is made to U.S. Pat. Nos. 7,540,547 and 5,537,700, which are incorporated by reference herein in their entireties.

As best seen in FIG. 12, rod 42a of cylinder 42 includes a bushing 42b on its rod end and also a switch 42c, which is used by control system 200 to determine the load on the arms. Bushing 42b is connected to outer side 38a of transverse member 38 by a pin 38c, such as a clevis pin, with the other end of cylinder 42 mounted to frame 36 by a pivot 42d, which in turn is secured to frame 36 by a fastener 42e. A return spring may also be provided that is mounted on one end to the frame and at another end to the arm assembly, which provides a counter balancing force to the cylinder to reduce the load on the cylinder when the hydraulic mechanism is actuated to raise arms 34a and 34b and also slow the lowering of arms 34a, 34b when the release button described below is actuated.

Figure 13:
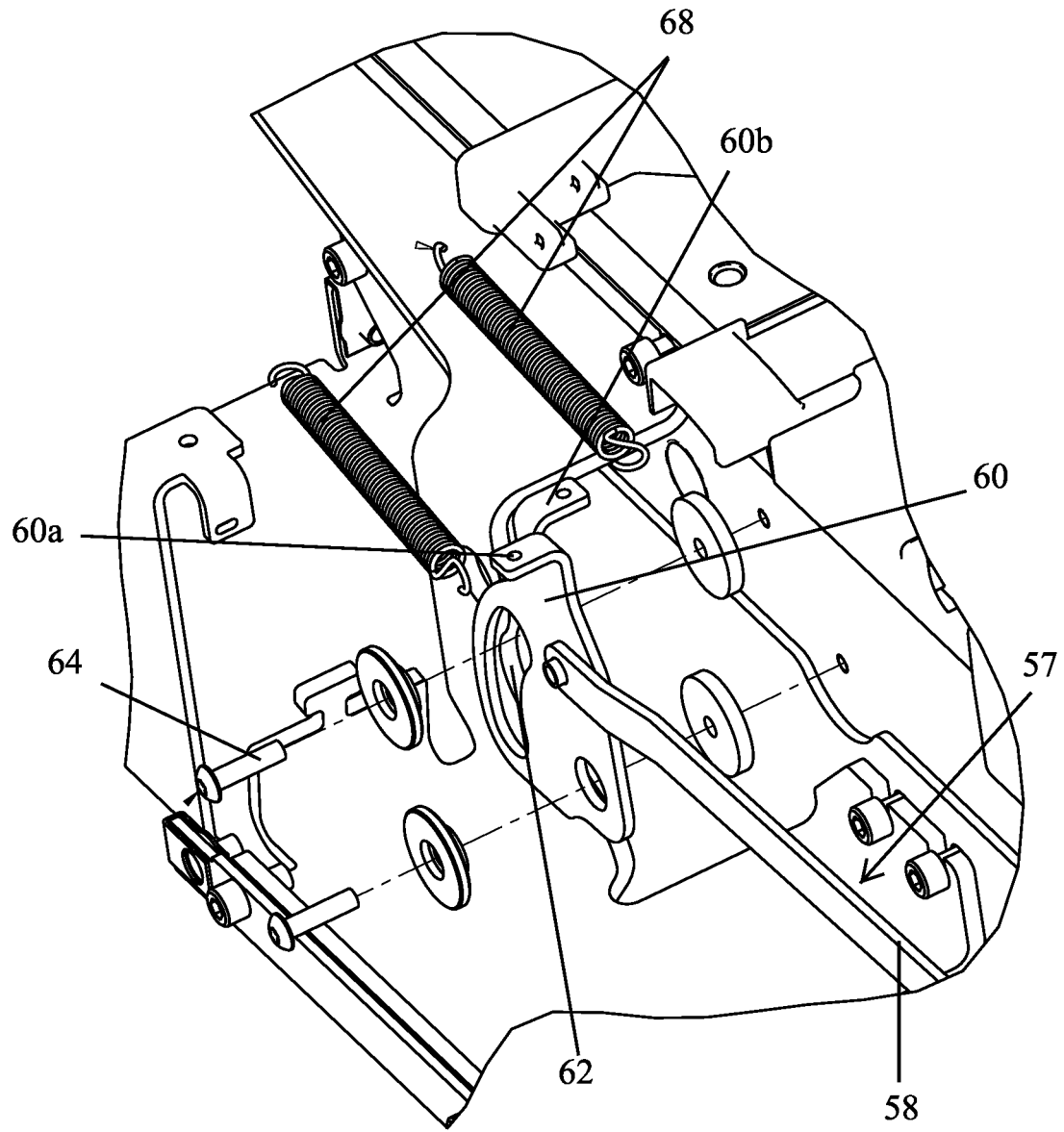
FIG. 13 is a partial enlarged perspective view of the arm assembly linkage.
Figure 14:
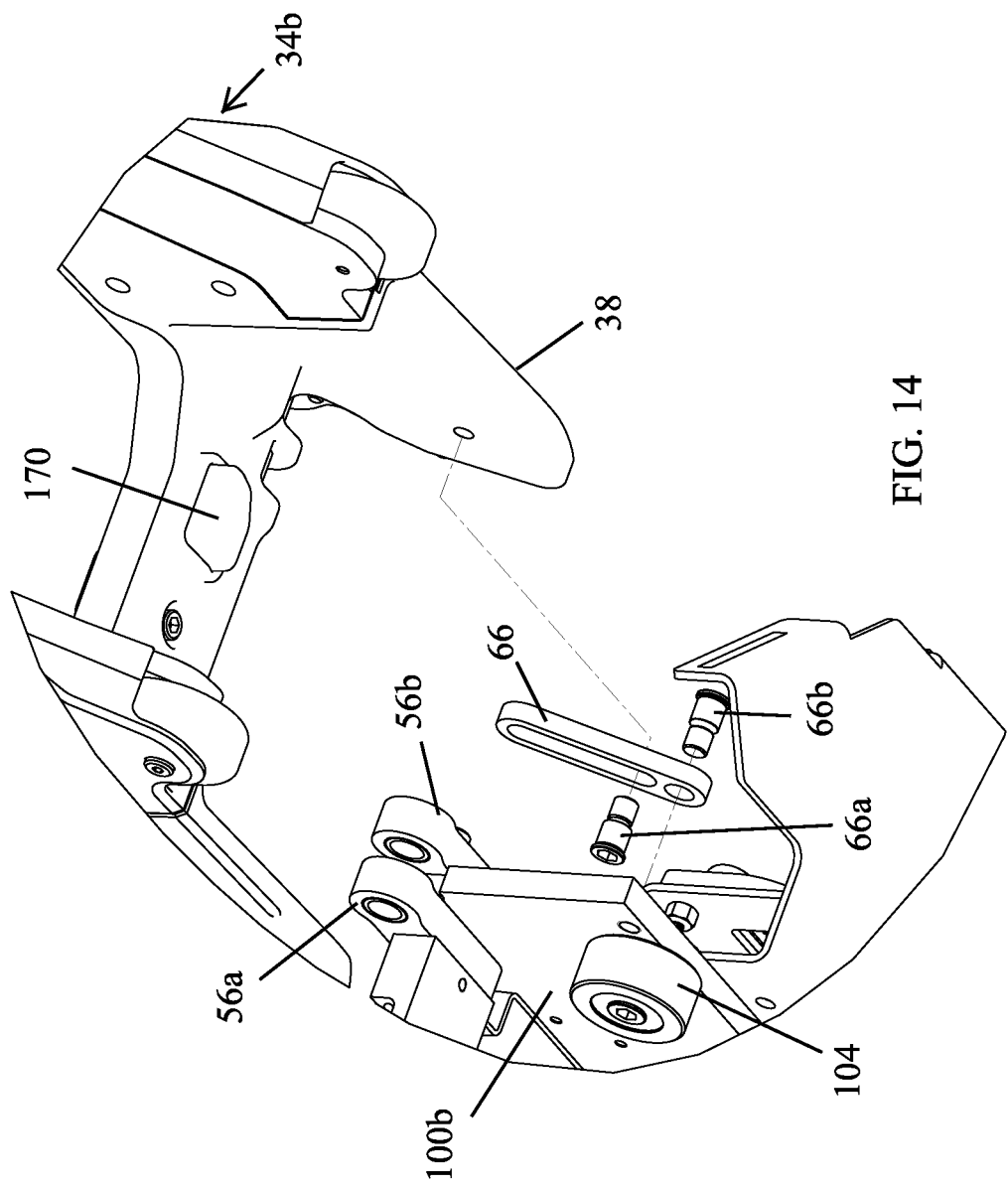
FIG. 14 is a bottom perspective view of the mounting arrangement of the arm assembly to the trolley frame.

To limit the travel of arms 34a and 34b, transverse member 38 is also coupled to a linkage assembly with a link 58 (FIGS. 12 and 13) and a guide plate 60, which is pivotally mounted to frame 36. Plate 60 includes a lobe-shaped opening 62 through which a guide pin 64 extends, which defines the upper and lower limits of the motion of arms 34a, 34b. Additionally, to provide further control over the movement of arms 34a and 34b, a second slotted guide link 66 (FIG. 14) may be provided that is pivotally mounted on one end to frame 36 by a pivot pin 66b and to transverse member 38 at its opposed end by a guide pin 66a.

Referring again to FIG. 12, plate 60 may also include tabs 60a, 60b for mounting springs 68, which couple to a linkage 69 for actuating a release bar 69a for the anchor for transfer track 22, described more fully below. Linkage 69 is mounted to a plate 69b, which in turn is mounted to frame 36, between a pair of stops 69c. Stops 69c support release bar 69a below plate 69b in slotted openings to allow release bar 69a to move linearly with respect to the longitudinal axis of transfer track 22 and base 20. Linkage 69 is further coupled to a third spring 69d, which biases the linkage 69 to urge release bar 69a toward the head end of the track and base. When arms 34a, 34b are raised, for example to lift a cot, springs 68 will overcome the biasing force of spring 69d to move release bar forward or to the foot end of transfer track 22 and base 20, which will cause release bar 69a to unlatch the anchor between transfer track 22 and base 20, more fully described below.

Figure 10:
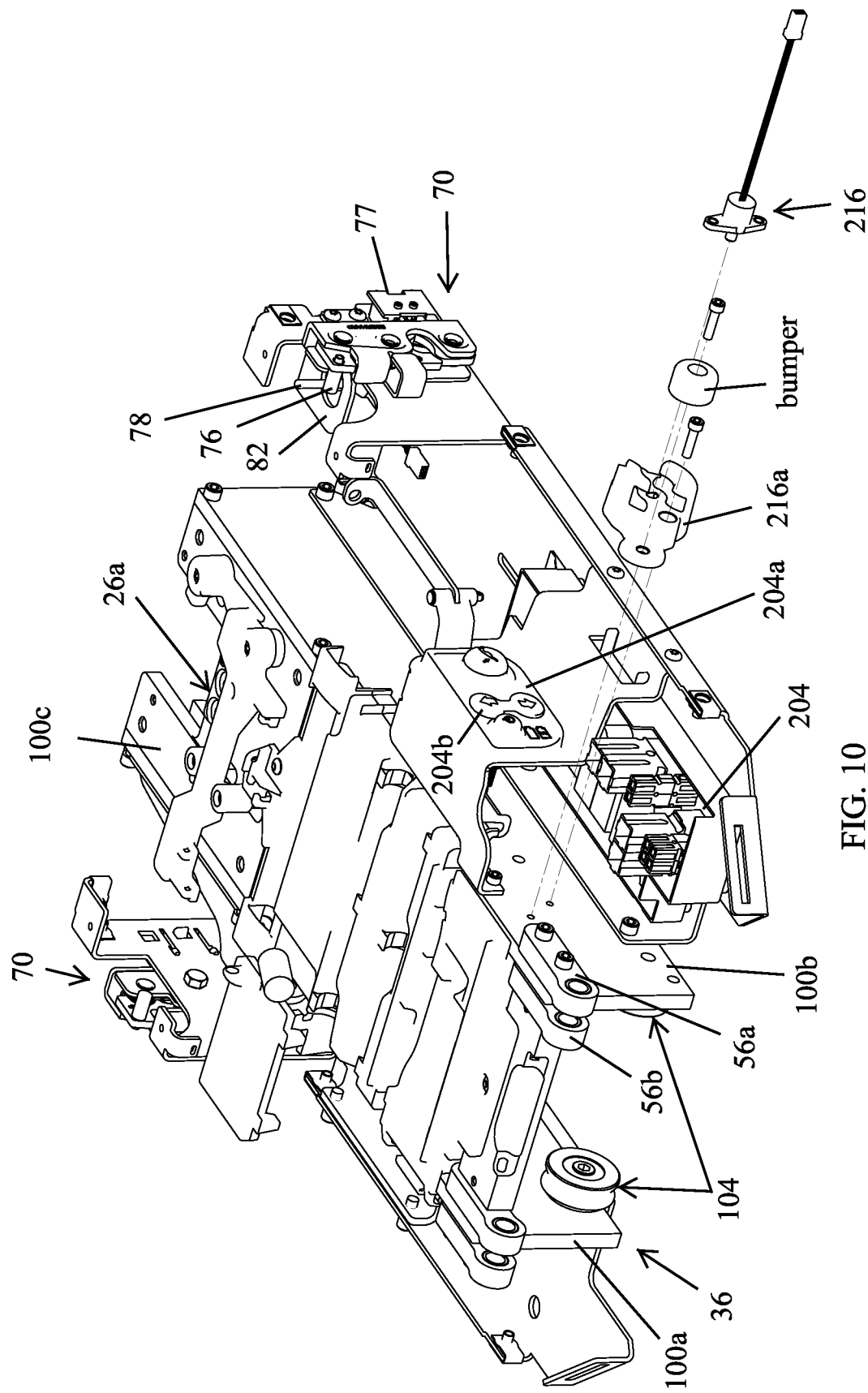
FIG. 10 is another partial exploded perspective view of the trolley of FIG. 9 with the arm assembly removed for clarity.
Figure 10A:
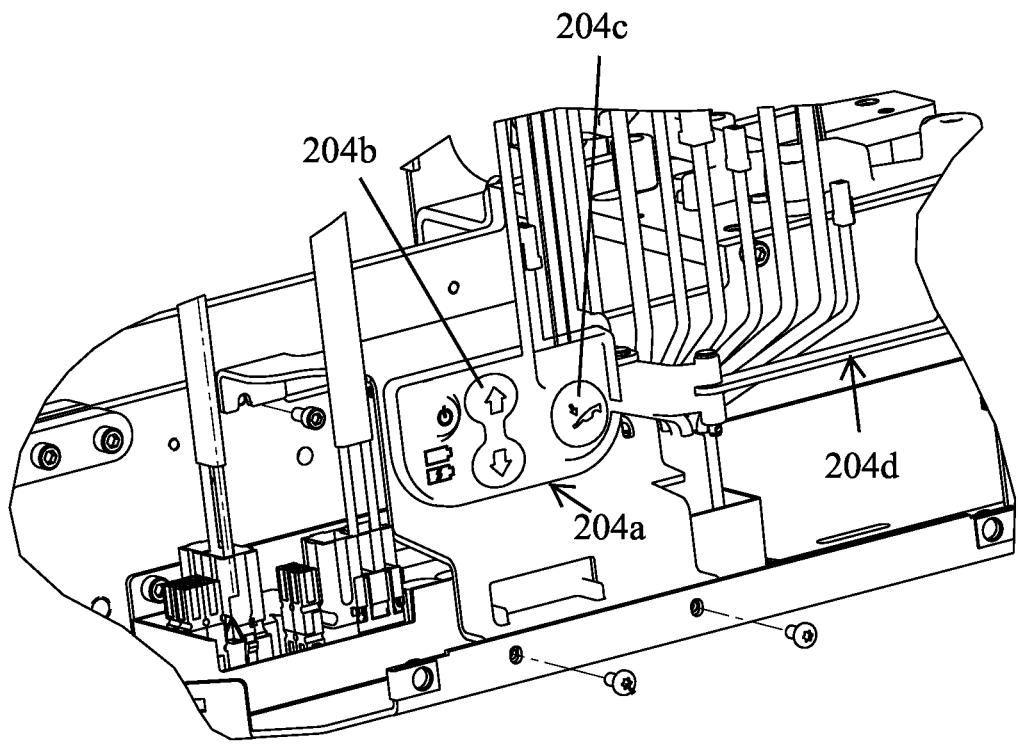
FIG. 10A is an enlarged perspective view illustrating the loading and unloading apparatus based user input device and trolley-based control board of the loading and unloading apparatus.
Figure 10B:
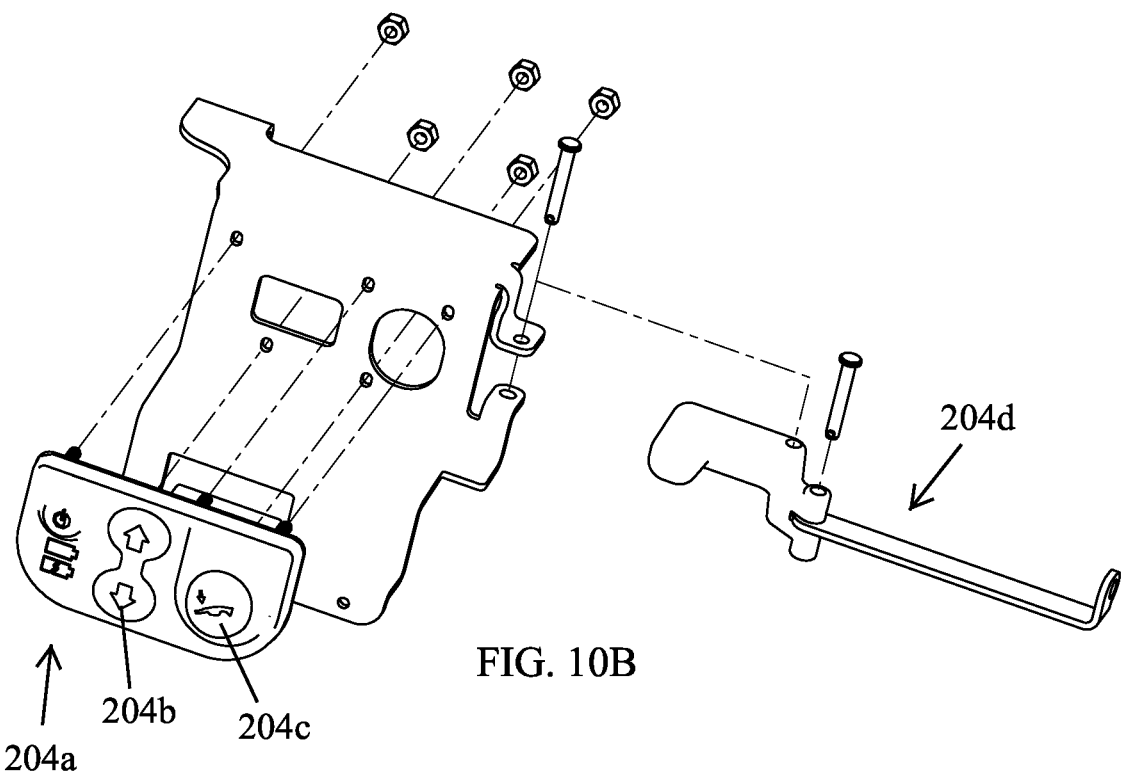
FIG. 10B is an enlarged perspective view of the user input device of FIG. 10A.
Figure 15:
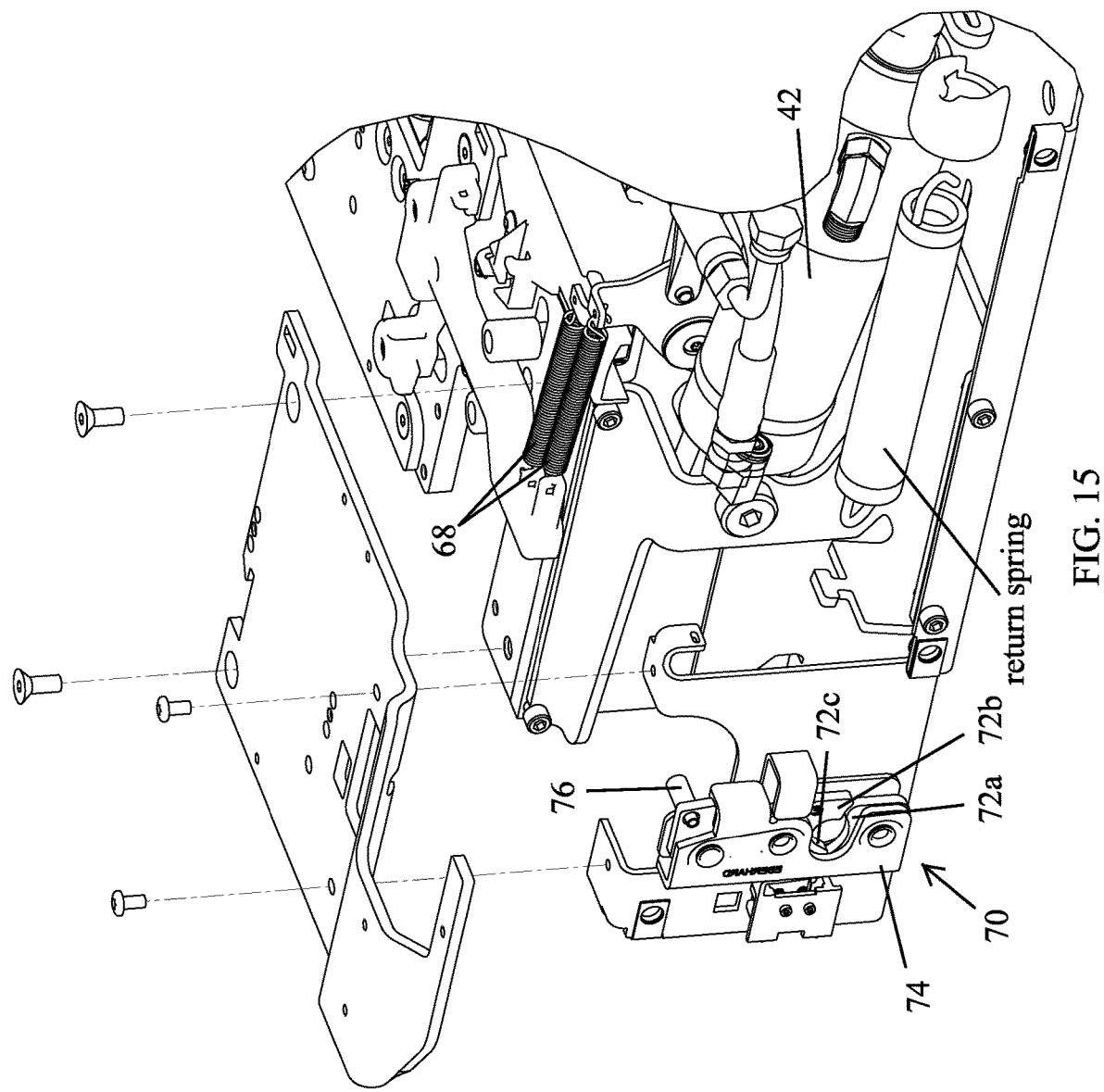
FIG. 15 is another enlarged partial perspective view of the trolley illustrating the cot latch mechanism.
Figure 15A:
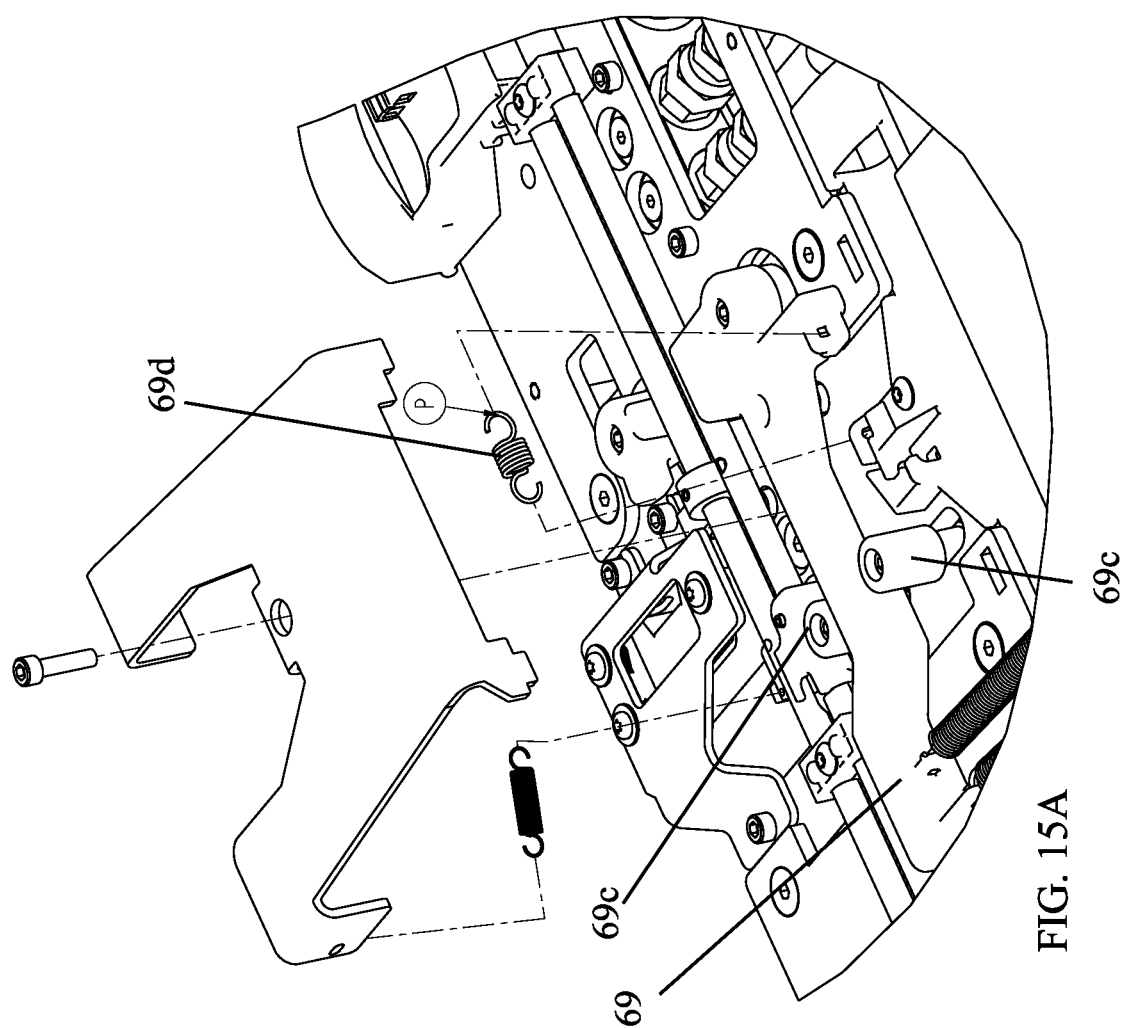
FIG. 15A is another enlarged partial perspective view of a release mechanism for the transfer track lock assembly to the base.
Figure 16:
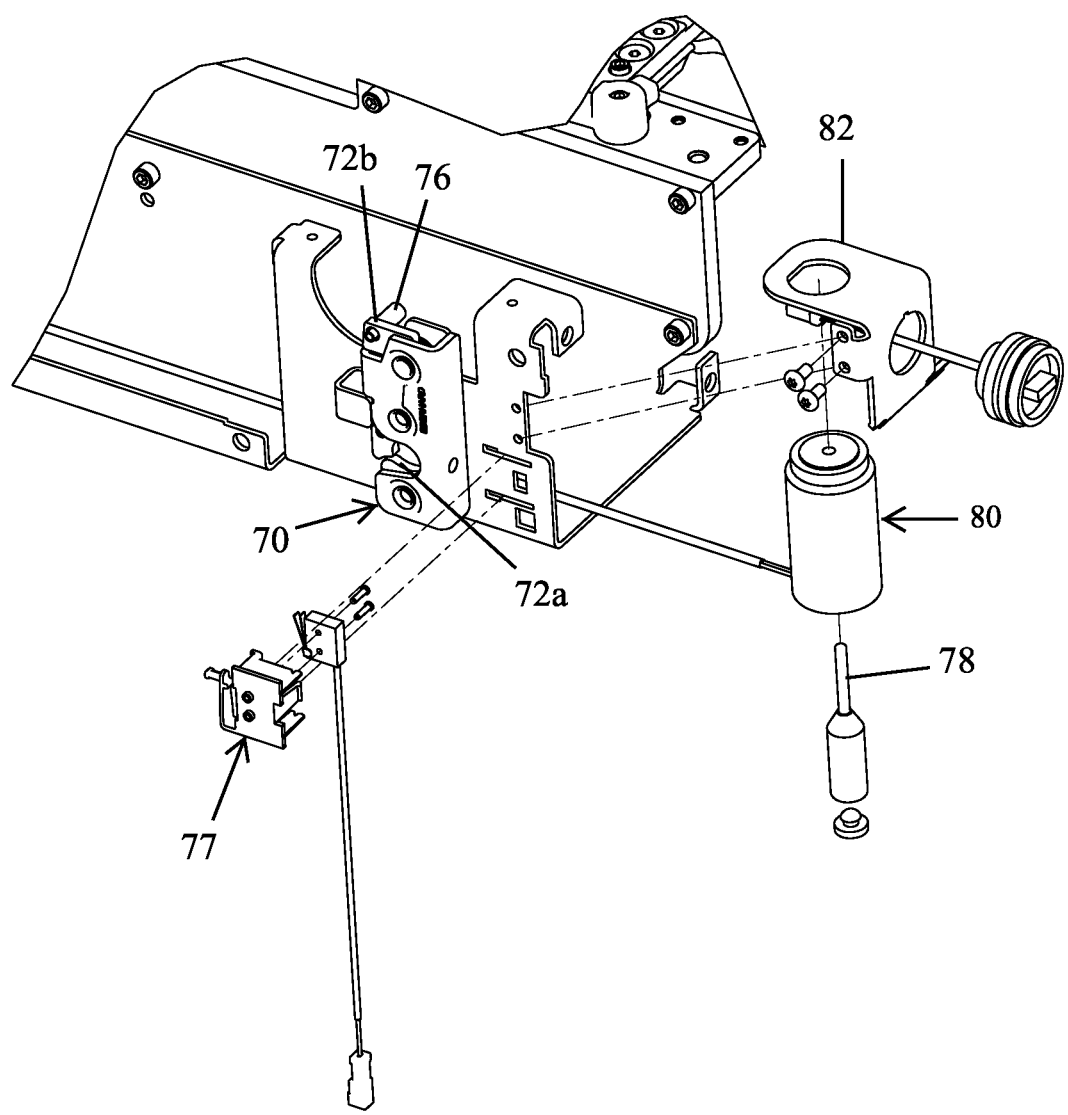
FIG. 16 is an enlarged exploded perspective view of the latch mechanism and solenoid actuator release for the latch mechanism.
Figure 17:
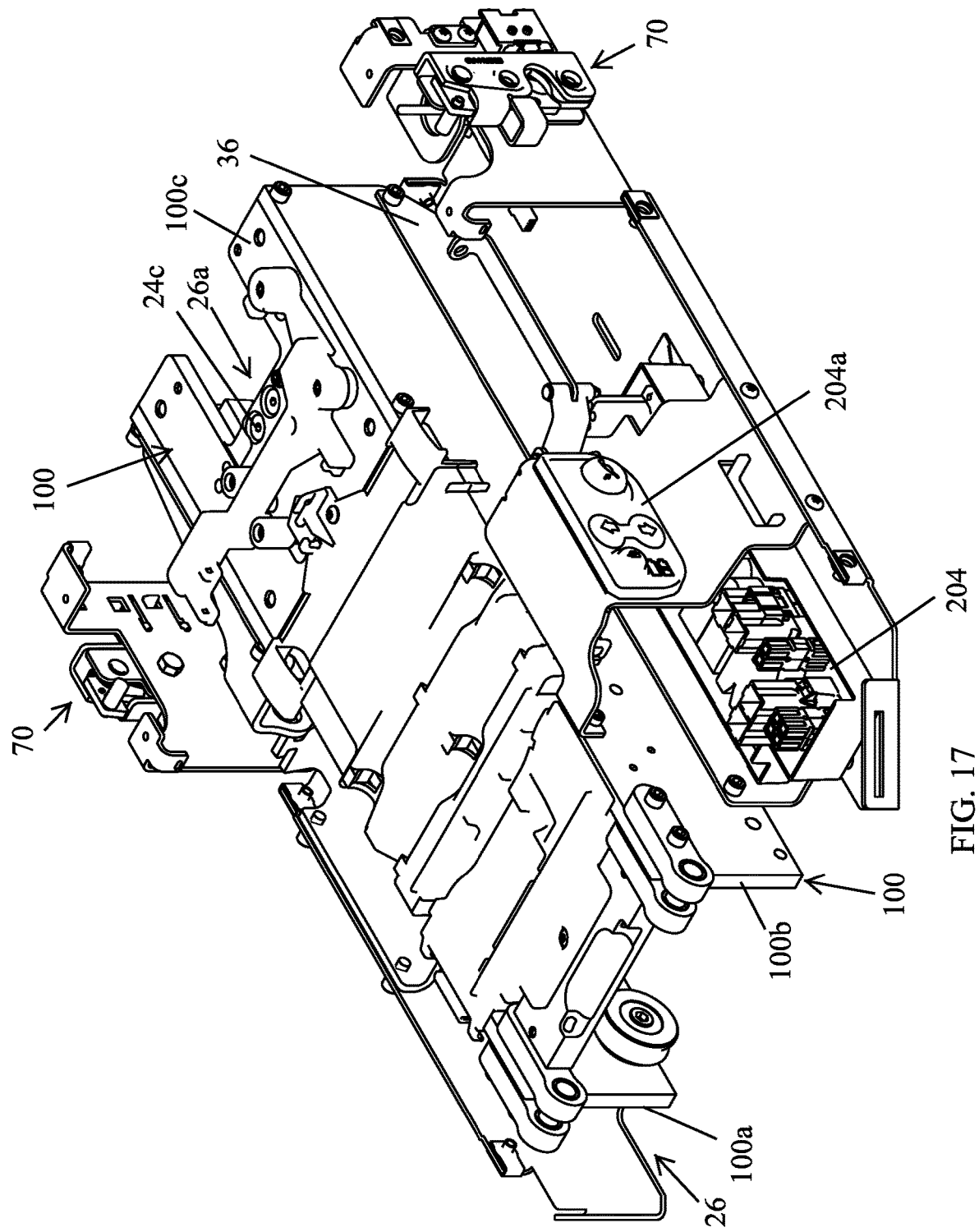
FIG. 17 is an enlarged perspective view of the trolley frame illustrating the mounting arrangement of the trolley stop ramp.

As previously noted, trolley 24 is adapted to engage cot 12. As best seen in FIGS. 10, 12, and 17, trolley 24 includes a pair of latches 70 for engaging cot 12. Referring to FIG. 10, frame 36 supports two latches 70, one at each side of frame 36. Latches 70 are mechanically actuated and released, but may also be electrically released. As best seen in and understood from FIG. 15, latches 70 each include a latch plate 72a and latch arm 72b. Latch plate 72a and latch arm 72b are mounted in a bracket 74 that forms a housing for mounting latch 70 to frame 36. Latch arm 72b is pivotally mounted in bracket 74 for movement between an unlocked position in which arm 72b is pivoted through an open side of the bracket for engagement by the cot (or for release of the engagement of the cot) and a locked position. Latch arm 72b is biased in its unlocked position by a spring (not shown), which is configured with an over center arrangement so that the spring also biases the latch arm in its locked position after latch arm 72b is moved out of its locked position. To release latch plate 72b from its locked position, latch arm 72b includes a pin 76 for actuation by a solenoid 80 (FIGS. 10 and 16), which is controlled by control system 200, more fully described below.

Figure 31:
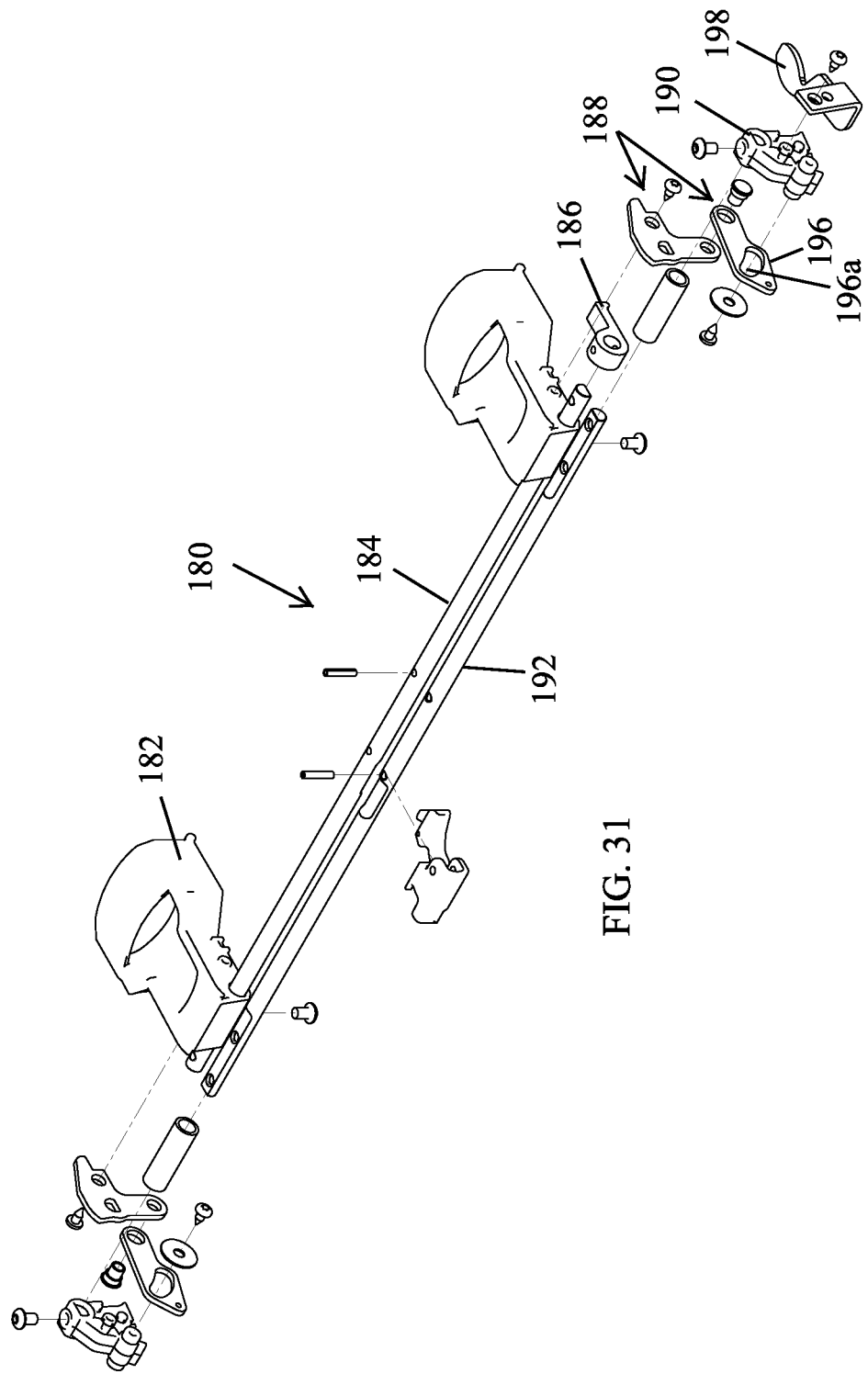
FIG. 31 is an exploded perspective view of the manual release mechanism.
Figure 32:
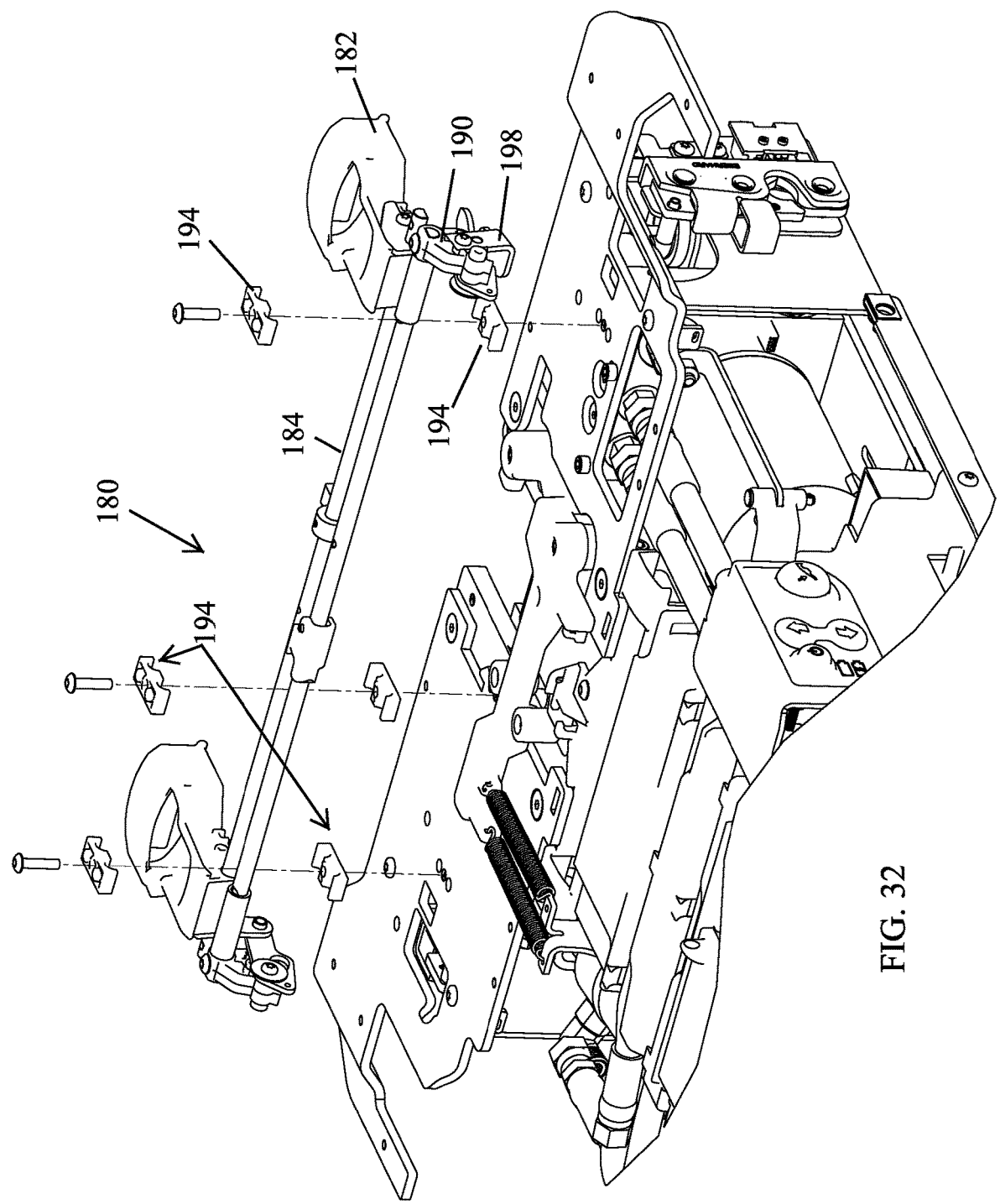
FIG. 32 is a partial perspective exploded view of the trolley illustrating the mounting of the manual release mechanism.

Solenoid 80 is mounted to frame 36 by a bracket 82 (FIGS. 10 and 16) and includes a plunger 78 that is coupled to a bracket that engages pin 76. Thus, when solenoid 80 is activated, plunger 78 will lower and the bracket will pull on pin 76 to allow the biasing force of the spring to move latch arm 72b to its unlocked position. As will be more fully disclosed below, latch 70 may also be manually released by manual release assembly 180 (FIGS. 31 and 32).

Figure 5:
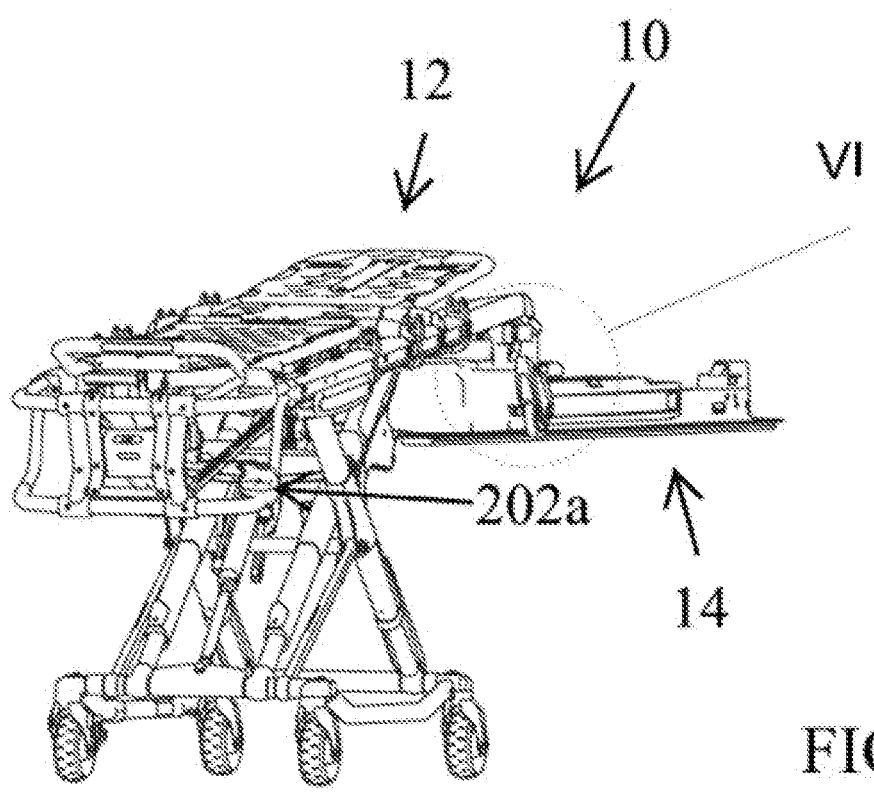
FIG. 5 is a perspective view of the ambulance cot being engaged by the cot loading and unloading apparatus.
Figure 6:
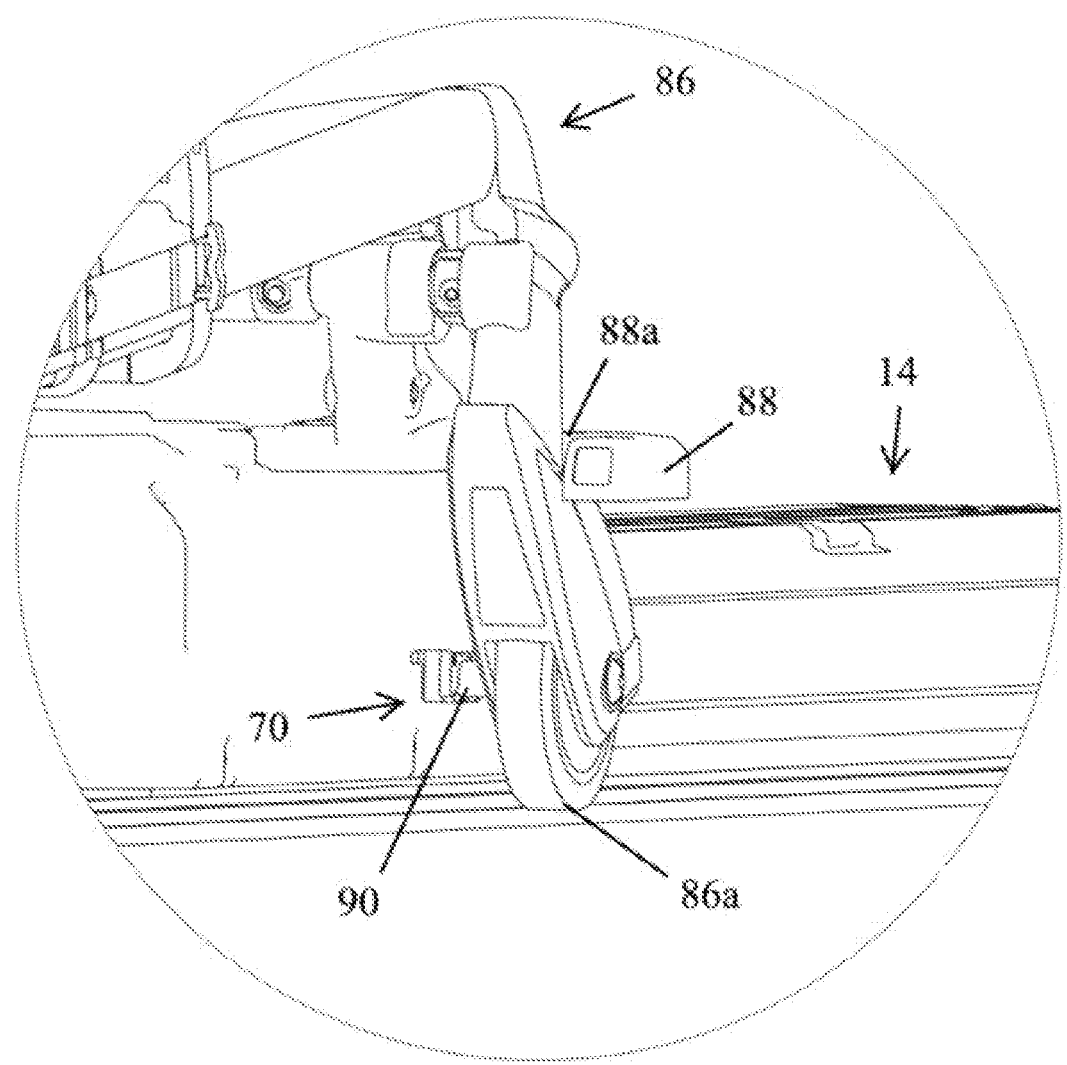
FIG. 6 is an enlarged view of the cot engaged by a latch on the cot loading and unloading apparatus.

Referring again to FIGS. 2, 5, and 6, when cot 12 is aligned with the rear opening of the ambulance and trolley 24 is fully extended along base 20, and arms 34a, 34b are lowered, cot 12 can then be pushed toward the ambulance so that arms 34a, 34b extend into the cot beneath the head end wheeled frame 86 of cot 12. Cot 12 is then pushed and guided by guide surfaces formed on housing 88 of trolley 24 and into a pair of recesses 88a also formed in housing 88, which are configured to guide wheels 86a into engagement with the latches (70) on trolley 24. As best understood from FIG. 6, each wheel 86a includes a laterally extending pin 90 for engagement by latches 70.

Figure 3:
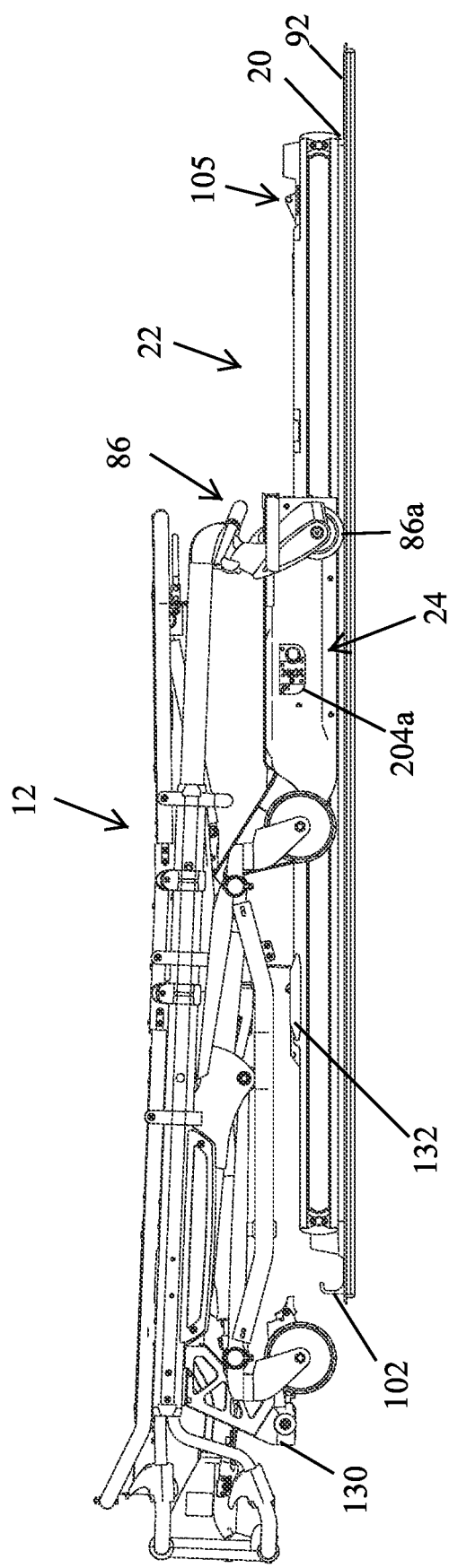
FIG. 3 is a side view of the ambulance cot being moved into the cargo area by the cot loading and unloading apparatus.

As best understood from FIG. 10, when wheels 86a are guided into recesses 88a and latches 70 are in their unlocked configuration, pins 90 are urged against a lower arcuate surface 72c (FIG. 15) of the latch arms 72b to thereby pivot the latch arms 72b against the biasing force of the spring and pivot the latch arms to their locked positions. Once in this position, the springs hold the latch arms in their locked position. The state of the two latches is conveyed to control system 200 by switches 77 (FIG. 15) mount adjacent latches 70. Once so engaged by the latches, arms 34a and 34b may then be raised by cylinder 42 to engage one of the transverse members of the cot frame and, further, raise the cot off the ground so its collapsible wheeled base may be collapsed and folded. After the wheeled base is folded, cot 12 may be pushed into the ambulance on base 20 using trolley 24 (FIGS. 2-3).

Referring to FIGS. 19-22, base 20 is anchored to the cargo deck of the ambulance by a sub-anchor assembly 92. Sub-anchor assembly 92 includes an anchor member or plate 92a, which is fastened in or on the deck by a plurality of attachment brackets 94. Plate 92a is generally channel-shaped whose channel is covered by a cap plate 96 and ends are covered by end caps 98. Base 20, which comprises an extruded member, is anchored to plate 92 by a plurality of spaced apart fasteners and further optionally sealed to plate 92 by seals S (FIG. 22F), which are positioned between base 20 and plate 92. Anchor plate 92a optionally provides through holes to allow cabling to extend from the loading and unloading apparatus to the vehicle power supply system. As will be more fully described below, system 10 may incorporate an inductive charging system for charging batteries on the trolley and the cot. Anchor plate 92a may also provide anchorage for an optional safety hook 102 that can be engaged, for example, by a frame member of cot 12 after unloading the cot from or before loading the cot onto loading and unloading apparatus.

As noted above, the underside of trolley 24 forms an inverted channel which forms a central inverted generally channel-shaped frame portion 100 formed by two spaced apart plates 100a, 100b and to which the rest of the frame members of frame 36 are mounted, which forms a telescoping rail assembly with track 22 to thereby extend the reach of trolley 24. Trolley 24, as noted, also includes bearings, such as rollers 104, which are mounted to plates 100a, 100b (FIGS. 10 and 14) and ride along rods 29 of outer rails 30. To further stabilize trolley 24 when loaded with a cart, wheels 86a of head end frame 86 are positioned so that they can also roll along the deck of the cargo area.

To anchor trolley 24 and the cot 12 during transport, base 20 supports a latch mechanism 105 (FIGS. 22 and 22A) for engaging trolley 24. Referring to FIGS. 19-21, track 22 has a forked end 22b, which when fully retracted along base 20 allows track 22 to straddle latch mechanism 105, which helps reduce the overall contracted length of loading and unloading apparatus while providing full extension of trolley 24 along base 20. Further, this allows latch 105 to engage trolley 24 when trolley 24 is fully retracted over track 22.

Figure 22D:
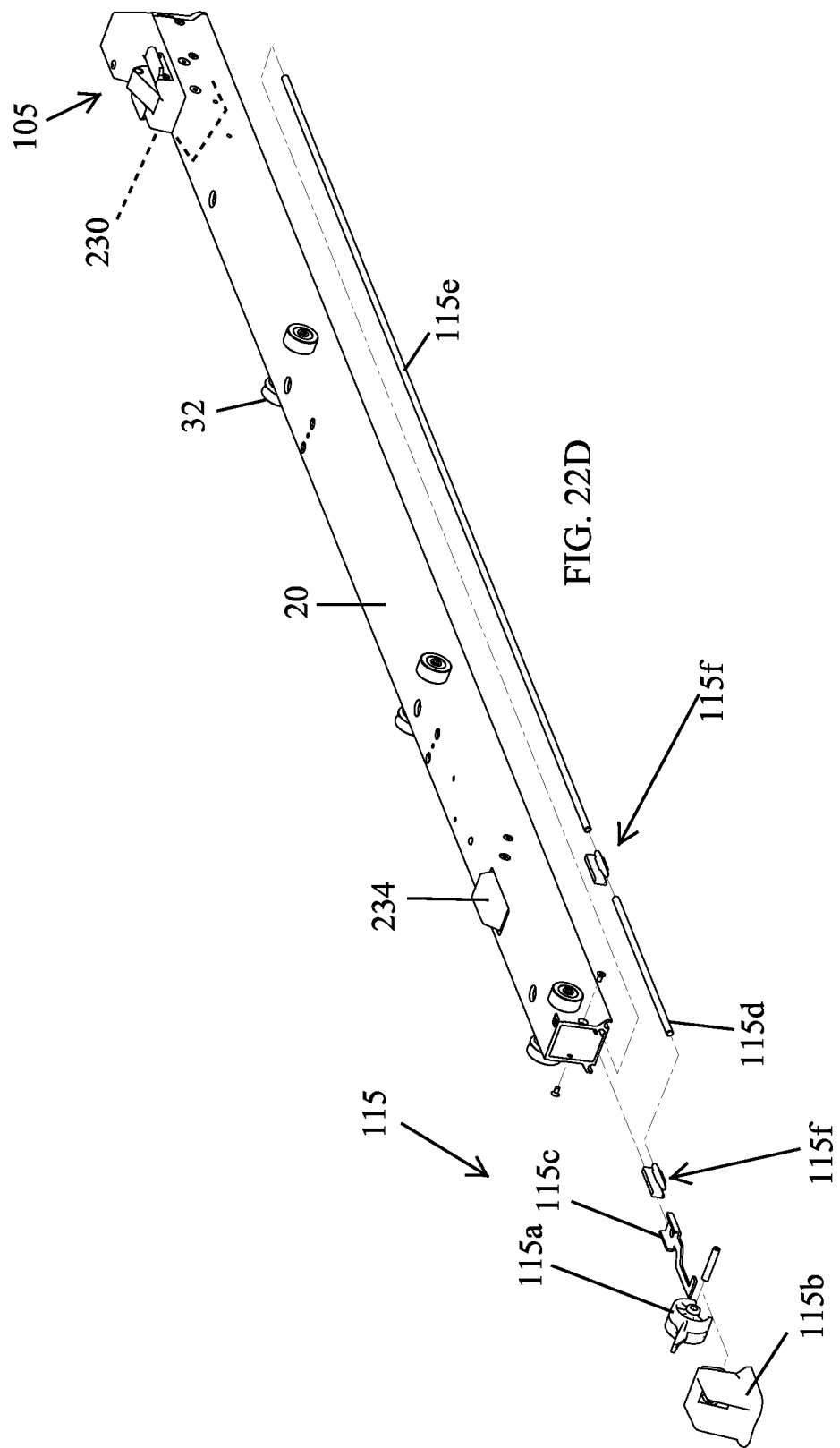
FIG. 22D is a perspective view of the base illustrating the mounting details of a release trigger assembly.
Figure 22E:
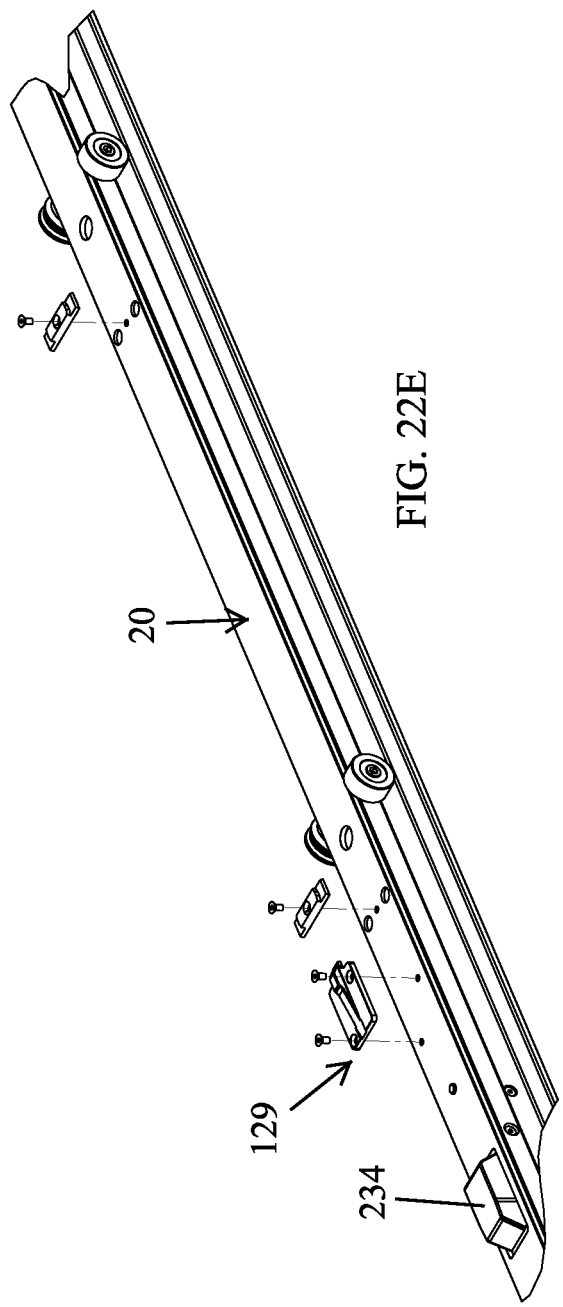
FIG. 22E is another partial exploded perspective view of the base showing the mounting arrangement of the trolley ramp.
Figure 23:
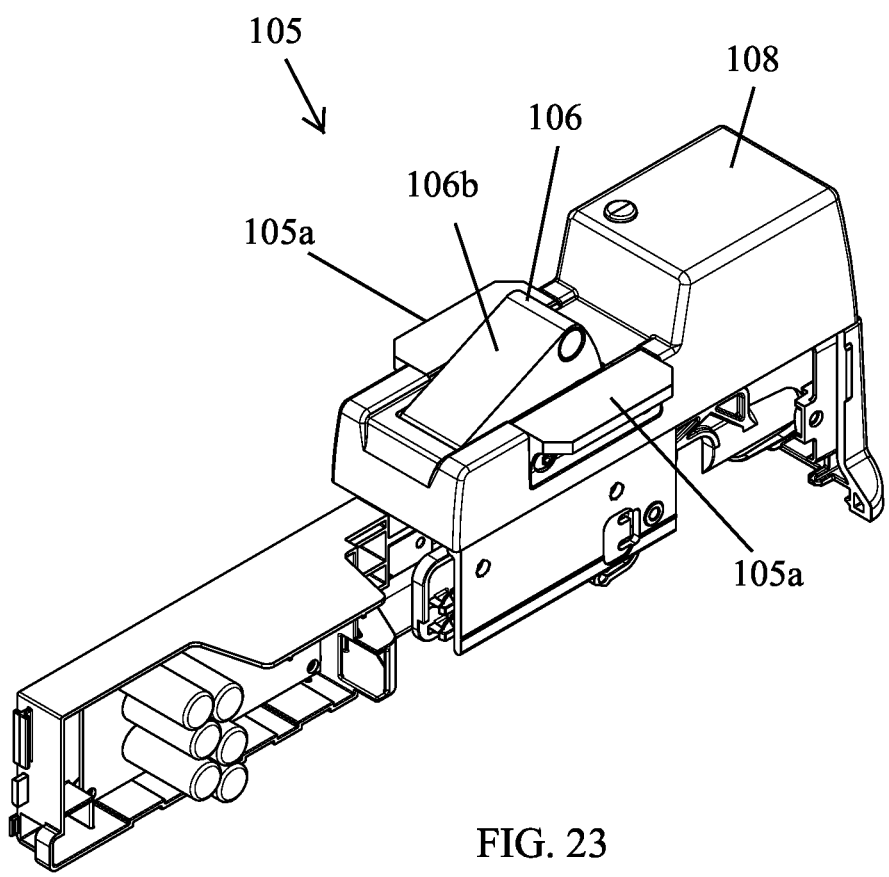
FIG. 23 is a perspective view of the trolley anchor assembly.
Figure 24:
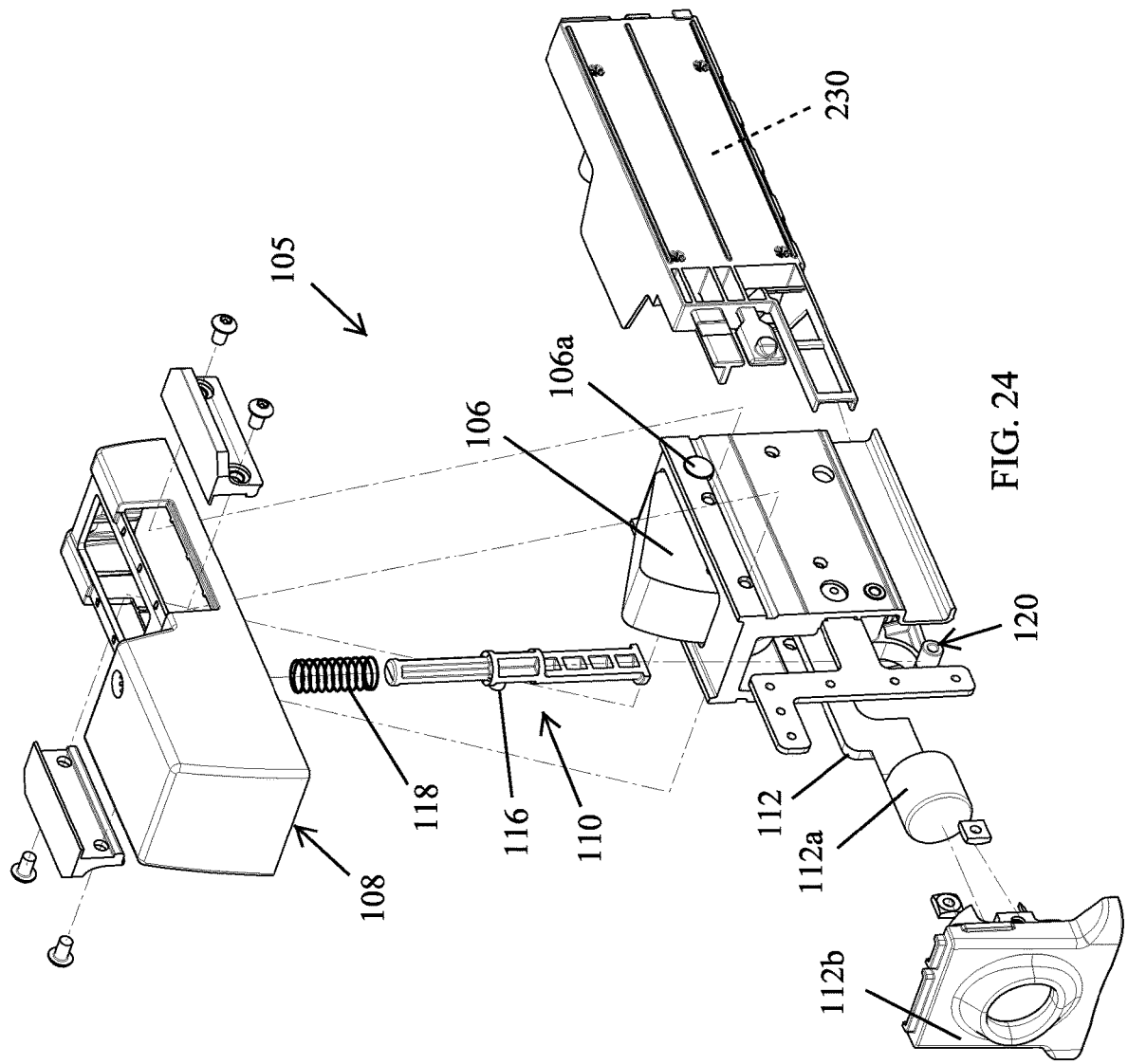
FIG. 24 is an exploded perspective view of the trolley anchor assembly of FIG. 23.
Figure 25:
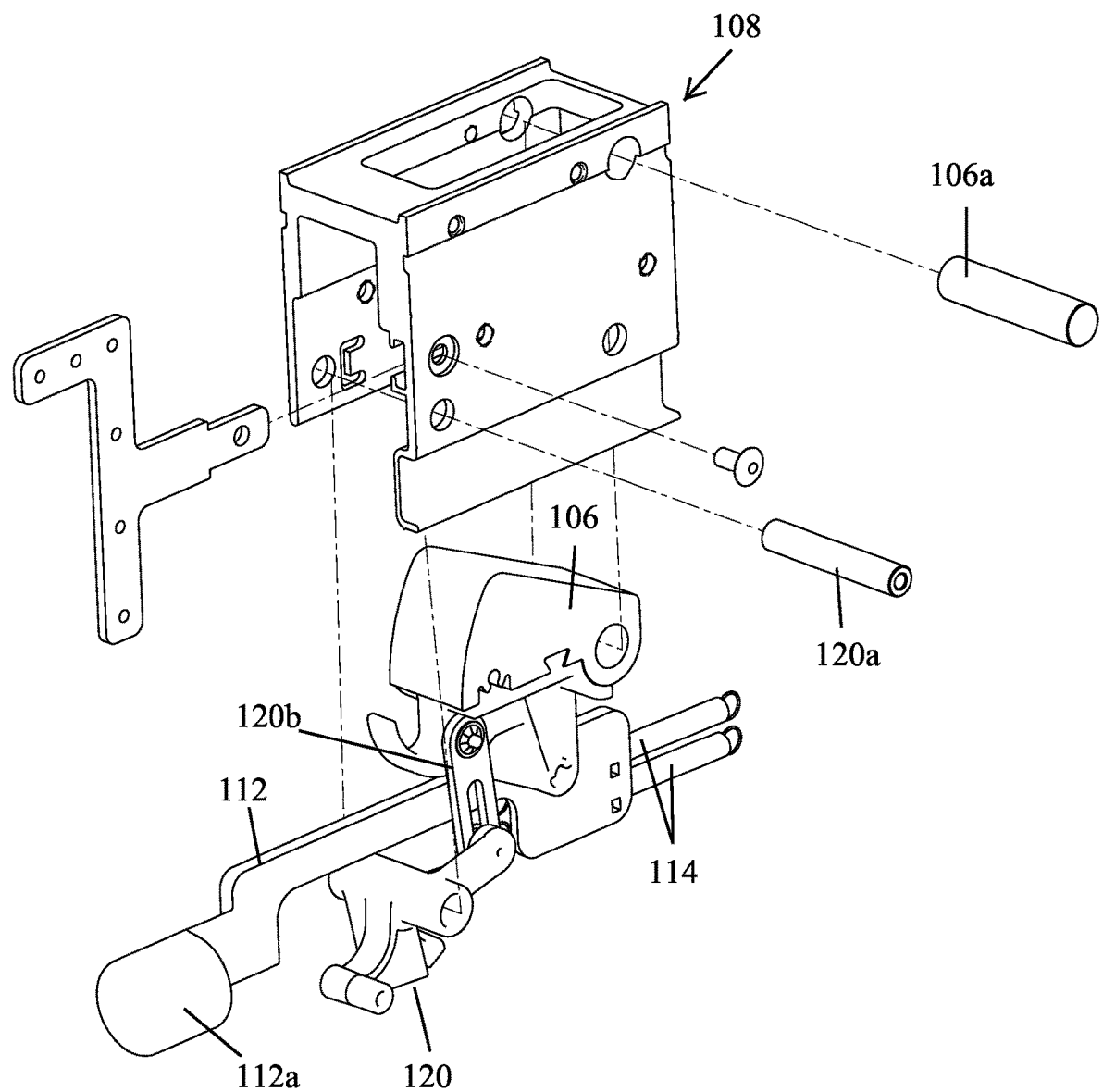
FIG. 25 is a further exploded perspective view of the trolley anchor assembly.

As best seen in FIGS. 23-25, latch mechanism 105 includes a pawl 106, which is pivotally mounted in housing 108 by a pivot pin 106a and biased in an extended or locking position by an actuator 110. Pawl 106 is also coupled to a manual release plate 112 via a pin connection. Plate 112 supports a button 112a that extends through a mounting bezel 112b on housing 108 so that it is accessible to an attendant in the front of the ambulance cargo area. Plate 112 is also coupled to a pair of springs 114 to thereby return button 112a to its non-release position after the pressure on the button is removed. Optionally, plate 112 is also coupled to a release mechanism 115 (FIG. 22D) provided at the other end of base 20, described more fully in reference to FIG. 22D below.

Actuator 110 includes a plunger 116 that is biased by a spring 118 to apply a downward force on a pivot actuator 120, which is also pivotally mounted in housing 108 by a pivot pin 120a and which is coupled to pawl 106 by a link 120b to thereby urge pawl in its extended position (FIG. 23). To engage latch 105, trolley 24 includes a stop ramp 26a (FIGS. 10 and 26D), which is mounted to the underside of frame 26 in top plate 100c of rail portion 100 by a pair of fasteners 24c (FIG. 17). In this manner, when trolley 24 is pushed along track 22 toward the front cargo area of the ambulance, stop ramp 24b will ride on the ramped surface 106b of pawl 106, with the weight of the trolley then depressing pawl 106 so that it pivots about pin 106a against the biasing force plunger 110. Once block 24b has moved past the end of the ramped surface 106a of pawl 106, plunger 110 will return pawl 106 to its extended locked position behind ramp 24b and thereby lock trolley 24 as well as track 22 in their full retracted positions along base 20. Also to provide lateral support at latching mechanism 105, a pair of retaining plates 105a is mounted to housing 108 adjacent either side of pawl 106.

Figure 4:
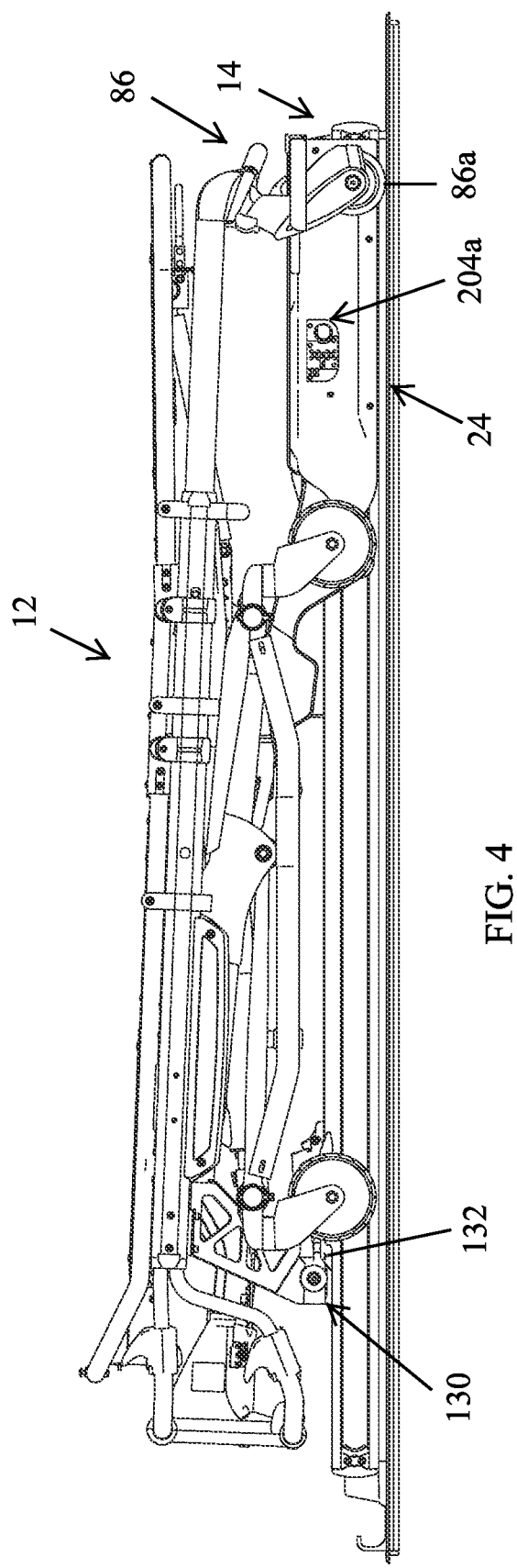
FIG. 4 is a side view of the ambulance cot being moved into its full stowed position in the cargo area.
Figure 7:
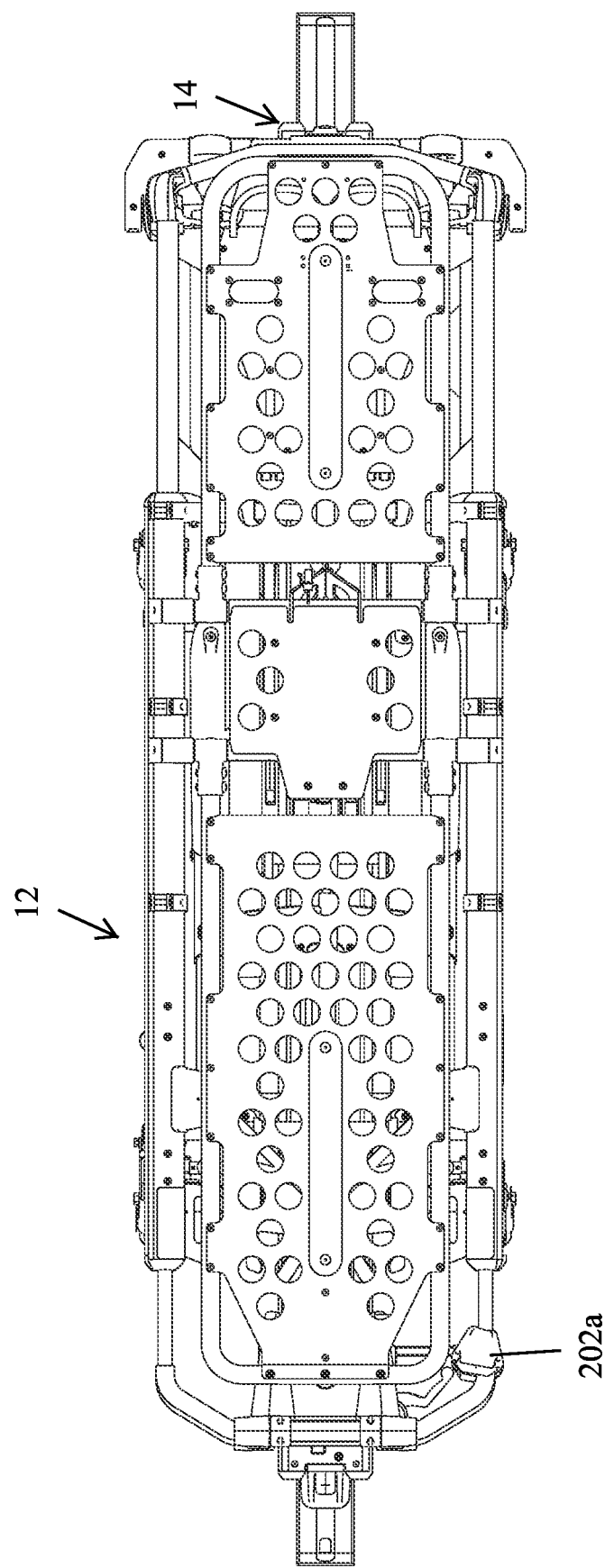
FIG. 7 is a plan view of the cot in FIG. 4.
Figure 8:
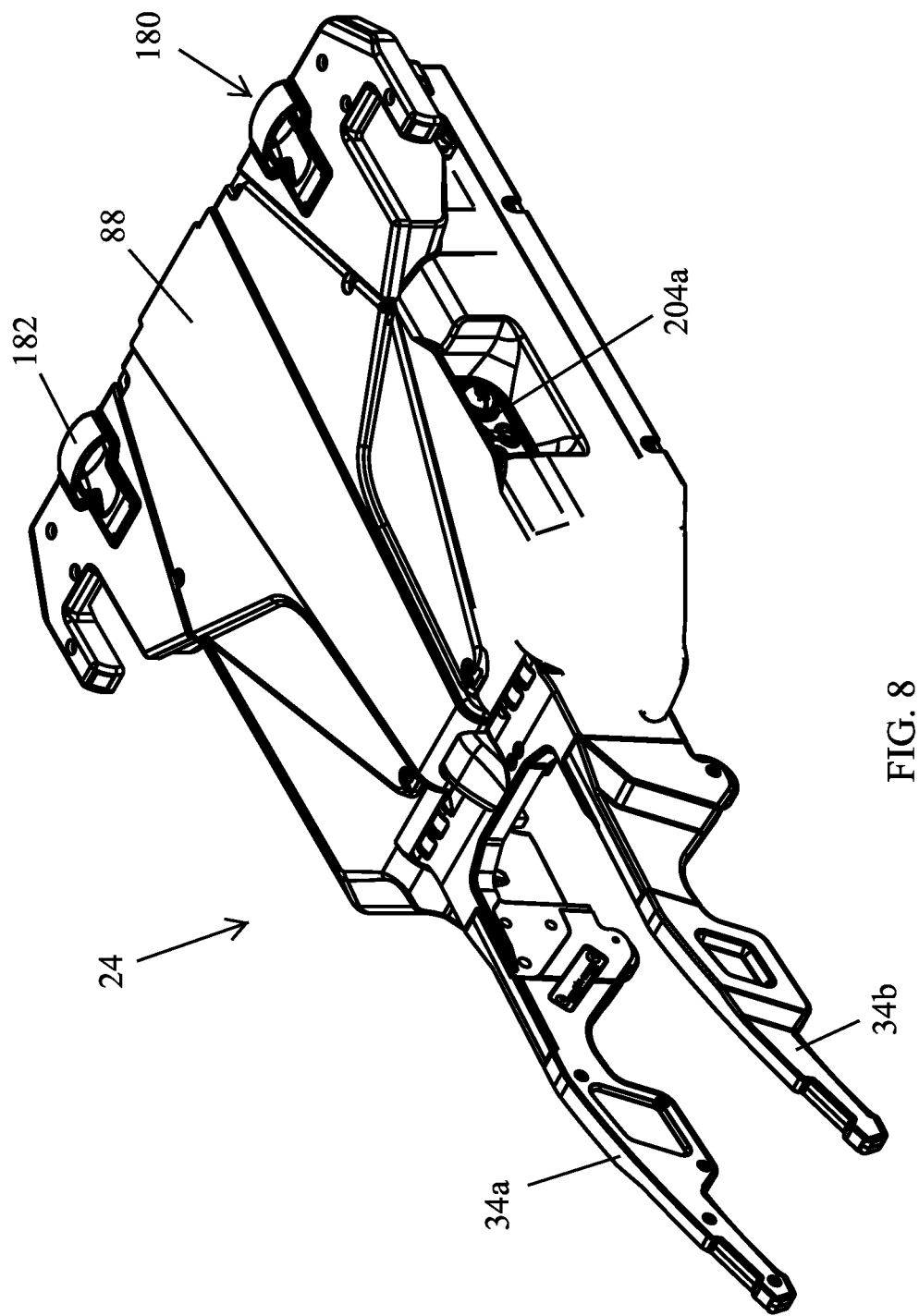
FIG. 8 is a perspective view of the trolley of the cot loading and unloading apparatus.

As best seen in FIGS. 4 and 7, when trolley 24 and cot 12 are fully retracted along base 20, loading and unloading apparatus 14 is substantially located within the footprint of cot 12 with track 22, trolley 24, and base 20 fully contained within the footprint of cot 12, at least at the head end of the cot so that the loading and unloading apparatus does no encroach on the cargo space at the head end of the loaded cot. With this compact configuration, loading and unloading apparatus 14 does not interfere with the movement of an attendant at the front end of the cargo space of the ambulance when the cot is fully loaded into the ambulance.

Figure 28:
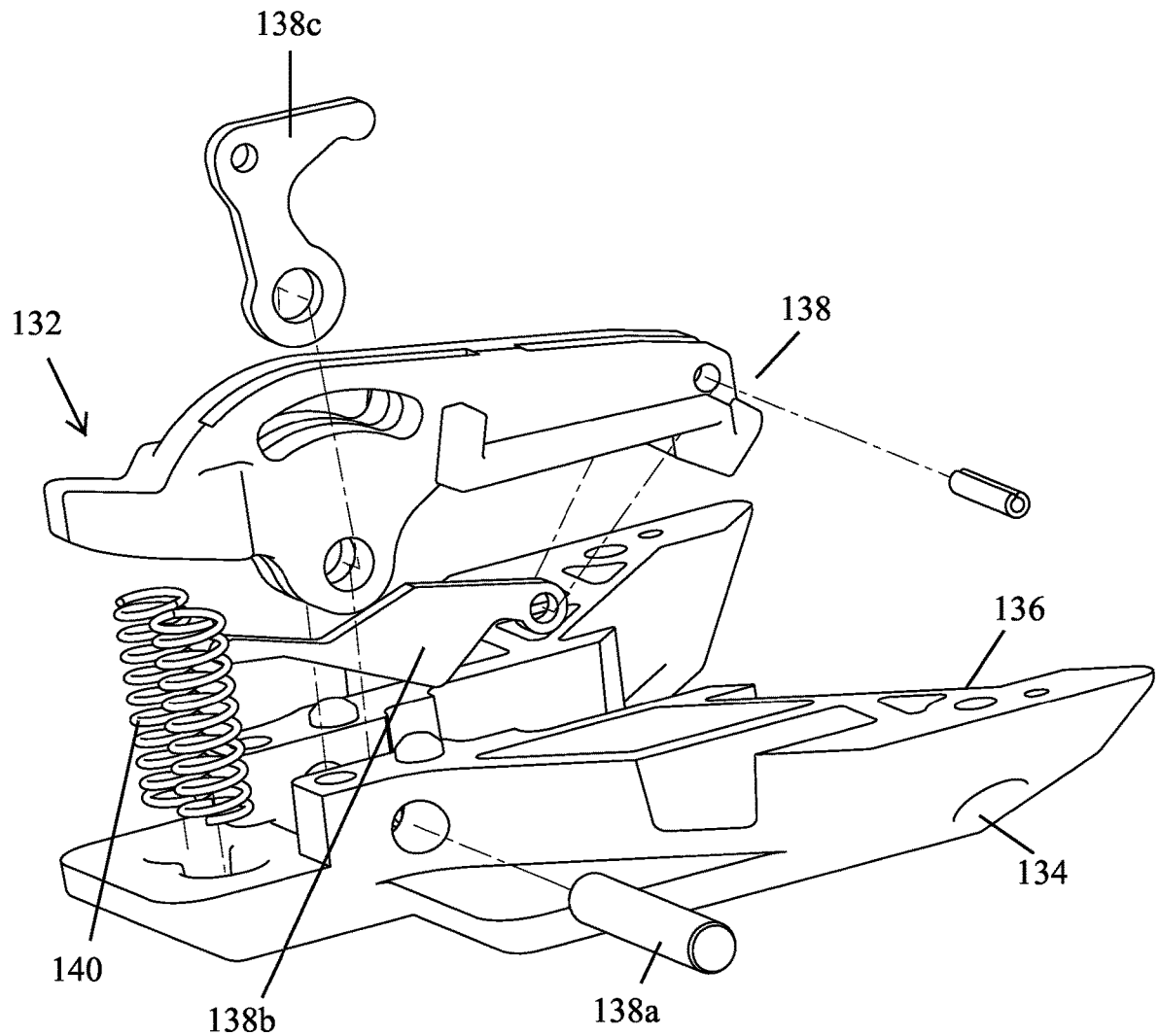
FIG. 28 is a bottom perspective view of the cot foot end fastener assembly.

In addition, to further secure cot 12 when fully loaded, the foot end of cot 12 includes a foot end fastener 130 (FIGS. 29 and 30) for engaging a fastener 132 (FIGS. 26A and 28) provided on track 22. As best seen in FIG. 28, fastener 132 (shown inverted) includes a guide 134 with a V-shaped recess 136, which is mounted in track 22 (FIG. 26C). Pivotally mounted in guide 134 by a pin 138a is a hook 138, which is biased by a pair of springs 140 in an extended position in recess 136 for engaging fastener 130 when the foot end of cot 12 is aligned over fastener 132 (FIG. 4). Also mounted to hook 138 is a release plate 138b, which is coupled to release mechanism 115 which when pulled moves hook 138 to a recessed position for disengaging hook 138 from fastener 130. Optionally, an indicator plate 138c may be provided that is also mounted about pin 138a and which pivots with pin 138a and extends through a slotted opening in hook 138, which indicates the status of the hook (i.e. engaged or not engaged).

Figure 29:
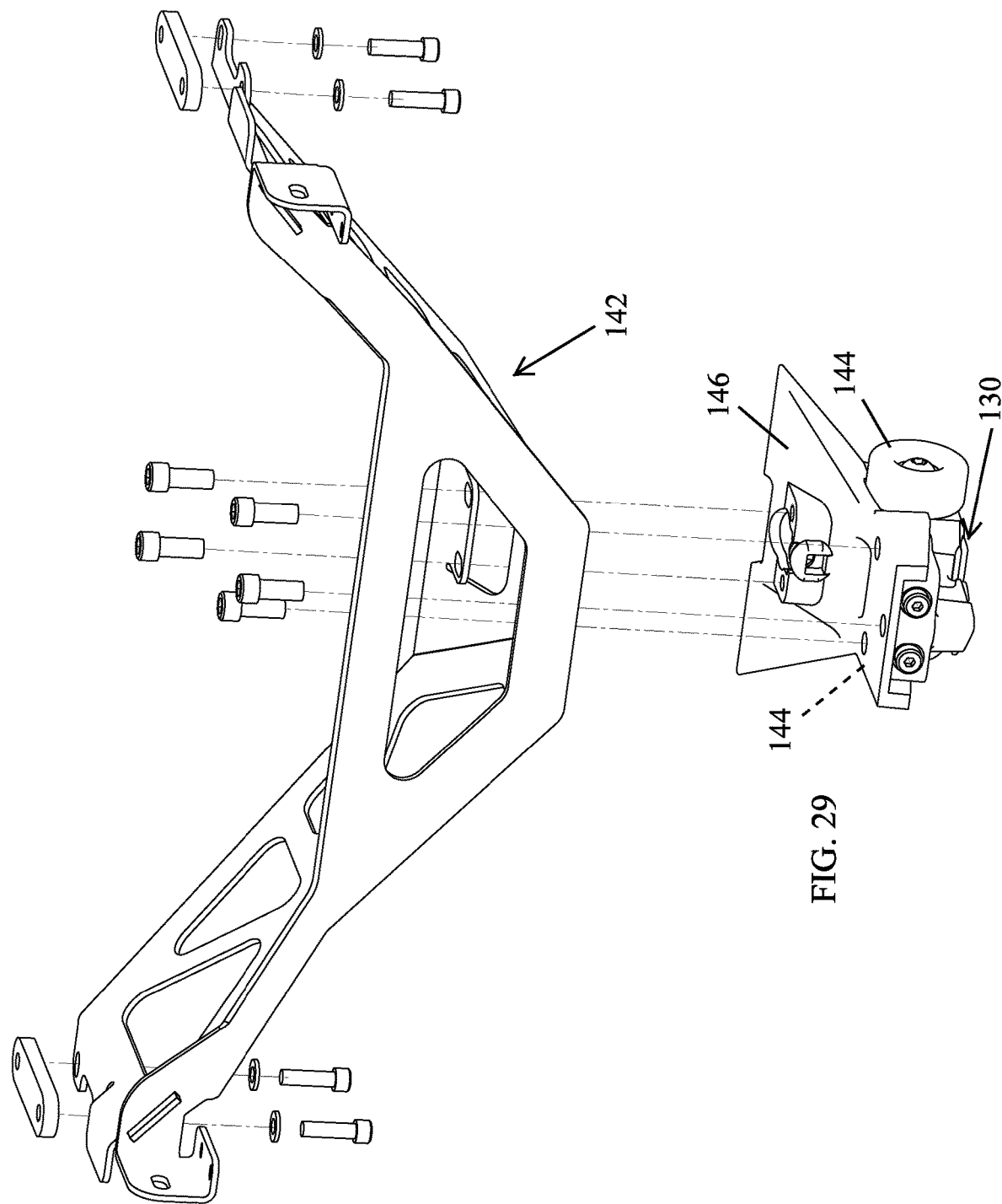
FIG. 29 is an exploded perspective view of the foot end fastener assembly of the cot.
Figure 30:
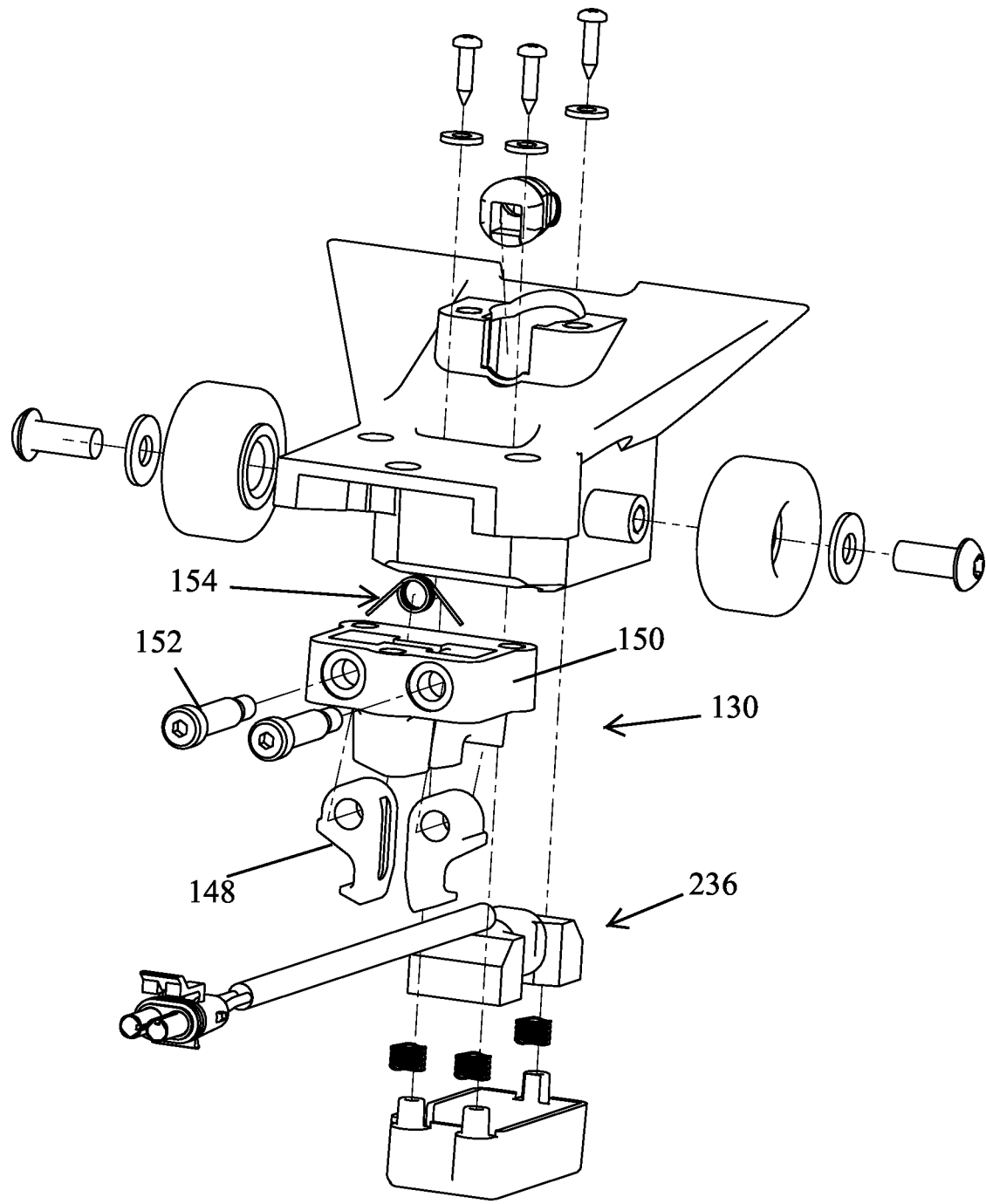
FIG. 30 is an exploded perspective view of the fastener assembly of FIG. 29.

Referring to FIGS. 29 and 30, fastener 130 is mounted to the foot end of cot 12 by a frame 142 and a bracket 146. Fastener 130 is mounted between a pair of wheels 144, which are also mounted to frame 142 by bracket 146, and positioned for engaging the floor of the cargo area when cot 12 is being loaded onto or unloaded from the loading and unloading apparatus. Wheels 114, therefore, provide further support and stability to the cot, when the cot is loaded into the ambulance. Fastener 130 includes a pair of pawl hooks 148, which are pivotally mounted in a housing 150 (which is mounted to frame 142) by a pair of pins 152 and further biased outwardly by a coil spring 154 so that their distal ends project beneath housing 150 for engagement with fastener 132. Once so engaged, fastener 130 will restrain the cot relative the transfer track 22 from vertical, lateral (side to side), and longitudinal movement.

Figure 27:
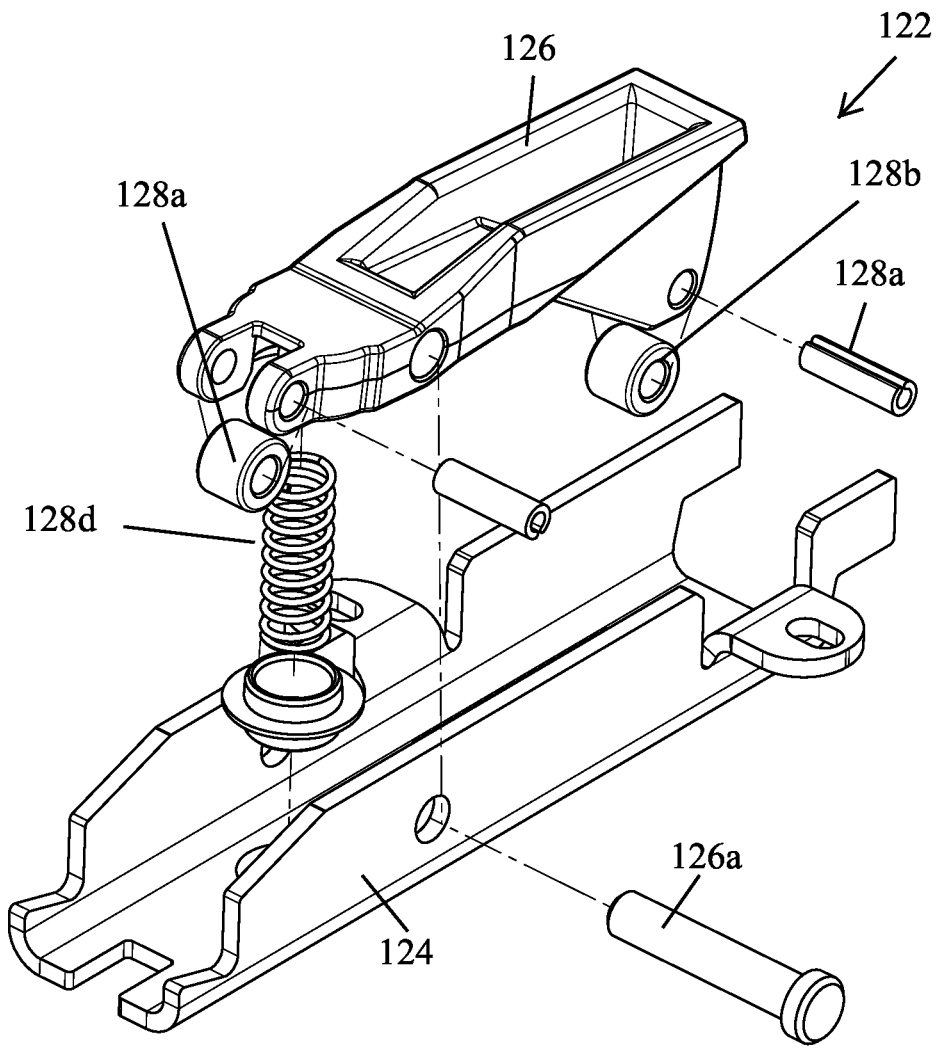
FIG. 27 is an exploded perspective view of another transfer lock assembly.
Figure 27A:
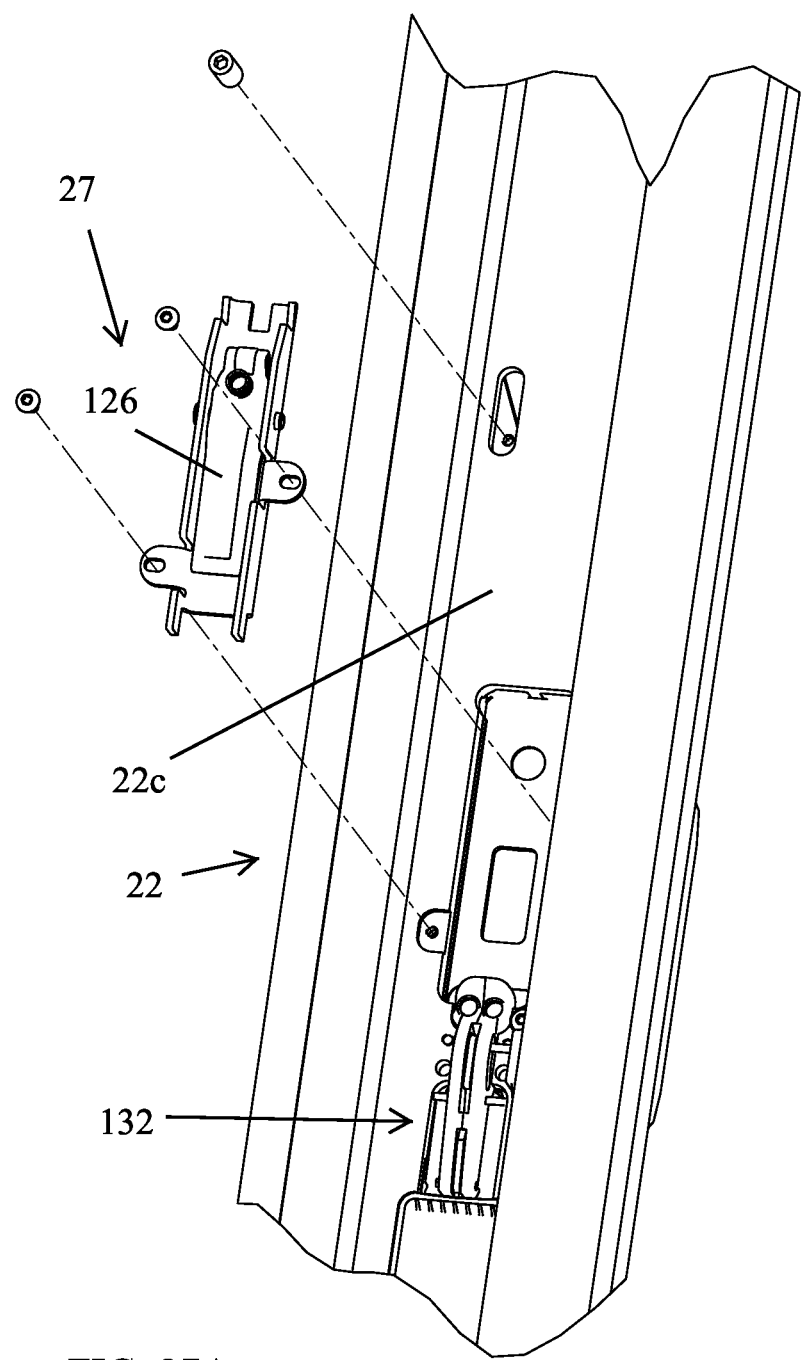
FIG. 27A is an exploded perspective view of the mounting arrangement of the transfer track lock assembly of FIG. 27.

Transfer track 22 also includes two latch mechanisms, one for releasably latching the transfer track to the base, and the other for releasably latching the trolley to the transfer track. Referring to FIGS. 27 and 27A, mounted to the underside 22c of track 22 adjacent fastener 132, near the foot end of the track, is a lock assembly 122. As seen in FIG. 21A, a latch assembly 123 is mounted between lock assembly 122 and the head end of track 22. As a result, lock assembly 122 and lock assembly 123 are arranged in series and further are released or timed so that trolley 24 can fully traverse the length of track 22 prior to the track moving relative to the base. Lock assembly 122 is configured to engage trolley 24 when trolley 24 is moved along track 22 to the end of track 22 from its reacted position toward its extended position so that trolley 24 and track 22, which is normally locked onto base 20 by lock assembly 123, will travel together along base 20. Similarly, when trolley 24 is moved along track 22 to the end of track 22 from its reacted position toward its extended position lock assembly 123 will be released to allow trolley 24 and track 22 to move in unison. On the other hand, when returning trolley 24 to its retracted position, trolley 24 will be disengaged by lock assembly 122 and lock assembly 123 will be triggered to return to its lock state so that track 22 will once again be locked onto base 20 and trolley 24 will be released so that it can once again travel along track 22.

As best seen in FIG. 27, lock assembly 122 includes a mounting bracket 124, which mounts to the underside of track 22 and supports a spring biased pawl 126, pivotally mounted in bracket 124 by a pin 126a. Mounted to opposed ends of pawl 126 are rollers 128a and 128b, which are mounted by coil spring pins 128c. Roller 128b extends through an opening in the bracket and an opening in the web of track 22 and is biased to engage trolley 24 when trolley 24 is moved toward the end of track 22 over roller 128b. Roller 128a is positioned to ride on base 20. When trolley 24 is moved in the other direction along track 22 into the cargo area, trolley 24 now engaged by roller 128b moves track 22 along base 20 where roller 128a is then guided onto a ramp 129 (FIG. 22) mounted to base 20. Ramp 129 causes pawl 126 to pivot about it pivot axis to compress spring 128d, which then reduces the biasing force of the spring on roller 128b to thereby release trolley 24 from track 22.

Figure 26:
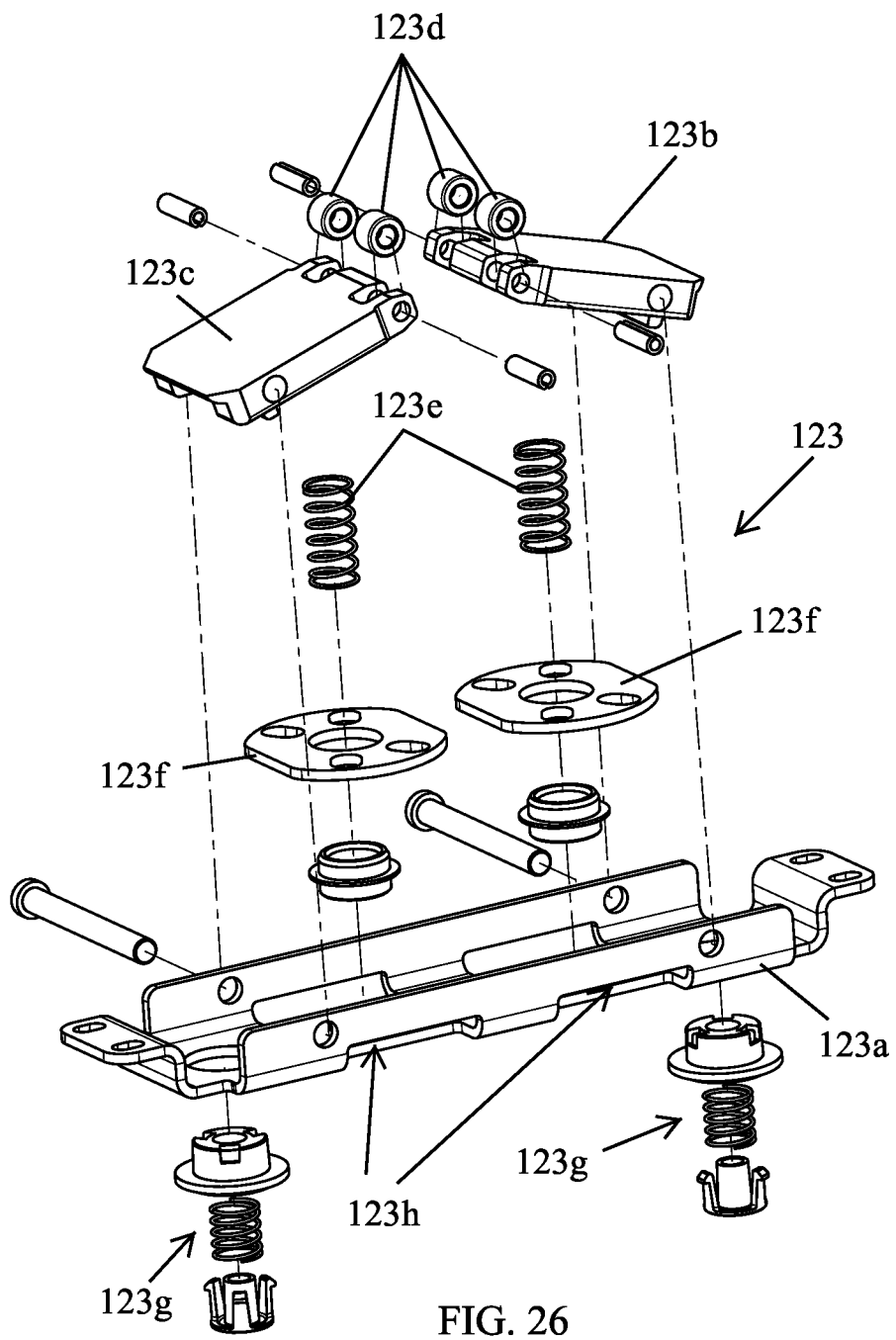
FIG. 26 is an exploded perspective view of a transfer track lock assembly.
Figure 26A:
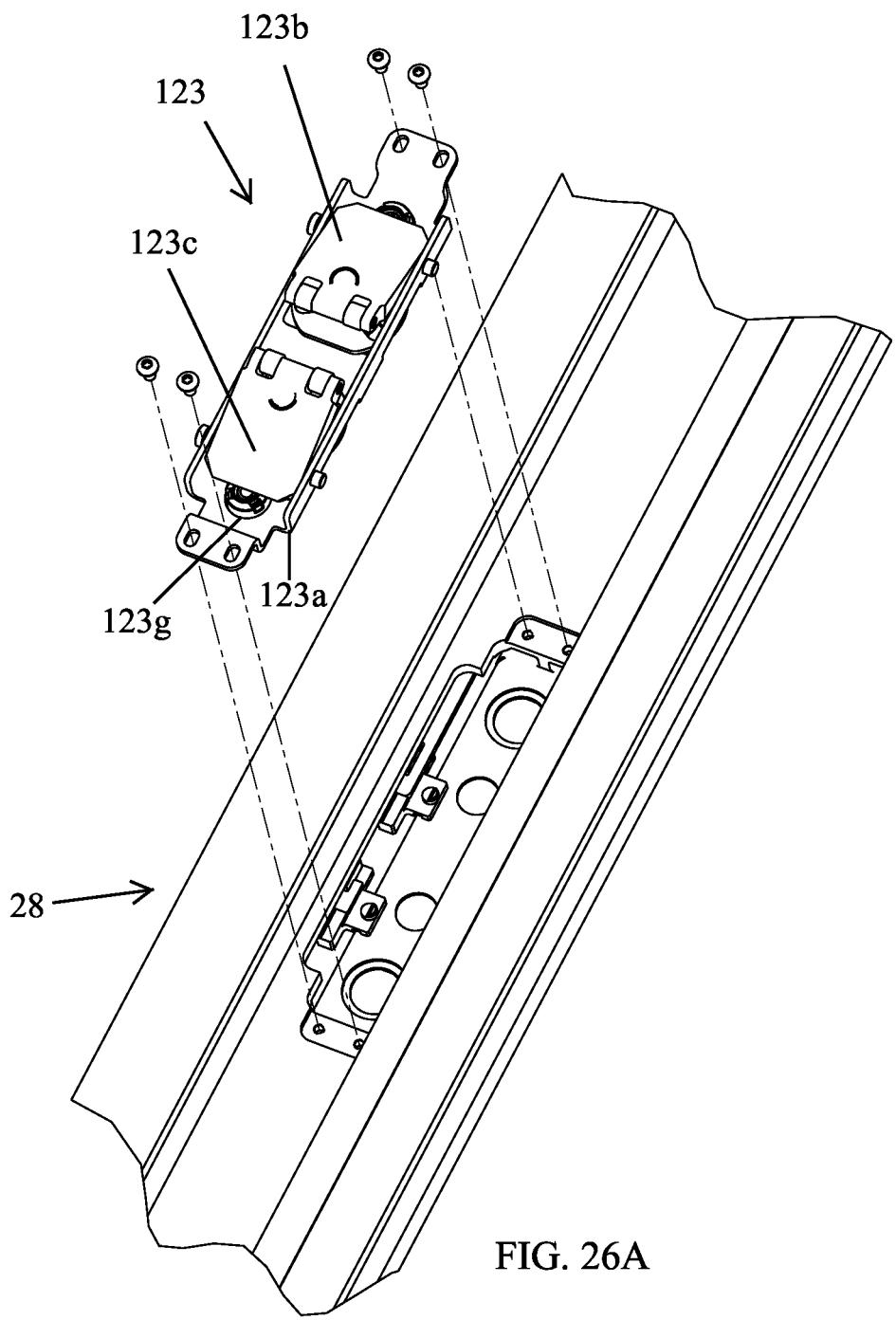
FIG. 26A is an exploded perspective view of the mounting arrangement of the transfer track lock assembly.

Referring to FIGS. 26 and 26A, lock assembly 123 is also mounted to the underside 22b of track 22 but is configured to lock track 22 onto the base. Lock assembly 123 includes a mounting bracket 123a, which supports a pair of pawls 123b, 123c, which are pivotally mounted in bracket 123a. Each pawl 123b, 123c, includes one or more rollers 123d mounted at their distal ends by coiled spring pins. Pawls 123b. 123c are positioned so that when both are extended downwardly, they bind track 22 against base 20 in both directions to thereby lock track 22 along base. When only one pawl is extended and bound against base 20, the track will be locked in one direction (the direction of the bound pawl) and free to slide in the other direction. Positioned under each pawl 123b, 123c are a spring 123e and a trigger release cam 123f. Springs 123e bias pawls 123b, 123c downwardly to engage and bind against the top web of base 20 so that locking assembly 123 is normally in a locked state. When cams 123f are rotated about their rotational axis, they increase or decrease the biasing force to the pawls and therefore can be used to lock or release one or both pawls of lock assembly 123. As noted, when the biasing force on one of the pawls is release, track 22 can move in the direction of the released pawl, but is still locked in the direction of the unreleased pawl, which is still biased and binds against base 20.

To release the pawls of lock assembly 123 from their locked positions, cams 123f are coupled to release struts 131, described in reference to FIG. 26B below. Optionally, assembly 123 may also include manual release buttons 123g. Buttons 123g extend through bracket 123a to also provide a counteracting force to the respective spring, for example at the opposed or proximal ends of pawls 123b, 123c, which are also extended through the upper web of track 22 for access by an attendant.

Figure 26B:
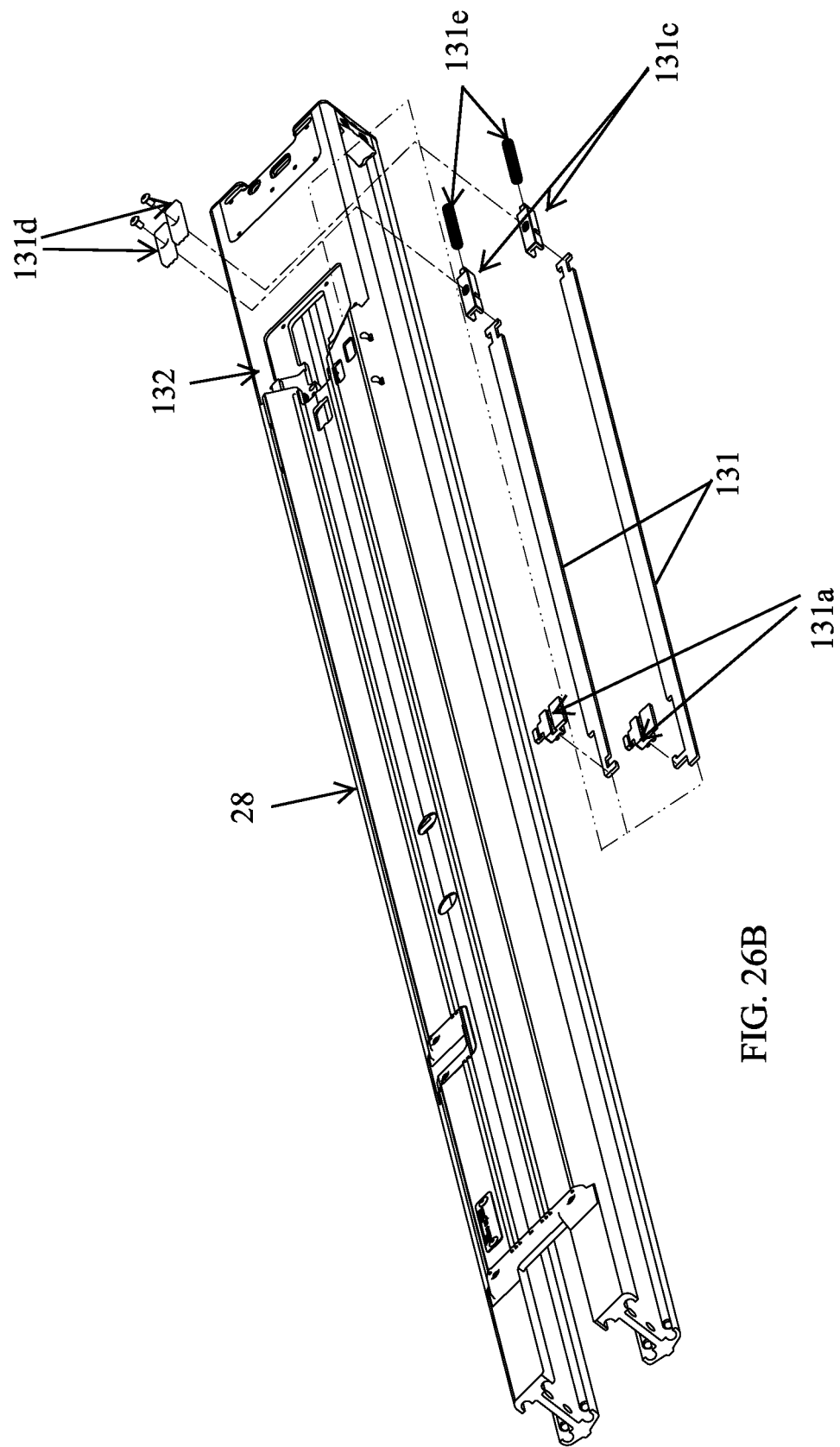
FIG. 26B is an exploded perspective view of the trigger release mechanism for the transfer track lock assembly.
Figure 26C:
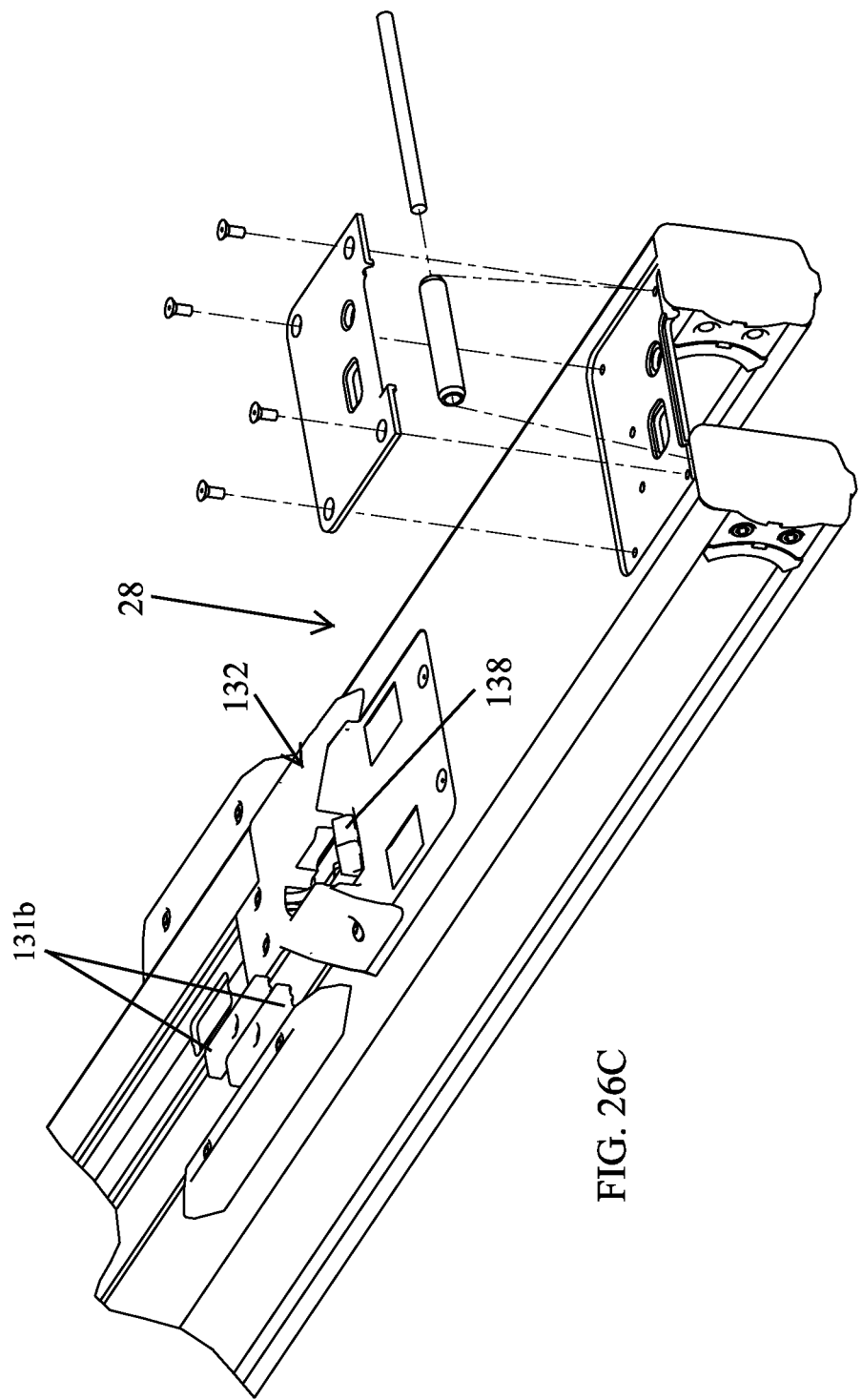
FIG. 26C is an enlarged view of the actuator of the trigger release mechanism of FIG. 26B.
Figure 26D:
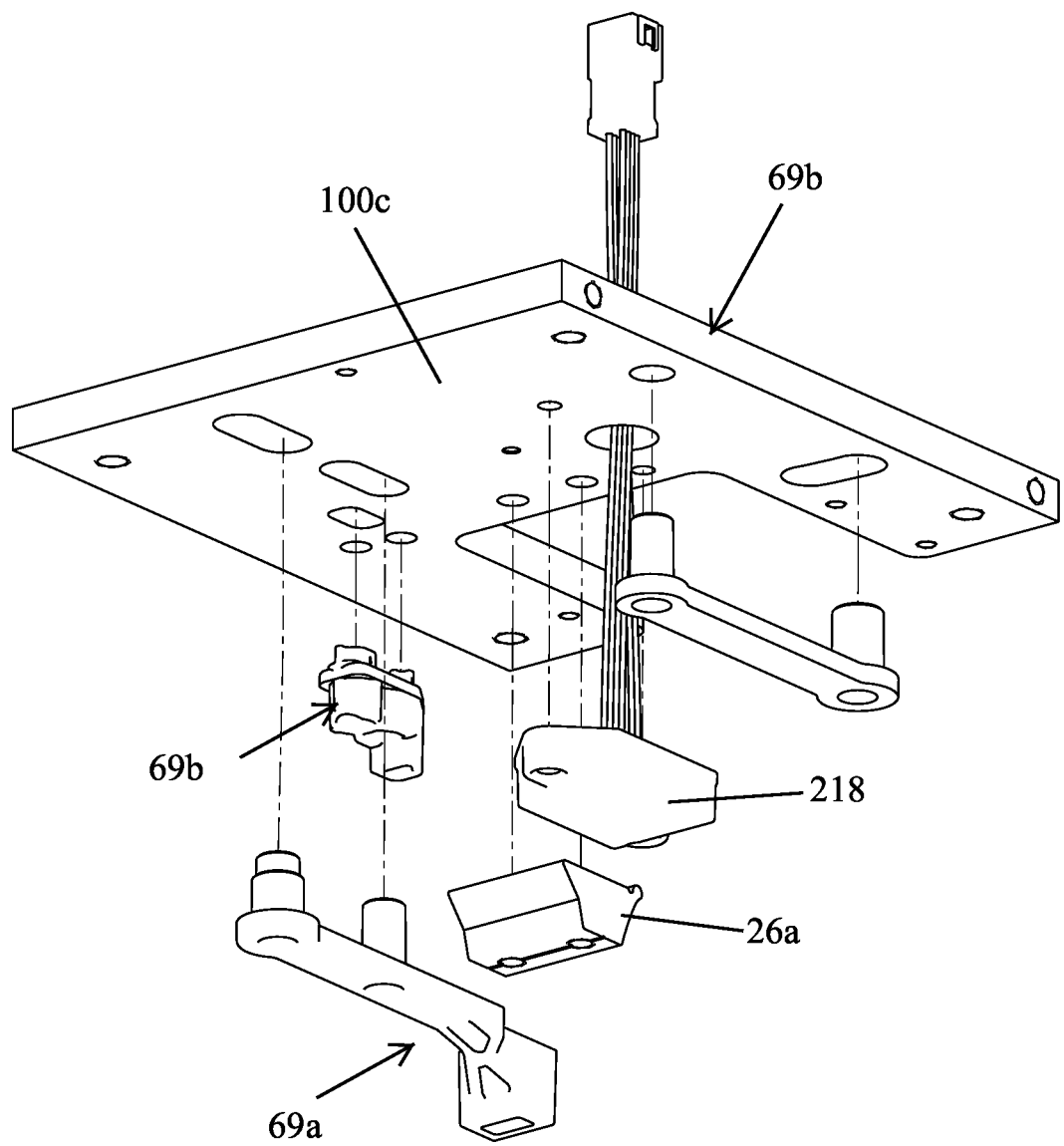
FIG. 26D is an exploded perspective view of the trolley based trigger release actuator for the releaser mechanism of FIGS. 26B-26C.

Referring to FIG. 26B, release struts 131 are coupled to cams 123f through openings 123h provided in bracket 123a. Mounted to the ends of struts 131 are slides 131a, which have pins to engage holes provided in cams 123f. Struts 131 extend through track 22 to couple at their opposed ends to trigger mechanisms 131b, which are biased by springs 131e in their non-releasing positions so that lock assembly 123 is normally locked. Each trigger mechanism 131b includes a base 131c and a trigger actuator surface 131d. Bases 131c are mounted for limited linear movement in slotted openings provided in the upper web of track 22 in a side by side staggered so that one trigger mechanism 131b can be actuated when trolley 24 moves in the direction of the closest trigger mechanism, while the other can be released selectively released by a separate actuator described below.

To actuate the trigger mechanisms, trolley 24 supports two trigger release arms 69a, 69b (FIG. 26D), which are also mounted in a side by side, staggered arrangement. When trolley 24 is moved toward the foot end of base 20 along track 22 toward its extended position, release arm 69b will make contact with the inner most trigger mechanism, which will rotate its associated cam and release its associated pawl that locks track 20 in the extension direction (direction toward back of cargo area). Once the pawl that binds track 22 against base 20 in the extension direction is released, track 22 is free to extend with trolley 24. At the same time as trolley 24 is extended along track 22, roller 128a is guided out of ramp 129, and roller 128b again binds against trolley 24 so that track 22 is coupled to trolley 24 by lock assembly 122, which is now released from base 20 so that track 22 will move with trolley 24 toward the extended position along base 20.

When trolley 24 is fully extended and arms 34a, 34b are raised to lift a cot, springs 68 will pull arm 69 to in turn move actuator arm 69a toward the other trigger mechanism 131b so that the pawl that binds track 22 in the retraction direction is now released so that after arms 34a, 34b have lifted the cot and is ready to load the cot in to the vehicle, track 22 will ride on base 20 along with trolley 24. As trolley 24 and track 22 are pushed along base 20, roller 128a will once again be guided onto ramp 129 to release trolley 24 from locking engagement with track 22 at which time trolley 24 will no longer release trigger mechanisms 131b, and lock assembly 123 will return to its normally locked state so that track 22 is once again anchored to base 20 and trolley 24 can then travel along track 22 to the full retracted position carrying the cot to engage latch mechanism 105.

Figure 22F:
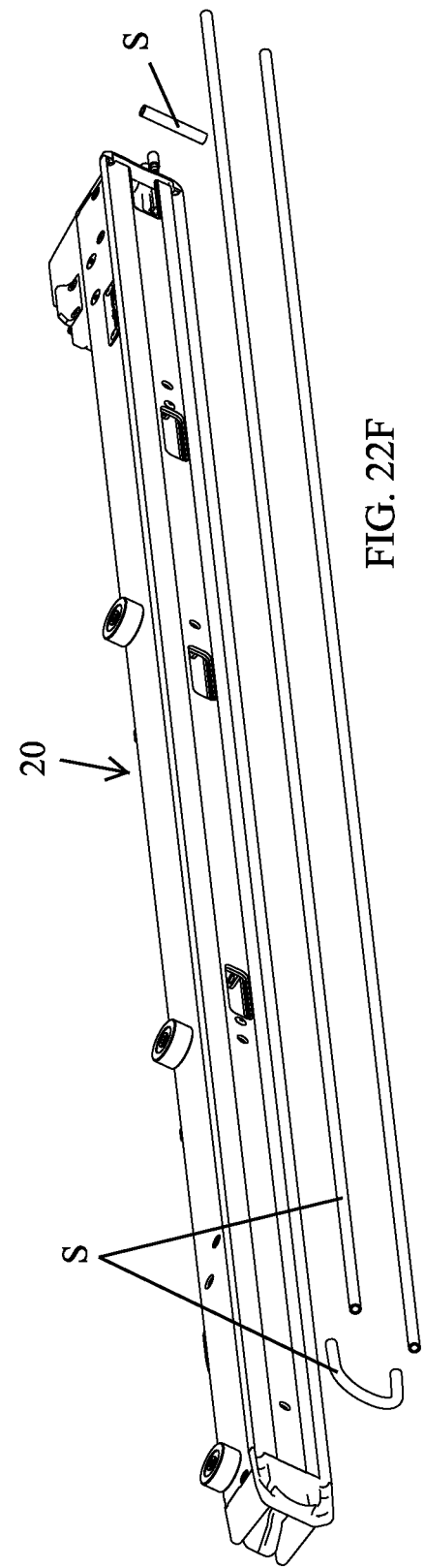
FIG. 22F is a bottom perspective view of the base illustrating the seal arrangement.
Figure 22G:
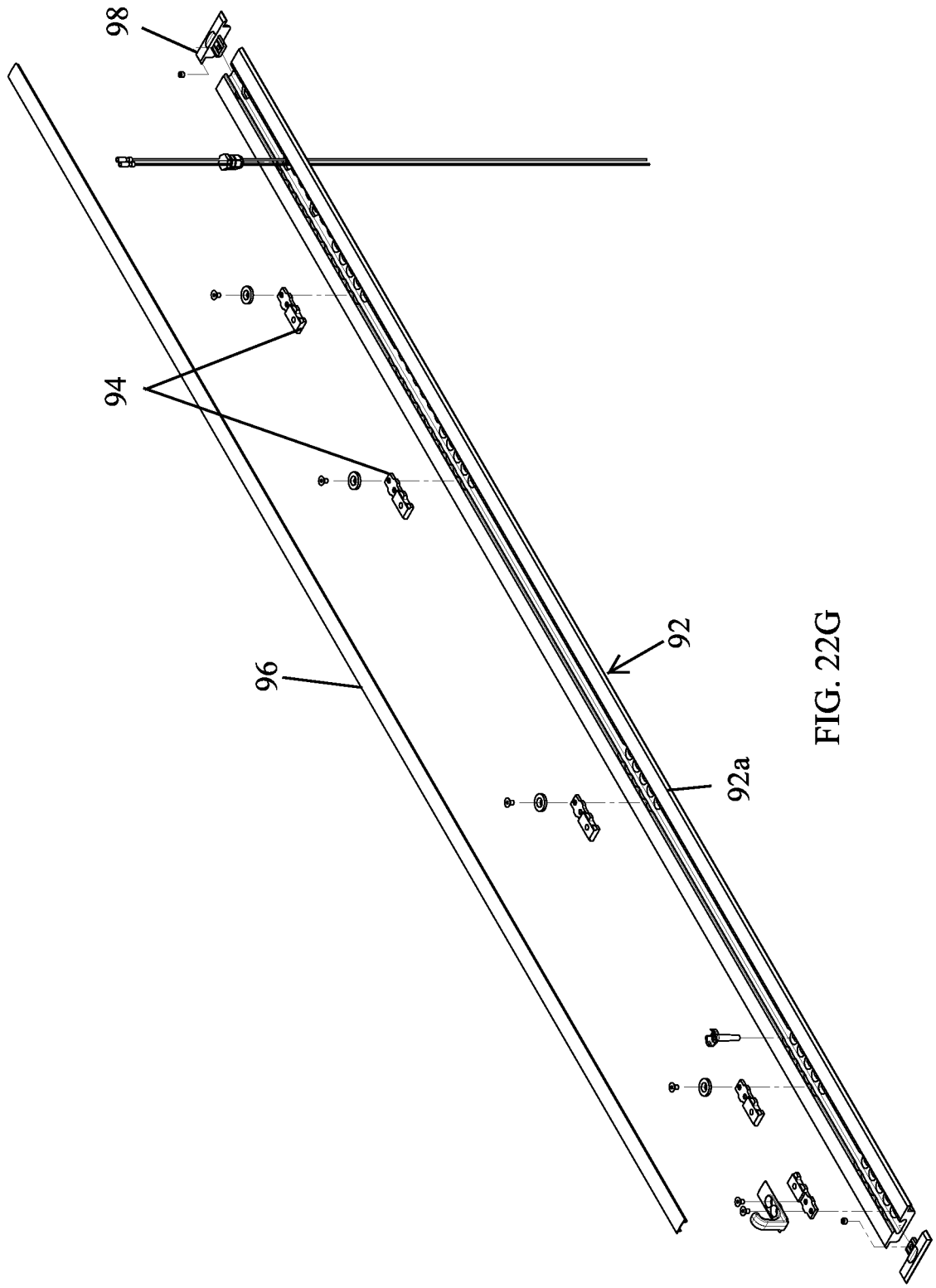
FIG. 22G is an exploded perspective view of the sub-anchor assembly for the transfer track of the cot loading and unloading apparatus.

As noted above, to release trolley 24 from its full retraced and locked position at latch mechanism 105, an attendant need only push button 112a, which causes pawl 106 to pivot about pin 106a into its lowered or depressed position in housing 108. Alternately, latch mechanism 105 may be released by release mechanism 115. Referring to FIGS. 22 and 22D, release mechanism 115 includes a trigger 115a, which is rotatably mounted in a housing 115b mounted to the end of base 20. Trigger 115a is coupled to an actuation plate 115c, which is positioned and aligned to actuate a pair of drive rods 115d and 115e via drive blocks 115f. Drive rod 115e is coupled to actuator 120 of latch mechanism 105 so that when trigger 115 is rotated its rotational axis, actuator plate 115c will urge drive rod 115e to pivot actuator 120 about its respective pivot axis to thereby pivot pawl 106 about its respective pivot pin and thereby allow trolley 24 to be disengaged from latch mechanism 105. In a similar manner, drive rod 115d is coupled to release plate 138b of fastener 132 so that when trigger 115a is rotated about its pivot pin, hook 130 will be moved to its recessed position for disengaging hook 138 from fastener 130. Optionally, trigger 115a may provide two actuation positions, one for releasing fastener 132 and a second position for releasing both fasteners 132 and latch 105.

Once trolley 24 is released from base 20 and foot end of cot 12 is released from the transfer track, cot 12 may be pulled to pull trolley 24 along the transfer track 22 (which as noted above remains locked onto base 20 until trolley 24 reaches the end of track 22). Trolley 24 slides longitudinally along the transfer track 22, which is still locked to base 20. As the attendant continues to pull on the cot, trolley 24 will reach the end of transfer track 22. When trolley 24 is approaching or is at the end of track 22, as noted, one of the pawls of latch mechanism 123 is released and latch mechanism 122 is actuated, which will latch transfer track 22 to trolley 24 to move together along base 20.

Once trolley 24 is fully extended, arms 34a and 34b may be lowered so that cot 12 can be unloaded from the ambulance. Once the cot is unloaded from the loading and unloading apparatus 14, trolley 24 is optionally returned to its fully retracted and locked position or may be returned to another locked position, for example a position close to the rear door of the ambulance to facilitate the deployment speed of the deployment of trolley 24.

To allow track 22 to be pushed back into the ambulance, the other pawl must be released. This can be done either manually, as previously noted, or by lifting the arms 34a, 34b, which triggers the release of the other trigger mechanism. Lock assembly 122 is then released when trolley 24 is pushed far enough in to push roller 128a onto ramp 129.

To lock trolley 24 along track 22 before reaching latch 105 and, therefore, provide the attendant with the ability to lock trolley 24 at any point along track 22, trolley 24 includes a block 170 mounted to the underside of arm assembly 34, which is sized and formed from a material that provides frictional engagement of track 22. For example, block 170 may be formed from a polymeric material or an elastomeric material. Further, optionally, the top web of track 22 may have a high friction surface formed or applied thereon (e.g. a strip of high friction material adhered or otherwise mounted to track 22). To release the frictional engagement, an attendant need only lift arms 34a, 34b, which raises block 170 above the upper surface of the track and further, as noted, positions arm 69a for releasing the outermost trigger mechanism 131b. In this manner, track 22 can retract along base 20 until track 22 is decoupled from trolley 24 at which point lock assembly 123 will return to its locked state.

With this configuration, trolley 24 can be pushed along track 22 to any desired location along track 22. Once the arms are lowered to their generally horizontal orientation, the position of trolley 24 along track 22 is once again fixed. It should be understood that when arms 34a, 34b are lifted to support the cot 12, block 170 is out of engagement with the top surface of track 22.

The location of locking assembly 122 substantially coincides with when track 22 is in its fully retracted position along base 20, which also coincides with when lock assembly 123 locks track 22 to base 20. This arrangement of latches and timing of their actuation or release provides for a loading and unloading system that is compact and further whose interconnection of the various moving components provides proper securement of the cot during loading and unloading as well as during transport of the cot.

Figure 33:
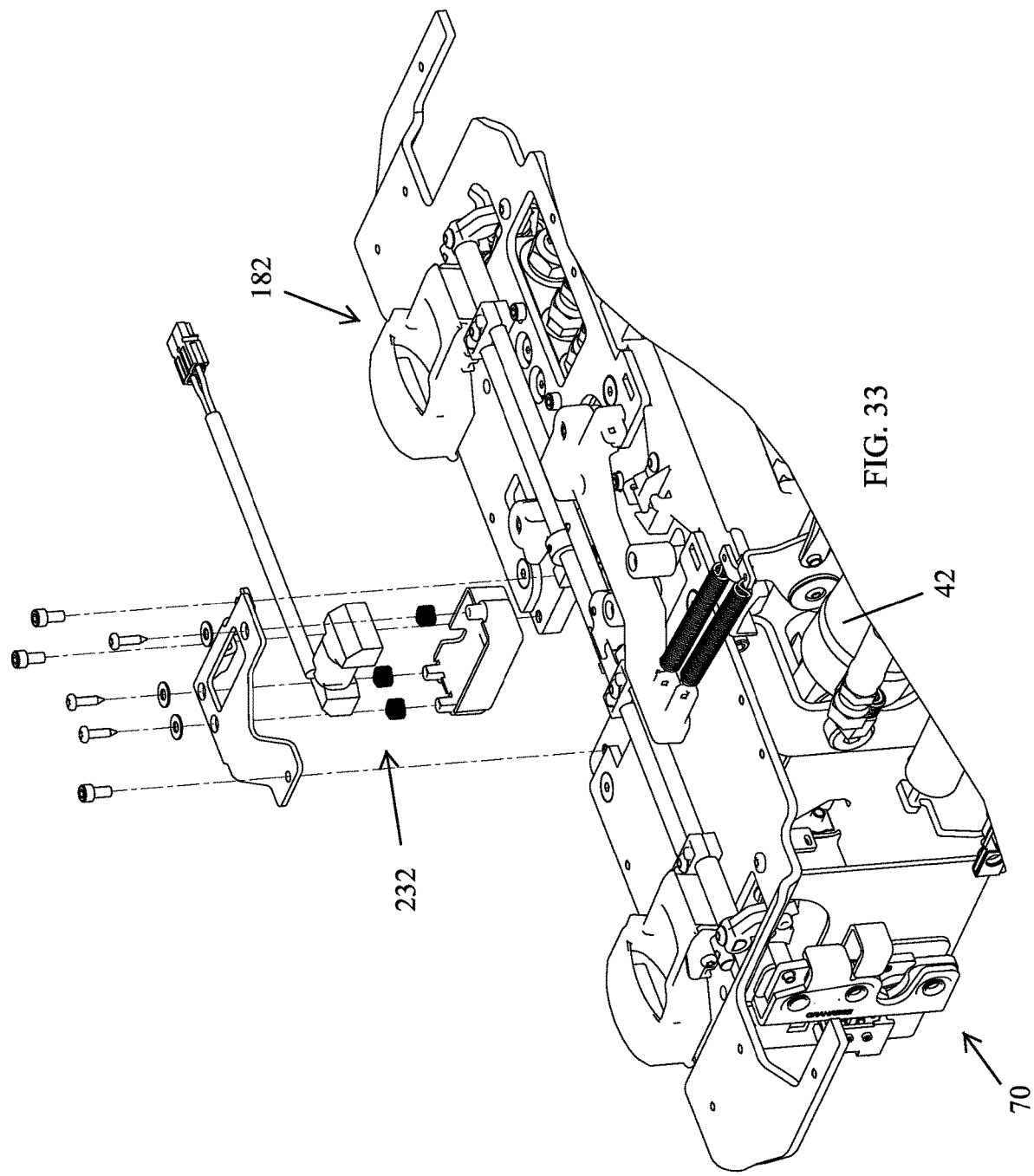
FIG. 33 is an exploded perspective view of the mounting details of the trolley secondary control.
Figure 34:
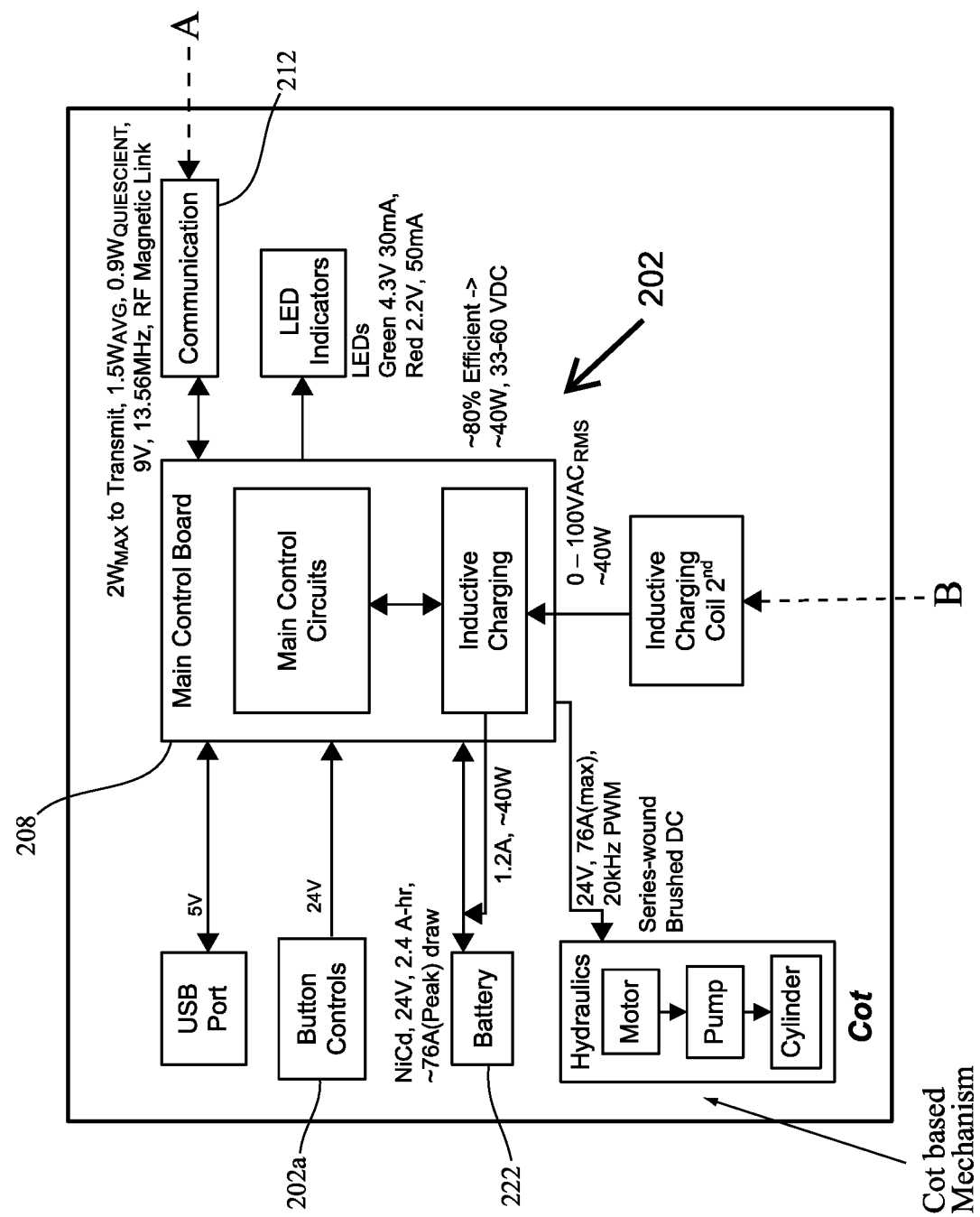
FIG. 34 is a schematic drawing of the cot portion of the control system of the ambulance cot and loading and unloading system of the present invention.
Figure 34A:
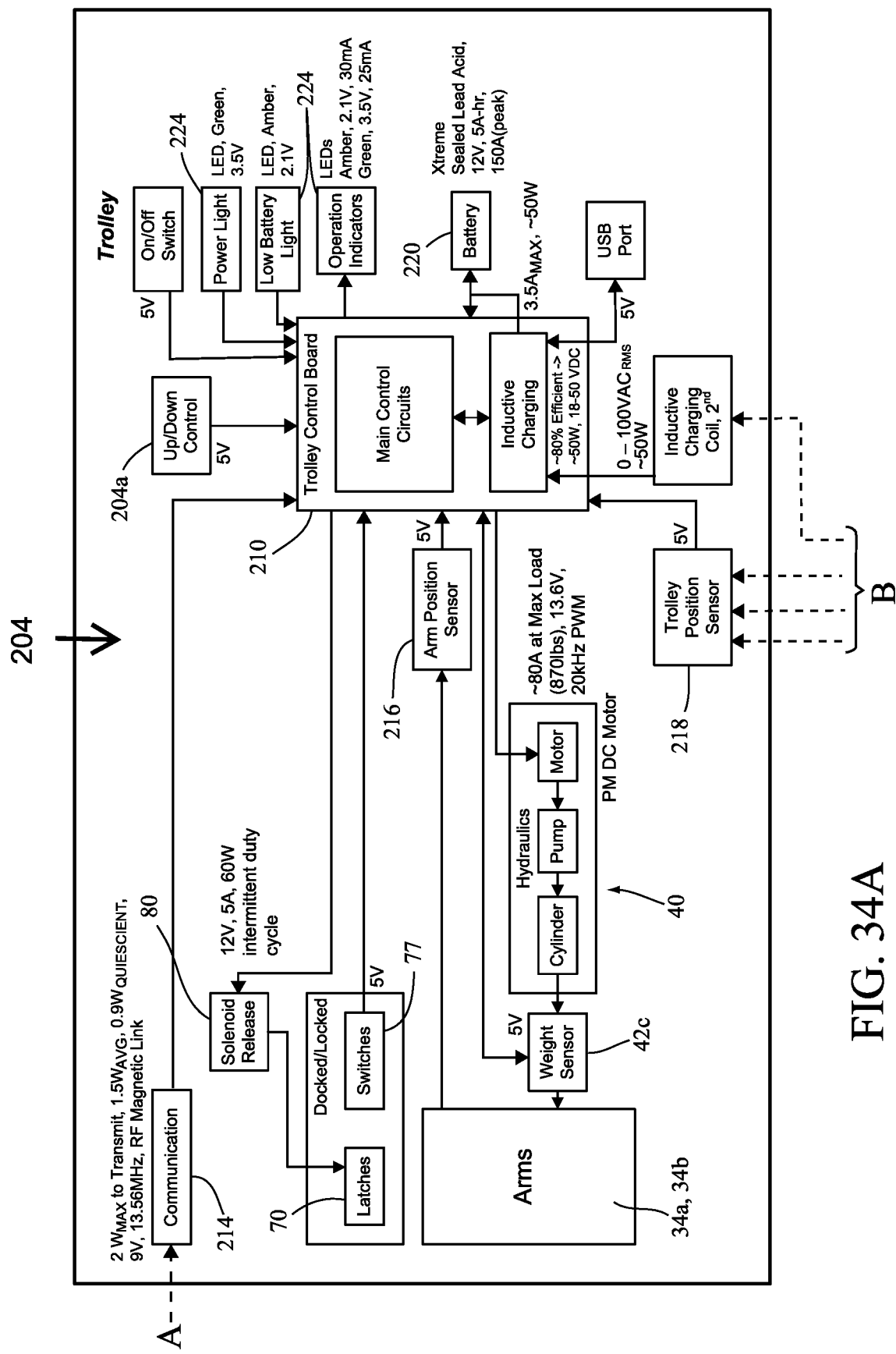
FIG. 34A is a schematic drawing of the trolley portion of the control system.
Figure 34B:
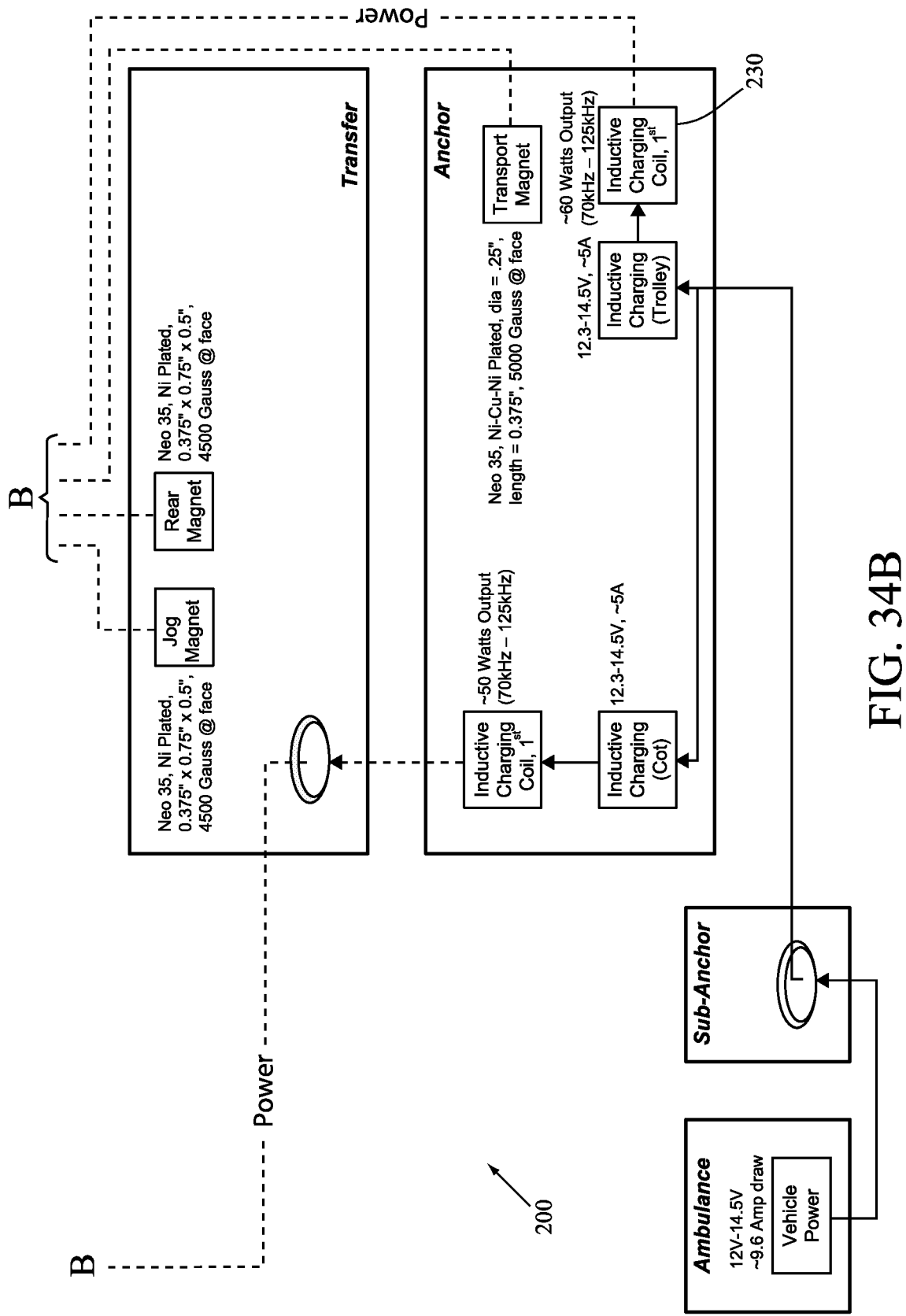
FIG. 34B is a schematic drawing of the anchor portion of the control system.

As previously described, cot 12 is locked onto trolley 24 by latches 70, which are released by actuation of solenoids 80. Optionally, trolley 24 may include a manual release mechanism 180. Referring to FIGS. 32, 33, and 34, manual release mechanism 180 includes a pair of handles 182 that are located at the cargo area facing side 88b of trolley 24, which are mounted for pivotal movement in housing 88 of trolley 24 at openings 88c on a rod 184. Mounted on the distal ends of rod 184 are pawls 186, link assemblies 188, and actuation cam 190, which link rod 184 to a second rod 192 that together with rod 184 are mounted to frame 36 by support blocks 194. Each link assembly 188 includes a plate 196 with a lobed opening 196a, which guides a respective actuation cam 190 as one or both handles 182 are rotated. Coupled to each actuation cam 190 is a solenoid lever release 198, which are positioned over plungers 78 of solenoids 80 so that when handles 182 are lifted, solenoid lever release 198 will urge plungers 78 downwardly to pull on pins 76 of latches 70 to thereby manually release latches 70.

In the illustrated embodiment, system 10 is configured to raise arms 34a, 34b at a faster speed when the arms are not loaded with an applied force of preselected magnitude, such as the weight of the cot, and at a slower speed or slower speeds when the arms 34a, 34b are loaded with an applied force that exceeds a preselected magnitude, such as the weight of the cot. In this manner, arms 34a and 34b can be quickly deployed when not loaded but moved at a slower speed when loaded with a cot. Alternately, arms 34a, 34b can be moved at a slower speed only when raising a cot supporting a patient.

Referring to FIG. 34, system 10 includes control system 200 for controlling the actuation of drive mechanism 40 and also for the unlatching of latches 70. Further, control system 200 may include an inductive charging system, such as described in copending application entitled POWERED PATIENT SUPPORT AND FASTENING SYSTEM WITH INDUCTIVE BASED POWER SYSTEM, Ser. No. 60/949,005, filed Jul. 11, 2007, which is hereby incorporated by reference in its entirety.

Figure 17A:
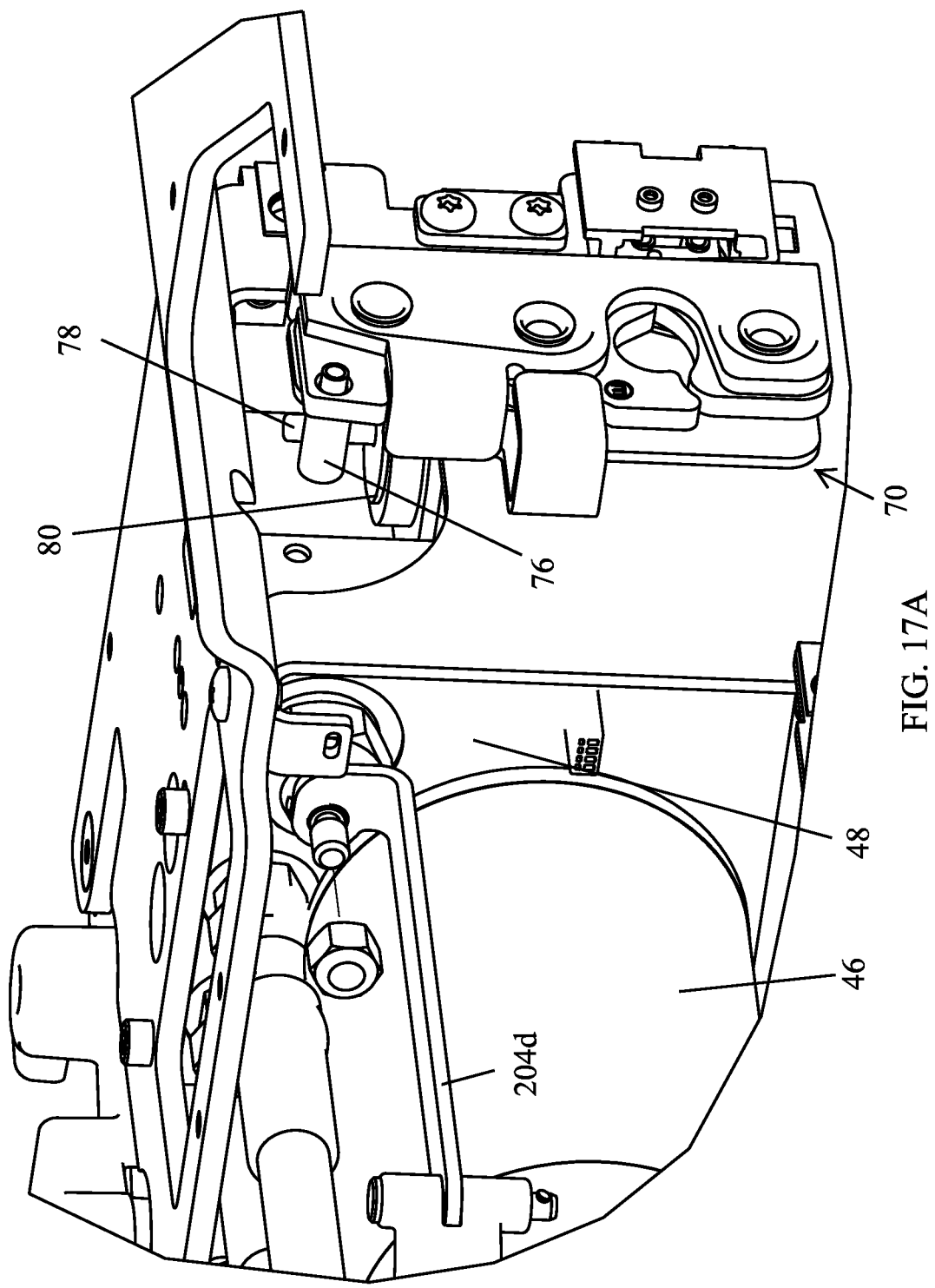
FIG. 17A is an enlarged detailed view of the solenoid and solenoid plunger orientation relative to the latch mechanism.
Figure 18:
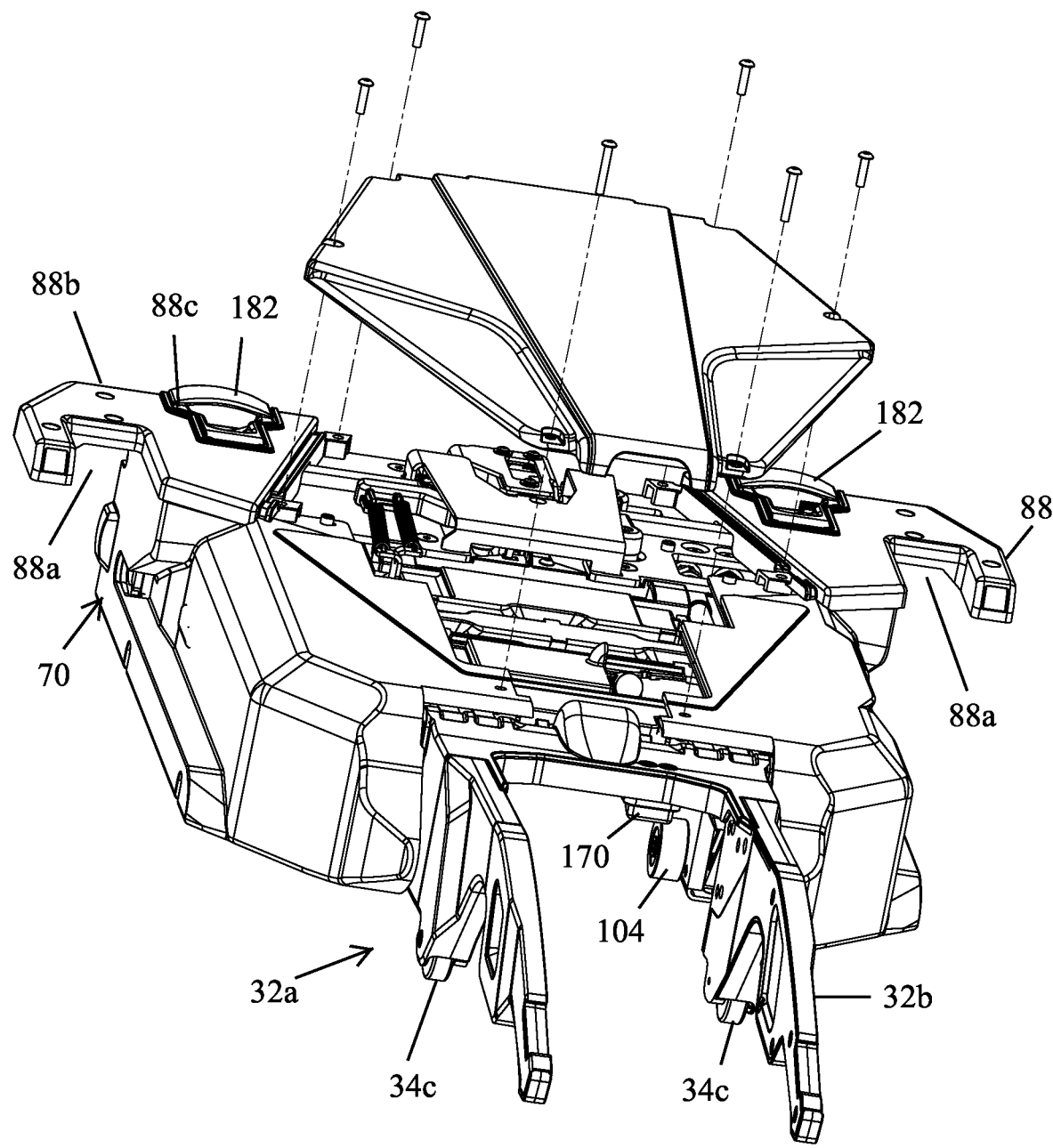
FIG. 18 is a partial exploded perspective view of the trolley.

In the illustrated embodiment, control system 200 includes two control systems, a cot-based control system 202 and a loading and unloading apparatus-based control system, for example, a trolley-based control system 204. Each control system 202, 204 includes a control board 208 and 210 (with a microprocessor and memory storage unit), which are in communication with user input devices 202a and 204a, which are provided at cot 12 and trolley 24, respectively. User input devices 202a (cot-based user input device) and 204a (loading and unloading apparatus-based or trolley-based user input device) each include user actuatable buttons or switches 204b (FIG. 10) (only user input device 204a is shown in detail) to allow a user to input signals for raising or lowering arms 34a, 34b. Further, user input device 204a also include a manual dump button 204c, which when pressed presses against a linkage 204d that couples to the manifold (FIG. 17A) to release fluid from the cylinder into a reservoir so that the arms can be quickly lowered.

Control system 202 and 204 also each include a communication board 212, 214 with wireless transmitters and/or receivers, such as RF devices, inductive devices, acoustic device, optical devices, or infrared devices, between the cot-based control system 202 and trolley-based control system 204 so that cot-based control system 202 can control the devices at loading and unloading apparatus. Communication may be one-way or two-way communication.

In the illustrated embodiment, control board 210 is in communication with switch 42c, which is a load sensor, such as a load cell, including an analog strain gauge, which is mounted at cylinder 42 (as noted above), for detecting whether load is applied to the respective arms. For example, the memory device of board 210 may have stored therein a threshold load, such as zero or the weight of a cot, and at least two arms speeds, for example, a low speed profile and a high speed profile, so that when a load that exceeds the threshold load is detected, control board 210 will control drive mechanism 40 at the low speed profile. When the load detected is less than the threshold load, control board 210 will control drive mechanism 40 at the high speed profile. It should be understood that the memory device may have other low or high speed provides and control board 210 may select between the different speed profiles or may have angular ranges over which each speed profile is applied. For example, at the top position of the cot, the control board may select the lowest of the speed profiles or also may vary the speed profile to reduce the speed so that as the cot is raised higher the speed reduces at a linear rate or at a non-linear rate to provide a soft upper stop position. Similarly, when lowering to arms, the speed may be varied to provide discrete speeds or variable speeds, for example to provide a soft lower stop position. Further, the memory device of board 210 may have stored therein a maximum loading height to which load arms are raised. As noted above, the controllers may be configured to detect a threshold load, e.g. the weight of a cot fully loaded with equipment, and only raise the arms at the reduced speed if that threshold load is exceeded, for example when the cot is supporting a patient. Similarly, control board 210 may be configured to lower the arms at slower speed when the arms are loaded and to lower the arms at a faster speed when the arms are not externally loaded or only loaded with non-patient carrying cot.

To determine the height, angles, speeds, stop points/conditions, and acceleration, system 10 also includes an arm angle position sensor 216 (FIGS. 9 and 10), which is mounted to frame 36 by a mounting bracket 216a and is coupled to arm assembly 34 by a link 216b, which is used to determine the angular position of the arms. Its values are referenced against preset registers to determine speeds, stop points/conditions, and acceleration. Control system 200 may also include a sensor 218 to detect when trolley 24 is latched at latching mechanism 105 and to provide feedback to control system 200 when trolley 24 is latched. Further, control system 200 may include one or more USB port devices to allow information, data, programming upgrades, or programming to be uploaded to the respective cot-based control system 202 and/or trolley-based control system 204. In addition, system 200 may incorporate a plurality of indicators 224, such as LEDs, to provide status indication, such as low battery, a power light (to indicate that the system is powered), and other operational indicators. In addition, system 200 may incorporate a plurality of indicators 224, such as LEDs (such as amber and/or green LEDS (FIG. 34)), to provide status indication, such as low battery, a power light (to indicate that the system is powered), and other operational indicators (see FIG. 34). For example, the LEDs may be mounted at the trolley and in communication with the trolley control board 210 (FIG. 34).

Further, trolley-based control system 204 may be configured as a slave to cot-based control system, which may be configured to act as the primary control system when a cot is loaded onto or adjacent loading and unloading apparatus to allow an attendant to control the loading and unloading apparatus from the foot end of the cot, while still providing redundant controls, for example, at user input device 204a. Alternately, cot-based control system 202 may be configured as a slave to the trolley-based control system.

As noted above, control system 200 may incorporate an inductive charging system for charging the battery 220 on the loading and unloading apparatus and/the battery 222 on the cot. Primary and secondary coils may be electrically coupled to the respective batteries and located on the cot, on the trolley, and in the base to allow recharging of the respective batteries through induction. Further, the charge regulation circuitry for the trolley battery may reside on the trolley-based control board 210, while the charge regulation circuitry for the cot battery may reside on the cot-based control board 208.

For example, latch mechanism 105 may house a primary coil 230, which couples to the electrical system of the vehicle through the sub-anchor assembly 92, and trolley 24 may house a secondary coil 232, which is in communication with trolley-based control board 210, so that when aligned with coil 230 in the latch mechanism 106 (when trolley is moved to its fully retracted position), electricity can be generated by inductive coupling to recharge the trolley battery (which is housed in trolley) from the vehicle's electrical system. Similarly, base 20 may include another primary coil 234 adjacent fastener 132, which is also coupled to the vehicle electrical system, for example through sub-anchor assembly 92, and cot 12 may include a coil 236 (FIG. 30), which is electrically coupled to the cot battery through cot-based control board 208 so that the cot battery can also be recharged using the vehicle electrical system. Further, to facilitate close positioning of coil may be enhanced by mounting coil 234 in a spring biased housing 234a (FIG. 22A) so that when track 22 is moved along base 20, coil 234 will not interfere with the movement of track 22.

Alternately, the system of the present invention may incorporate electrical contacts to provide direct electrical coupling between the trolley and the base, as described in the reference patent, and further may provide a cabling between the cot and trolley based control systems rather than the wireless connection described herein.

Although several forms of the invention have been disclosed for illustrative purposes, it will be recognized that variations or modifications of the disclosed apparatus, including the rearrangement of parts, lie within the scope of the present invention.

What is claimed is:

1. An ambulance cot loading and unloading apparatus for loading or unloading into an emergency vehicle, the emergency vehicle having a cargo area and an opening into the cargo area, said ambulance cot loading and unloading apparatus comprising:
   a base for mounting to a deck of the emergency vehicle;
   a track supported by said base and selectively locked with and unlocked from said base, and when said track is unlocked from said base said track is mounted for linear movement along said base;

an arm configured to support a cot, said arm selectively locked to and unlocked from said track, and when said arm is unlocked from said track, said arm is mounted for selective linear movement along said track;

wherein when said arm and said track are locked together, said arm and said track move together along said base over a first range of motion, and when said arm and said track are unlocked, said arm is movable along said track over a second range of motion;

a trolley supporting said arm, said trolley movable along said track to thereby move said arm along said track, and said trolley configured to selectively lock said arm to said track; and a latch, said latch releasably locking said track to said base, wherein said trolley is configured to engage said latch to unlock said track from said base.

2. The ambulance cot loading and unloading apparatus according to claim 1, wherein when said base is mounted in the cargo area of the emergency vehicle adjacent the opening, and said track is extended along said base and said arm is extended along said track, said arm is extendible from the cargo area to support the cot thereon outside the emergency vehicle.

3. The ambulance cot loading and unloading apparatus according to claim 2, wherein said arm is pivotally mounted about a pivot axis relative to said track.

4. The ambulance cot loading and unloading apparatus according to claim 3, wherein when said base is mounted in the cargo area of the emergency vehicle adjacent the opening, and said track is extended along said base and said arm is extended along said track, said pivot axis is outside the emergency vehicle.

5. The ambulance cot loading and unloading apparatus according to claim 1, wherein said trolley is configured to selectively unlock said trolley from said track.

6. The ambulance cot loading and unloading apparatus according to claim 5, further comprising a second latch, said second latch releasably locking said trolley to said track.

7. An ambulance cot loading and unloading apparatus for loading or unloading into an emergency vehicle, the emergency vehicle having a cargo area and an opening into the cargo area, said ambulance cot loading and unloading apparatus comprising:

a base for mounting to a deck of the emergency vehicle;

a track supported by said base and selectively locked with and unlocked from said base, and when said track is unlocked from said base said track is mounted for linear movement along said base;

an arm configured to support a cot, said arm selectively locked to and unlocked from said track, and when said arm is unlocked from said track, said arm is mounted for selective linear movement along said track;

wherein when said arm and said track are locked together, said arm and said track move together along said base over a first range of motion, and when said arm and said track are unlocked, said arm is movable along said track over a second range of motion;

a trolley supporting said arm, said trolley movable along said track to thereby move said arm along said track, and said trolley configured to selectively lock said arm to said track; and a latch, said latch releasably locking said trolley to said track, wherein said base is configured to selectively unlock said latch from said trolley.

8. The ambulance cot loading and unloading apparatus according to claim 7, said latch includes a spring to apply a spring force to latch said trolley to said base, and said base at least reducing said spring force to selectively unlock said latch from said trolley.

9. An ambulance cot loading and unloading apparatus for loading or unloading into an emergency vehicle, the emergency vehicle having a cargo area and an opening into the cargo area, said ambulance cot loading and unloading apparatus comprising:

a base for mounting to a deck of the emergency vehicle;

a track supported by said base and selectively engaged with and disengaged from said base, and when said track is unlocked from said base said track is mounted for linear movement along said base;

an arm configured to support a cot; and said track having a first latch to selectively lock to and unlock from said arm, and said track having a second latch to selectively lock to and unlock from said base, wherein when said arm is unlocked from said track, said arm is mounted for selective linear movement along said track, and when said track is unlocked from said base and said arm is locked to said track, said arm and said track move together along said base, wherein said track is movable along said base between a fully retracted position and a fully extended position along said base, and said arm is movable along said track from a fully retracted position to a fully extended position along said track, further comprising a latch to lock said arm to said base when said arm and said track are in their fully retracted positions.

10. An ambulance cot loading and unloading apparatus for loading or unloading into an emergency vehicle, the emergency vehicle having a cargo area and an opening into the cargo area, said ambulance cot loading and unloading apparatus comprising:

a base for mounting to a deck of the emergency vehicle;

a track supported by said base and selectively engaged with and disengaged from said base, and when said track is unlocked from said base said track is mounted for linear movement along said base;

an arm configured to support a cot;

said track having a first latch to selectively lock to and unlock from said arm, and said track having a second latch to selectively lock to and unlock from said base, wherein when said arm is unlocked from said track, said arm is mounted for selective linear movement along said track, and when said track is unlocked from said base and said arm is locked to said track, said arm and said track move together along said base; and wherein said base is configured to selectively unlock said arm from said track.

11. The ambulance cot loading and unloading apparatus according to claim 9, wherein when said base is mounted in the cargo area of the emergency vehicle adjacent the opening, and said track is extended along said base and said arm is extended along said track, said arm is extendible from the cargo area to an extended position support an ambulance outside the emergency vehicle thereon.

12. The ambulance cot loading and unloading apparatus according to claim 9, wherein when said arm is extended from the cargo area, said arm is in an extended position and is operable to provide cantilevered support to the cot while in said extended position.

13. The ambulance cot loading and unloading apparatus according to claim 12, wherein said arm is pivotally mounted about a pivot axis relative to said track.

14. The ambulance cot loading and unloading apparatus according to claim 13, wherein when said base is mounted in the cargo area of the emergency vehicle adjacent the opening, and said track is extended along said base and said arm is extended along said track to said extended position, said pivot axis is outside the emergency vehicle.

15. The ambulance cot loading and unloading apparatus according to claim 9, further comprising a trolley supporting said arm, said trolley movable along said track to thereby move said arm along said track, and said trolley configured to selectively lock said arm to said track.

16. The ambulance cot and loading and unloading apparatus according to claim 15, wherein said track includes an upper surface that provides a higher friction surface relative to an adjacent surface of the track, wherein the upper surface is provided for engagement by said trolley to releasably lock the position of said trolley along said track.

17. An ambulance cot loading and unloading apparatus for loading or unloading a cot into an emergency vehicle, the emergency vehicle having a cargo area and an opening into the cargo area, said ambulance cot loading and unloading apparatus comprising:
  a base for mounting to a deck of the emergency vehicle;
  a track supported by said base, said track is mounted for linear movement along said base;
  an arm configured is mounted relative to said track and mounted for linear movement along said track and to extend from said track to provide cantilevered support for the cot on said arm;
  a guide surface mounted relative to said arm, said guide surface guiding the cot into alignment with the said ambulance cot loading and unloading apparatus;
  a trolley supporting said arm, said trolley movable along said track to thereby move said arm along said track; and
  a latch, said latch releasably locking said track to said base, wherein said trolley is configured to engage said latch to unlock said track from said base.

18. The ambulance cot loading and unloading apparatus according to claim 17, wherein when said base is mounted in the cargo area of the emergency vehicle adjacent the opening, and said track is extended along said base and said arm is extended along said track, said arm is extendible from the cargo area to support an ambulance outside the emergency vehicle thereon.

19. The ambulance cot loading and unloading apparatus according to claim 17, wherein said arm has a length, wherein said arm is extended from the opening over its length when (1) said base is mounted in the cargo area of the emergency vehicle adjacent the opening, (2) said track is extended along said base, and (3) said arm is extended along said track.

20. The ambulance cot loading and unloading apparatus according to claim 17, wherein said arm moves linearly relative to said track over a first range of motion, and said arm and said track move linearly together over a second range of motion.

21. The ambulance cot loading and unloading apparatus according to claim 17, wherein said guide surface comprises two guide surfaces.

22. The ambulance cot loading and unloading apparatus according to claim 17, wherein said arm supports a roller.

23. The ambulance cot loading and unloading apparatus according to claim 17, wherein said arm comprises a pair of arms.

24. The ambulance cot loading and unloading apparatus according to claim 23, wherein each arm of said pair of arms supports a roller.

* * * * *